(12) United States Patent
Yamato et al.

(10) Patent No.: US 7,343,514 B2
(45) Date of Patent: Mar. 11, 2008

(54) DATA COPYING SYSTEM, RELAYING DEVICE, DATA TRANSFER/RECEPTION SYSTEM AND PROGRAM FOR COPYING OF DATA IN STORAGE UNIT

(75) Inventors: Jun-ichi Yamato, Tokyo (JP); Yoshihide Kikuchi, Tokyo (JP); Yuji Kaneko, Tokyo (JP)

(73) Assignee: NEC Corporation, Tokyo (JP)

( * ) Notice: Subject to any disclaimer, the term of this patent is extended or adjusted under 35 U.S.C. 154(b) by 553 days.

(21) Appl. No.: 10/644,934

(22) Filed: Aug. 21, 2003

(65) Prior Publication Data
US 2004/0044649 A1 Mar. 4, 2004

(30) Foreign Application Priority Data
Aug. 28, 2002 (JP) ............................ 2002-249049

(51) Int. Cl.
*G06F 11/00* (2006.01)
(52) U.S. Cl. .......................................... 714/6; 711/162
(58) Field of Classification Search ................ 714/6
See application file for complete search history.

(56) References Cited

U.S. PATENT DOCUMENTS

| | | | | |
|---|---|---|---|---|
| 5,155,845 A | * | 10/1992 | Beal et al. ................... 714/6 |
| 5,369,757 A | * | 11/1994 | Spiro et al. .................. 714/19 |
| 5,504,861 A | * | 4/1996 | Crockett et al. ............. 714/13 |
| 5,537,533 A | * | 7/1996 | Staheli et al. ................ 714/5 |
| 5,544,347 A | * | 8/1996 | Yanai et al. ................. 711/162 |
| 5,555,371 A | * | 9/1996 | Duyanovich et al. ........ 714/13 |
| 5,742,792 A | * | 4/1998 | Yanai et al. ................. 711/162 |
| 5,835,953 A | * | 11/1998 | Ohran ......................... 711/162 |
| 5,889,935 A | * | 3/1999 | Ofek et al. .................... 714/6 |
| 6,131,148 A | * | 10/2000 | West et al. ................... 711/162 |
| 6,148,383 A | * | 11/2000 | Micka et al. ................ 711/162 |

(Continued)

FOREIGN PATENT DOCUMENTS

JP 57-138237 A 8/1982

(Continued)

OTHER PUBLICATIONS

EMC², "http://www.emc2.co.jp/local/ja/JP/products/product_pdfs/srdf/srdf.pdf".

(Continued)

*Primary Examiner*—Robert W Beausoliel
*Assistant Examiner*—Elmira Mehrmanesh
(74) *Attorney, Agent, or Firm*—Sughrue Mion, PLLC

(57) ABSTRACT

A relaying device for relaying data transferred from first storage unit to a second storage unit, is provided outside a range presumed to be affected by a disaster, when a disaster, such as an earthquake, has broken out in an installation site of a host of a normal system (host computer) and the first storage unit. Moreover, the relaying device is placed at such a location that the data transfer time between the first storage unit and the relaying device is shorter than the data transfer time in case the first and second storage units directly transfer data with each other. On receipt of data from the first storage unit, the relaying device notifies the first storage unit of the completion of reception of the data before completing transmission of the data to the second storage unit.

15 Claims, 41 Drawing Sheets

U.S. PATENT DOCUMENTS

| | | | | |
|---|---|---|---|---|
| 6,148,414 | A * | 11/2000 | Brown et al. | 714/9 |
| 6,182,198 | B1 * | 1/2001 | Hubis et al. | 711/162 |
| 6,240,494 | B1 | 5/2001 | Nagasawa et al. | |
| 6,266,781 | B1 * | 7/2001 | Chung et al. | 714/4 |
| 6,266,784 | B1 * | 7/2001 | Hsiao et al. | 714/6 |
| 6,304,980 | B1 * | 10/2001 | Beardsley et al. | 714/6 |
| 6,308,284 | B1 * | 10/2001 | LeCrone et al. | 714/6 |
| 6,360,331 | B2 * | 3/2002 | Vert et al. | 714/4 |
| 6,553,401 | B1 * | 4/2003 | Carter et al. | 709/200 |
| 6,587,970 | B1 * | 7/2003 | Wang et al. | 714/47 |
| 6,594,744 | B1 * | 7/2003 | Humlicek et al. | 711/162 |
| 6,598,174 | B1 * | 7/2003 | Parks et al. | 714/6 |
| 6,618,818 | B1 * | 9/2003 | Wahl et al. | 714/6 |
| 6,691,245 | B1 * | 2/2004 | DeKoning | 714/6 |
| 6,742,138 | B1 * | 5/2004 | Gagne et al. | 714/6 |
| 6,760,861 | B2 * | 7/2004 | Fukuhara et al. | 714/4 |
| 6,813,683 | B2 * | 11/2004 | Tabuchi et al. | 711/112 |
| 6,883,110 | B1 * | 4/2005 | Goddard | 714/6 |
| 6,912,629 | B1 * | 6/2005 | West et al. | 711/161 |
| 6,948,089 | B2 * | 9/2005 | Fujibayashi | 714/6 |
| 6,966,001 | B2 * | 11/2005 | Obara et al. | 713/193 |
| 7,013,372 | B2 * | 3/2006 | Achiwa et al. | 711/162 |
| 7,017,076 | B2 * | 3/2006 | Ohno et al. | 714/15 |
| 7,134,044 | B2 * | 11/2006 | Day et al. | 714/6 |
| 2001/0047412 | A1 * | 11/2001 | Weinman, Jr. | 709/225 |
| 2004/0193945 | A1 * | 9/2004 | Eguchi et al. | 714/6 |

FOREIGN PATENT DOCUMENTS

| | | |
|---|---|---|
| JP | 11-184641 A | 7/1999 |
| JP | 2000-305856 A | 11/2000 |
| WO | 01/97017 A2 | 12/2001 |

OTHER PUBLICATIONS

S. Tomita et al., "Computer Architecture, Quantitative Approach of Designing, Implementation and Evaluation", (Feb. 1994), pp. 442-443.

* cited by examiner

DATA COPYING SYSTEM, RELAYING DEVICE, DATA TRANSFER/RECEPTION SYSTEM AND PROGRAM FOR COPYING OF DATA IN STORAGE UNIT

FIELD OF THE INVENTION

This invention relates to a data copying system, a relaying device, a data transfer/reception system and a program for copying of data in a storage unit.

BACKGROUND OF THE INVENTION

Such a computer system has already been realized which is provided with a normal system (a working system) and a standby system in order to maintain the functions of the computer system even in case of a disaster. For example, the EMC Corporation has developed a system which effects mirroring using a normal storage unit system and a standby storage unit system. The information concerning such system is disclosed on the Internet in the URL of "http://www.emc2.co.jp/local/ja/JP/products/product_pdfs/srdf/srdf.pdf".

In Japanese Patent Kokai Publication JP-P2000-305856A, there is disclosed a system which achieves a dual data system between a main center (normal system) and a remote center (stand-by system).

In a normal system, in general, a storage unit of a normal system and a host computer of the normal system employing the storage unit are interconnected. The same applies for the standby system. The normal system and the standby operation system are interconnected over a leased line or a communication network, such as the Internet.

In the system disclosed in "http://www.emc2.co.jp/local/ja/JP/products/product_pdfs/srdf/srdf.pdf", or in the system described in the Japanese Patent Kokai Publication JP-P2000-305856A, data is directly transmitted from the normal system to the standby system. However, there are also occasions where the normal system sends data to a relaying device, which relaying device then sends the data to the standby system. In general, the relaying device sends data received from the normal system to the standby system and, on receipt of the notice for completion of reception from the standby system, the relaying device notifies the normal system of the completion of the data transfer to the standby system. When the normal system has transmitted data to the relaying device, the normal system commences the next operation after receipt of a notice of the effect of the end of data transfer from the relaying device.

In general, in transmitting/receiving data over a communication network, the data is divided and transmitted/received in terms of data transmitting units. The data transmitting units differ from one communication protocol to another. In the data transfer unit, such as a packet, there are contained not only data being transmitted, but also error correction codes for detecting data errors (garbled data) produced in the course of transmission. The error correction codes may be exemplified by check sum data and CRC (cyclic redundancy check) data. If a device which has received a packet of data detects a data error by the error detection code, the device discards the packet.

Even if no error is incurred in data, but if congestion (the state of high communication load) occurs on the communication network, the packet is discarded on the communication network. If a packet is discarded, and no response is obtained from a destination of transmission, a source of the transmission again sends the packet. Meanwhile, if congestion has occurred on the communication network, and packet discarding is commenced, the communication load may further be increased due to re-transmission from the source of the transmission, or the rate of network utilization may be lowered. In order to avoid this problem, such a system has come to be used in which a device forming a communication network optionally discards a packet when the communication load has exceeded a preset threshold value. This system is termed a RED (Random Early Detection) system.

There is also proposed a data transfer system in which a device which has received data is able to correct data errors. For example, in the Japanese Patent Kokai Publication JP-A-57-138237, there is disclosed such a data transfer system in which data to be transferred and parity bits formulated from the data are separately transmitted and a device which has received the data to be transferred and the parity bits executes error correction.

In the following, mirroring and backup are demarcated as follows from each other. "Mirroring" is defined as meaning writing the same data in two or more storage units, to one of which a write command has been output from a host, with the outputting of the write command as an incentive for writing the same data in the two or more storage units. The replication is also treated as being a sort of the mirroring. On the other hand, "backup" is defined as writing the contents of a given storage unit in another storage unit, at an optional timing, that is, the write command for a given storage unit is not used as a trigger for the backup.

In a computer system, there has also been implemented a technique in which a program being executed is suspended at an optional time point and re-started later. For example, in a super-computer manufactured and sold by the present assignee under the title of SX series, after the state of execution of a process at an optional time point, such as the state of memories or registers, is saved, the program is suspended and re-started later. This function is sometimes termed checkpoint re-start function.

SUMMARY OF THE DISCLOSURE

In transmitting data from the normal system via a relaying device to a standby system, the following problem is encountered. The relaying device sends data received from a normal system to a standby system and, on receipt of a notice on the completion of reception from the standby system, notifies the effect of the completion of transmission to the normal system. The normal system does not switch to the next processing unless it receives a notice on the completion of transmission from the relaying device. As a result, considerable time is needed since data transfer from the normal system to the relaying device until start of the next processing. In particular, should a relaying device or a standby system be provided as measures against possible breakout of disasters, the relaying device is provided in a place remote from the normal system, whilst a standby system is provided in a still more remote place. As a result, considerable time is needed for transmitting/receiving data or notices between the normal system and the relaying device or between the relaying device and the standby system, thus retarding the start of the next operation in the normal system.

For example, the round trip time (the reciprocating time since data transfer until receipt of a response) in the communication with a point 100 km apart is on the order of milliseconds (msec). The host prosecutes the respective processing operations within time of the order of microseconds (μsec). Thus, the time until acquisition of the response to the communication gives rise to retarded processing.

Moreover, if data is discarded in terms of a data transfer unit, such as a packet, in the data transfer process, the storage unit of the normal system, as a source of transmission, has to re-transmit data. That is, more time is taken until completion of the data transfer, thus further retarding the start of the next operation.

In addition, if data backup operations are carried out from the normal system to the standby system, the amount of data to be transferred is increased, in addition to the data transfer distance being extremely long, thus further protracting the time for transmission.

Moreover, should an abnormality occur in the normal system, the standby system is not necessarily in a position to start processing immediately. For example, it is assumed that, when a certain processing X is to be started, writing of data A and B in a storage unit must be completed. If the host of the normal system outputs a write command for writing the data A to the storage unit and effects mirroring, the data A is reflected in the storage unit of the standby system. It is now assumed that an abnormality has occurred in the normal system. Since the data B is not written in the storage unit of the standby system, the processing X cannot be started immediately. For starting the processing in the standby system, it is necessary to write data B in the storage unit of the standby system to start the processing X, or to delete the data A to re-start the processing as from a step before the processing X. Thus, a long time is needed until the re-starting of the processing in the standby system.

Additionally, there are occasions where the functions of enabling the re-starting of the processing when the data recording state is a preset data recording state are not implemented in the application program. For example, there are occasions where the function which enables the processing to be re-started when the host has written the data A and B in the storage unit is not implemented in the above instance. The function which enables processing to be re-started when the storage unit is in a preset data recording state is termed below the [re-start function]. It is desirable that, if an abnormality occurs in the normal operating device, the standby system is able to promptly re-start the processing, even in case the re-start function is not implemented in the application program.

Accordingly, it is therefore an object of the present invention to enable a normal system to start next processing promptly when data is to be transmitted via a relaying device to a standby system. It is another object of the present invention to enable the data transfer/reception promptly in case data has been discarded in a transmission process. It is a further object of the present invention to enable the standby system to prosecute the processing in case of occurrence of an abnormality in the normal system.

The above and other objects are attained by a data copying system, in accordance with an aspect of the present invention, in which data in a first storage unit is copied by mirroring or backup to a second storage unit over a communication network, and which comprises a relaying device for relaying data transferred from the first storage unit to the second data storage unit. The relaying device is provided in a location pre-calculated so that, even if the first storage device cannot be operated due to a disaster, the operation of the relaying device can be continued. The first storage unit includes data transfer processing means for controlling the data transfer. The data transfer processing means deems that data transfer to the second storage device is completed when data transfer to the relaying device is completed.

The relaying device in accordance with another aspect of the present invention includes non-volatile storage means for storing a command and data received from the first storage unit and relaying processing means for relay controlling the data. The relaying processing means may cause the command and the data received from the first storage unit to be stored in the non-volatile storage means and transmit the so stored command and data at an optional timing to the second storage unit. With this configuration, it is possible to reduce the management cost of the communication cost of a communication network interconnecting the relaying device and the second storage unit.

In a system according to another aspect of the present invention, a plurality of relaying devices may be provided, in which case the data transfer processing means in the first storage unit may simultaneously transmit data in the first storage unit to the plural relaying devices.

With this configuration, the data may be transmitted more promptly.

A relaying device in accordance with another aspect of the present invention, for relaying data transferred from a first storage unit to a second storage unit, comprises storage means for storing the data received from the first storage unit and relaying processing means for executing relay control of data. The relaying processing means causes data received from the first storage unit to be stored in storage means. The relaying processing means sends a response to the first storage unit when the data is stored in the storage means. The relaying processing means also sends the data stored in the storage means to the second storage unit when the data is stored in the storage means.

A data transmitting/receiving method in accordance with another aspect of the present invention, comprises the steps of: a source of transmission forming at least one redundant data for error correction from original data to be transferred; and the source transmitting the original data and the redundant data in separate data transmitting units.

Preferably, in the method according to the present invention, the destination of transmission executes error correction processing before completion of reception of an entire assemblage of data comprised of a set of the original data and the redundant data, at a stage when a portion of the data set enabling partial error correction of the original data has been received. With this method, it is unnecessary for the source of transmission to re-transmit data even though a portion of data is discarded in the transmission process.

For example, in the method according to the present invention, the source of transmission divides the original data into divided data and creates redundant data enabling restoration of the original data even on erasure of one or more of the divided data.

In the method according to the present invention, for example, parity data or ECC may be used as redundant data.

In the method according to the present invention, as redundant data, copied data of transmission data may be used.

In the method according to the present invention, the original data and the redundant data may be sent over separate communication networks. With this method, if a trouble has occurred on one of the communication networks, processing can be prosecuted by data received from the remaining network.

In a data copying system in accordance with one aspect of the present invention, in which data in a first storage unit is copied by mirroring or backup to a second storage unit over a communication network, the first storage unit includes data transfer processing means for controlling data transfer and redundancy processing means for creating at least one redundant data for error correction from the original data transmitted. The data transfer processing means sends the original data and the redundant data created by the redundancy processing means in separate data transfer units.

In the data copying system according to the present invention, the second storage unit preferably includes data restoration means for executing error correction processing using the redundant data received from the first storage unit and storage processing means for storing the data restored by the data restoration means on a recording medium. Also preferably, the data restoration means executes error correction processing before completion of reception of an entire assemblage of data comprised of a set of the original data and the redundant data, at a stage when a portion of the data set enabling partial error correction of the original data has been received.

In the data copying system according to the present invention, for example, the redundancy processing means in the first storage unit divides the original data into divided data and creates redundant data enabling restoration of the original data even on erasure of one or more of the divided data.

In the data copying system according to the present invention, the redundancy processing means may use parity data or ECC as redundant data.

In the data copying system according to the present invention, the redundancy processing means may use copied data of transmission data as the redundant data.

In the data copying system according to the present invention, the data transfer processing means may send the original data and the redundant data over separate communication networks. With such structure, even if a trouble has occurred on one of the plural communication networks, processing can be prosecuted by data received over the remaining network.

In accordance with another aspect of the present invention, there is also provided a data copying system in which data in a storage unit of an operation system is copied to a storage unit of a standby system over a communication network by mirroring, wherein the storage unit of the operation system including delay write requesting means for transmitting data as a target of writing and a delay write request to the storage unit of the standby system on occurrence of a data write request, and write execution requesting means for sending a delay write execution request to the storage unit of the standby system on receipt from a higher rank device of a restart enabling point notification notifying that the time is now the restart enabling point for which an application may directly restart the operation for the prevailing data state. The storage unit of the standby system includes temporary storage means for transiently storing data and storage processing means for storing received data in the temporary storage means responsive to the delay write request received and for storing the data stored in the temporary storage means in the recording medium on receipt of the delay write execution request.

In the data copying system according to the present invention, the delay write requesting means and the delay write execution requesting means in the storage unit of the operation system asynchronously transmit a delay write request and a delayed write execution request to the storage unit of the standby system. The storage processing means in the storage unit of the standby system on receipt of one delay write execution request causes data stored in the temporary storage means to be stored in the recording medium when data associated with the delay write request transmitted between a delay write execution request directly previous to the one delay write execution request and the one delay write execution request have all been stored in the temporary storage means and when the data transmitted before the directly previous delay write execution request have been stored in the recording medium.

In the data copying system according to the present invention, when an abnormality has occurred in the operation system, the storage processing means in the storage unit of the standby system discards data stored in the temporary storage means.

In accordance with another aspect of the present invention, there is also provided a data copying system in which data in a storage unit of an operation system is copied by mirroring to a storage unit of a standby system over a communication network, wherein the storage unit of the standby system includes write requesting means which, on occurrence of a data write request, sends data to be written and a write request to the storage unit of the standby system, and snap shot formulation requesting means for transmitting a snap shot forming request to the storage unit of the standby system on receipt from a higher rank device of a restart enabling point notification notifying that the time is now the restart enabling point for which an application may directly restart the operation for the prevailing data state. The storage unit of the standby system includes snap shot forming means which, on receipt of a write request, allocates an area for writing data corresponding to the write request to store the data in the recording medium and to update the storage information indicating the state of data storage in the recording medium. The snap shot forming means forms a snap shot on receipt of the snap shot forming request.

In the data copying system according to the present invention, when the snap shot forming means of the storage unit of the standby system forms a snap shot, the write requesting means sends a write request to the storage unit of the standby system after the snap shot forming means has completed forming the snap shot.

In the data copying system according to the present invention, the write requesting means and the snap shot formulation requesting means in the storage unit of the operation system may asynchronously transmit the write request and the snap shot forming request to the storage unit of the standby system. The snap shot forming means in the storage unit of the standby system on receipt of each write request awaits storage of data corresponding to the write request in the recording medium until the snap shot based on the snap shot forming request directly before the received write request is formed completely. On receipt of one snap shot forming request, the snap shot forming means forms a snap shot when a snap shot based on the directly previous snap shot forming request is completed and all data corresponding to the write request transmitted between the directly previous snap shot forming request and the one snap shot forming request have all been stored in the recording medium.

In the data copying system according to the present invention, when an abnormality has occurred in an operation system, the snap shot forming means in the storage unit of the standby system frees the area of the recording medium, where data has been stored after forming the directly previous snap shot, to a non-use state, to restore the stored information to the state at the time of forming the directly previous snap shot.

In the data copying system according to the present invention, a higher rank (upper level) device of the operation system employing the storage unit of the operation system may include restart enabling point notification means for sending a restart enabling point notification to the storage unit of the normal system when the time is the restart enabling point. A higher rank device of the standby system employing the storage unit of the standby system on detection of an abnormality of the operation system notifies the storage unit of the standby system of the occurrence of an abnormality to prompt restoration of the status of the storage unit of the standby system to a state corresponding to the restart enabling point to restart the processing when the state of the storage unit of the standby system is the state corresponding to the restart enabling point.

In the data copying system according to the present invention, the higher rank device of the operation system employing the storage unit of the operation system may include execution image transfer means for transferring an execution image indicating the processing executing state of the operation system to a higher rank device of the standby system employing the storage unit of the standby system, and optional time point restart enabling point notification means for transmitting a restart enabling point notification at a timing of the execution image transmitting means transmitting an execution means. The higher rank device of the standby system employing the storage unit of the standby system may include execution image saving means for saving an execution image transferred by the execution image transfer means. The execution image transfer means transfers an execution image at an optional time point to a higher rank device of the standby system. On detection of an abnormality of the operation system, a higher rank device of the standby system employing the storage unit of the standby system notifies the storage unit of the standby system of the occurrence of an abnormality to prompt restoration of the status of the storage unit of the standby system to a state corresponding to the restart enabling point to restart the processing, using an execution image when the state of the storage unit of the standby system is the state corresponding to the restart enabling point.

In the data copying system according to the present invention, the execution image transferring means in the higher rank device of the operation system transfers only the portion changed from the execution image transferred last time.

In accordance with another aspect of the present invention, there is also provided a computer program product comprising a computer usable medium having computer readable program code therein, said program code causing a computer provided in a relaying device in a data copying system, in which data in a first storage unit is copied by mirroring or backup to a second storage unit via a communication network and the relaying device to execute the steps of: causing storage of data received from the first storage unit in a recording medium in the relaying device; sending a response to the first storage unit on storage of data in the recording medium in the relaying device, and sending the data stored in the recording medium in the relaying device to the second storage unit.

In accordance with another aspect of the present invention, there is also provided a computer program product for copying data in a storage unit by execution by a computer, provided in a first storage unit in a data copying system in which data in the first storage unit is copied to a second storage unit, by mirroring or backup, over a communication network, of forming at least one redundant data for error correction from transmitted original data, and sending the original data and the redundant data by separate data transfer units.

In accordance with another aspect of the present invention, there is also provided a computer program product for copying data in a storage unit by execution by a computer, provided in a storage unit of an operation system in a data copying system in which data in the storage unit of the operation system is copied by mirroring to a storage unit of the standby system over a communication network, of a processing of sending data to be written and a delay write request instructing storage of the data in a temporary storage device to the storage unit of the standby system, on occurrence of a data write request, and a processing of sending to the storage unit of the standby system a delay write execution request instructing storage in the recording medium of data stored in the temporary storage device on receipt from a higher rank device of a restart enabling point notification notifying that the time is now the restart enabling point for which an application may directly restart the operation for the prevailing data state.

In accordance with another aspect of the present invention, there is also provided a computer program product for copying data in a storage unit by execution by a computer, provided in a storage unit of an operation system in a data copying system in which data in the storage unit of the operation system is copied by mirroring to a storage unit of the standby system, over a communication network, of a processing of sending data to be written and a write request instructing writing the data in a recording medium, to the storage unit of the standby system, on occurrence of a data write request, and a processing of sending to the storage unit of the standby system a snap shot forming request on receipt from a higher rank device of a restart enabling point notification notifying that the time is now the restart enabling point for which an application may directly restart the operation for the prevailing data state Still other objects and advantages of the present invention will become readily apparent to those skilled in this art from the following detailed description in conjunction with the accompanying drawings wherein only the preferred embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

PREFERRED EMBODIMENTS OF THE INVENTION

Figure 1:
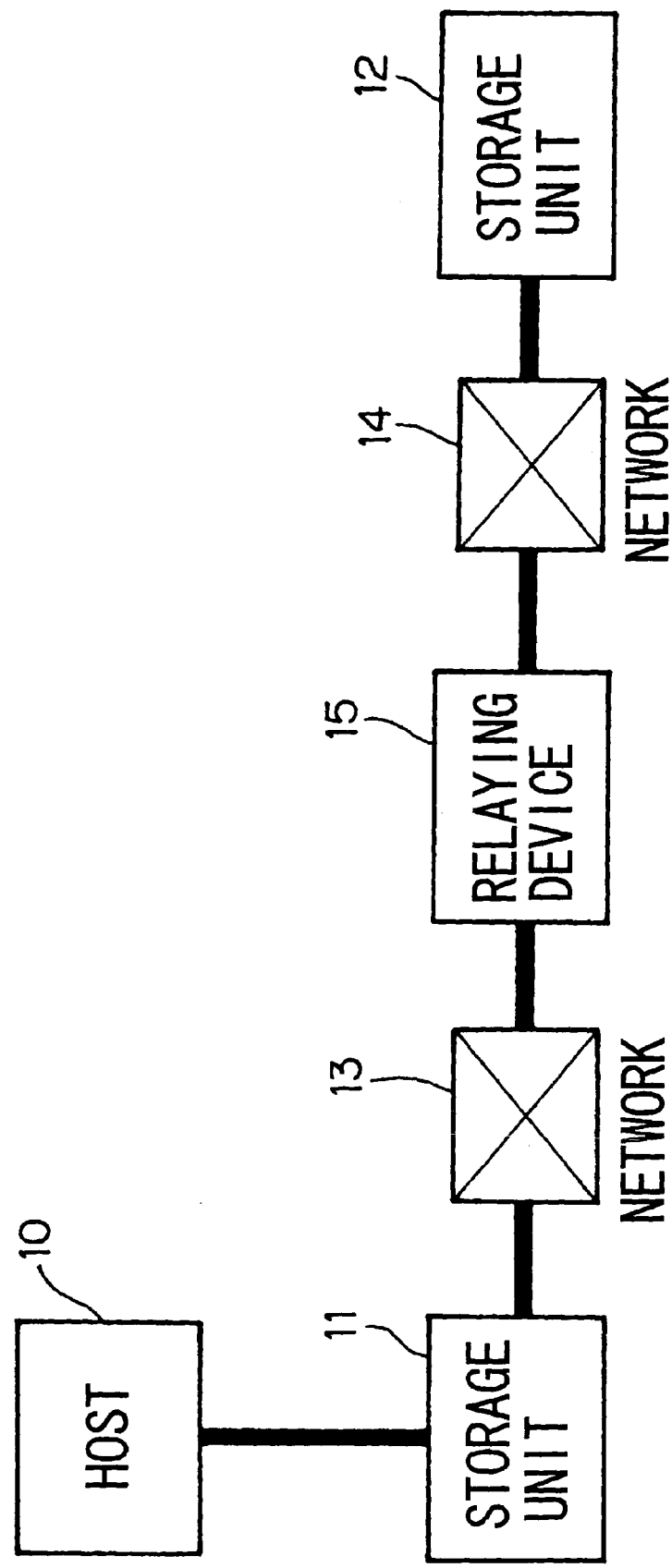
FIG. 1 is a block diagram showing a first embodiment of a data copying system.

Referring to the drawings, several preferred embodiments of the present invention are explained in detail.

Embodiment 1

FIG. 1 is a block diagram of showing a configuration of a data copying system according to a first embodiment of the present invention. In the data copying system, shown in FIG. 1, a storage unit 11 is locally connected to a host 10 (host computer) which utilizes the storage unit 11. The storage unit 11 is connected to a relaying device 15 over a communication network (referred to below as network) 13, such as the Internet or a leased line. The relaying device 15 is connected over a network 14 to a storage unit 12.

The storage units 11 and 12 may, for example, be each a unit magnetic disc device, a unit optical disc device or a unit magneto-optical disc device. As the storage units 11 and 12, a disc array device, which is a set of unit magnetic disc devices, unit optical disc devices or unit magneto-optical disc devices, may be used. The host 10 and the storage unit 11 are interconnected by for example the SCSI, Fiber channel or Ethernet (registered trademark).

Figure 2:
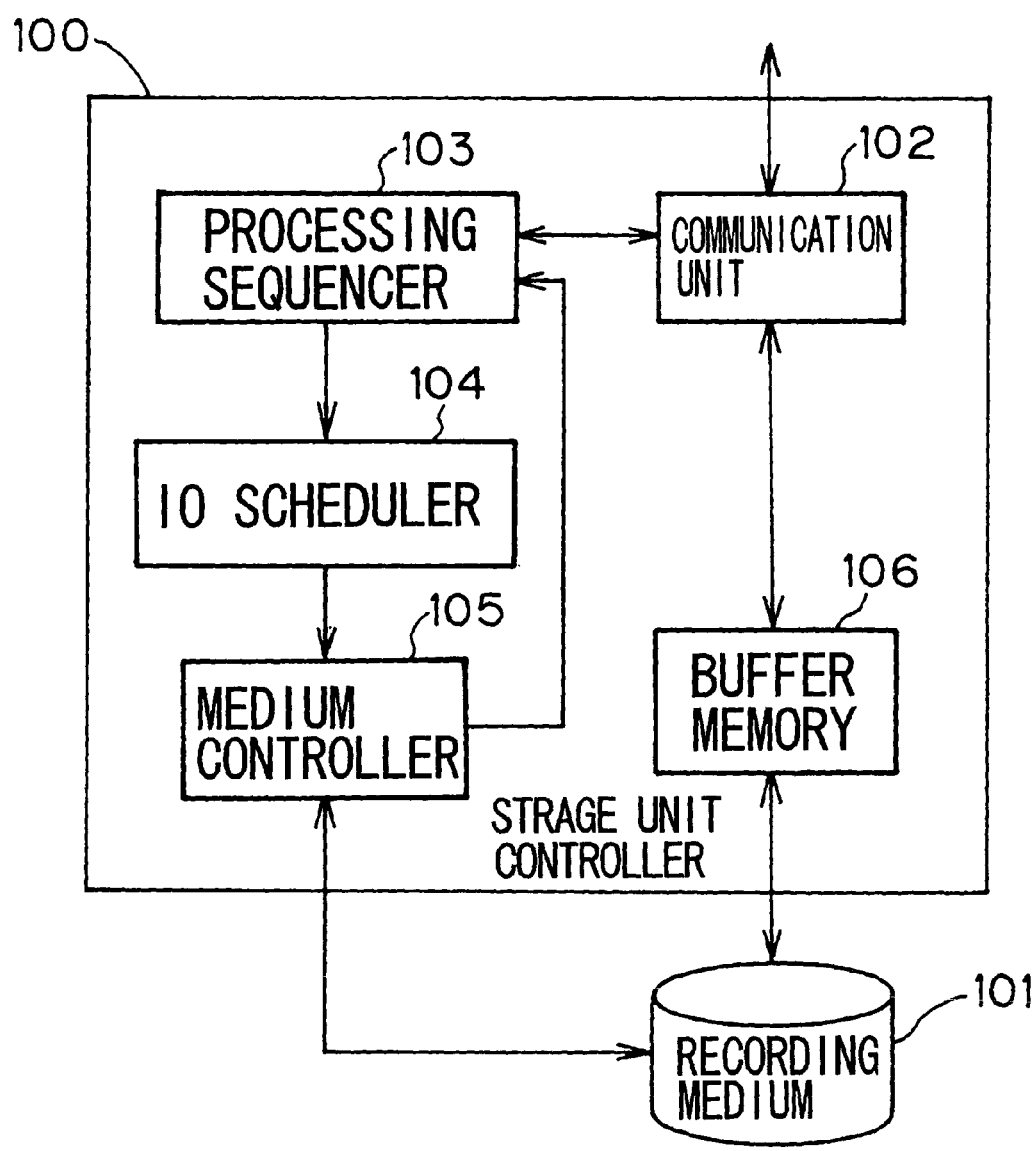
FIG. 2 is a block diagram showing an illustrative structure of a storage system.

FIG. 2 is a block diagram showing an illustrative configuration of the storage unit 11 shown in FIG. 1. Meanwhile, the storage unit 12 is also configured as shown in FIG. 2. The storage unit 11 includes a storage unit controller 100 and a recording medium 101 as a main part of the storage unit 11. The storage unit controller 100 includes a communication unit 102 for communication with the host 10, other storage units or with the relaying device, a processing sequencer 103 for supervising the sequences of various processing operations, an IO scheduler 104 for managing sequence control of processing commands for the recording medium 101, a medium control unit 105 for controlling the operations of the recording medium 101 in accordance with processing commands issued by the IO scheduler 104, and a buffer memory 106 for storing temporarily data from e.g. the host 10 to the recording medium 101 or from the recording medium 101 to the host 10. The processing sequencer 103 is implemented by for example a CPU operating in accordance with a preset program.

FIG. 2 shows a case involving only one set of the medium control unit 105 and the recording medium 101 combined together. It is also possible for the storage units 11 and 12 to be each composed of plural recording mediums 101 and for each of these recording mediums to include the medium control unit 105. However, only one IO scheduler 104 is provided in each of the storage units 11 and 12. If there are plural recording mediums 101, the processing sequencer 103 specifies the recording medium as a target of a processing command, while the IO scheduler 104 causes the medium controller 105 associated with the specified recording medium to perform the processing operations.

Figure 3:
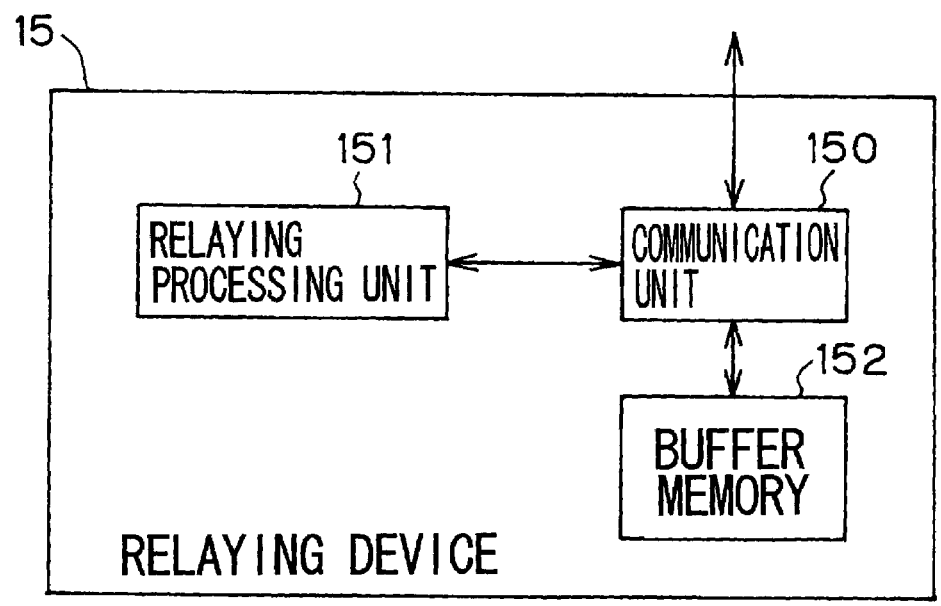
FIG. 3 is a block diagram showing an illustrative structure of a relaying device.

FIG. 3 depicts a block diagram showing an example of a configuration of the relaying device 15 shown in FIG. 1. The relaying device 15 includes a communication unit 150 for communication with the storage units 11 and 12, a relaying processor 151 for performing sequence management of the relay processing, and a buffer memory 152 for storing temporarily data received from the storage units 11 and 12.

The relaying processor 151 is implemented as a CPU operating for example in accordance with a preset program.

Referring to FIGS. 1 and 2, the storage unit 11 is provided with a communication unit 102 and the storage unit 11 by itself performs the role of transferring data. That is, the storage unit 11 directly sends the data to the relaying device 15, instead of the host 10 reading data from the storage unit 11 to send the data to the relaying device 15. The storage unit 12 also directly receives data from the relaying device 15. However, the timing for the storage unit 11 to send data to the relaying device 15 is commanded by the host 10.

The relaying device 15 is placed outside an area which is presumed to be affected by a disaster, such as earthquake, that may have broken out on installation sites of the units 11 and 12 are provided. That is, such location where the operations may be sustained even if the storage units 11 and 12 have become non-operative due to a disaster (or the distance from the storage units 11 and 12) is calculated at the outset, and the relaying device 15 is provided at the so calculated location. That is, the relaying device 15 is installed at such a position wherein, when the storage unit 11 is visited by an earthquake of a presupposed intensity (such as the intensity of 6 to 7), the scale of the earthquake experienced by the relaying device 15 is such that the relaying device is not damaged. Moreover, the relaying device 15 is installed at such a position where the data transmitting time between the storage unit 11 or 12 and the relaying device 15 will be shorter than the data transmitting time that will be needed when the data is directly transmitted between the storage unit devices 11 and 12. Consequently, the data copying system operates as a data management system resistant against breakout of disasters.

Figure 4:
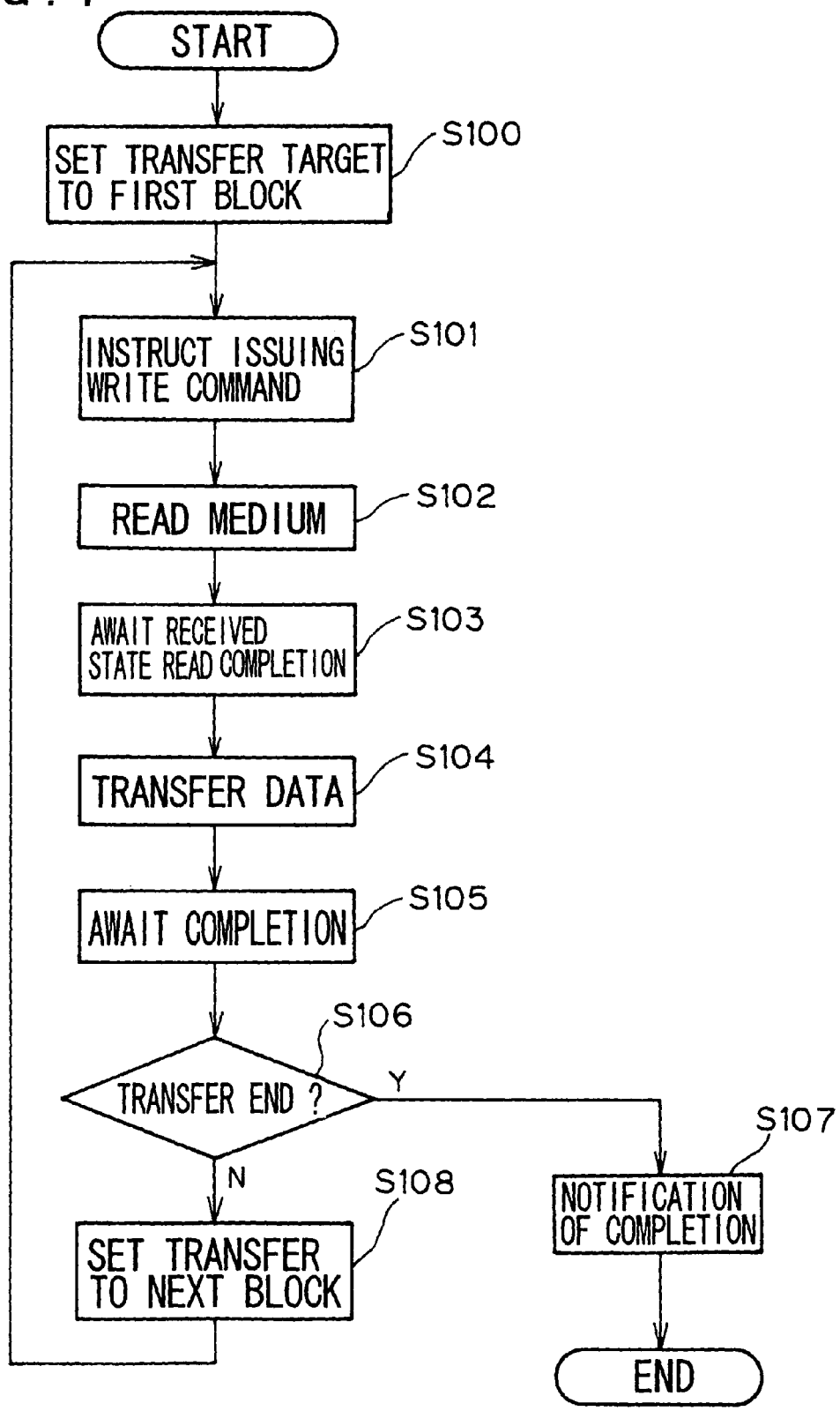
FIG. 4 is a flowchart showing the operation of a processing sequencer.
Figure 5:
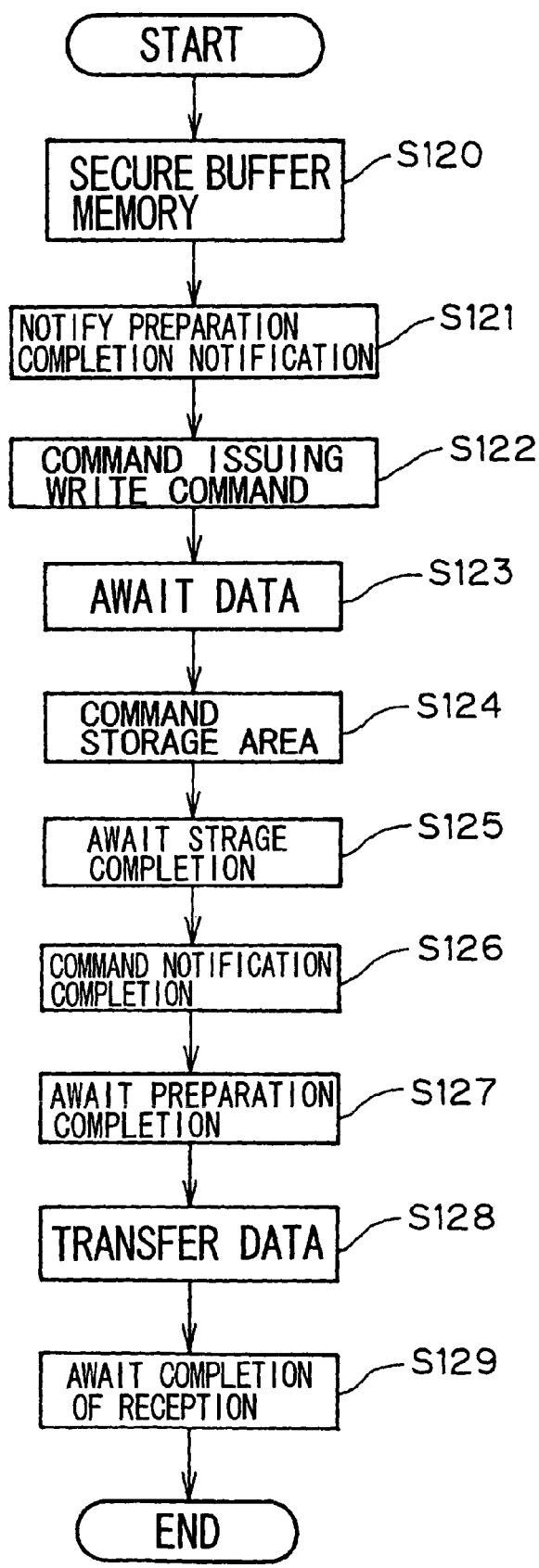
FIG. 5 is a flowchart showing the operation of a relay processing unit.

The operation of the data copying system is now explained by referring to the flowcharts of FIGS. 4 and 5. A case in which the storage unit 11 as a source of data transfer is transmitting data to the storage unit 12 as a destination of the data transfer by way of backup processing is explained in the below. FIG. 4 depicts a flowchart showing the operation of the processing sequencer 103 in the storage unit controller 100 and FIG. 5 depicts a flowchart showing the operation of the relaying processor 151 in the relaying device 15.

In executing backup processing, the host 10 outputs a copy command to the communication unit 102 in the storage unit controller 100 of the storage unit 11. The copy command is a command for backup. In this copy command are contained the information specifying the range of data to be copied, that is the range of data for backup processing, and the information specifying the storage unit of the destination of copying. On receipt of the copy command, the communication unit 102 delivers the copy command to the processing sequencer 103 to command the processing sequencer 103 to start the copying processing.

As shown in FIG. 4, on receipt of the copy command, the processing sequencer 103 sets the leading block, in the data range to be copied, as a block of data for transmission (step S100). The processing sequencer 103 then instructs the communication unit 102 to send the write command to the relaying device, associated with the storage unit of the destination of copying, as specified by the copy command (step S101). In the write command, there is contained the information specifying the block size, that is data amount. A read request for reading data to be transferred is also registered in the IO scheduler 104. This IO scheduler 104 is responsive to the read request to instruct the medium controller 105 to read out data for transmission. The medium controller 105 is responsive to the read command to output data to be transferred from the recording medium 101 to the buffer memory 106 (step S102). When the totality of data to be transferred are output from the recording medium 101 to the buffer memory 106, the medium processing unit (medium controller) 105 outputs a read completion notice to the processing sequencer 103.

The processing sequencer 103 awaits both a message for completion of preparation for reception from the relaying device 15, supplied through the communication unit 102, and a notice for the read completion from the medium control unit 105 (step S103). On receipt of both, the processing sequencer 103 instructs the communication unit 102 to send the data stored in the buffer memory 106 to the relaying device 15. Responsive to this instruction, the communication unit 102 sends data stored in the buffer memory 106 to the relaying device 15 (step S104). The processing sequencer 103 awaits the message for completion of preparation for reception from the relaying device 15, supplied through the communication unit 102 (step S105).

The communication unit 102 sends the totality of data stored in the buffer memory 106 to the relaying device 15. On receipt of the message for completion of preparation for reception from the relaying device 15, the communication unit 102 outputs the message for completion of preparation for reception to the processing sequencer 103. On receipt of the message for completion of preparation for reception, the processing sequencer 103 confirms whether or not the transfer of the totality of the data in the copy range to the relaying device 15 has been completed (step S106). If the data transfer has not been completed, the processing sequencer 103 sets the block next following the data copy range as a block for data transfer (step S108) to then go back to the step S101.

If the transfer of the totality of the data in the copy range has been completed, the processing sequencer 103 instructs the communication unit 102 to output the notice of completion to the host 10 (step S107) and terminates the processing.

The amount of data for one block is set to a value which is predetermined in the system at the outset. It is also possible for the processing sequencer 103 to change the amount of data for one block depending on the capacity of the buffer memory 106 of the storage unit 12 of the destination of transmission and that of the buffer memory 152 of the relaying device 15.

The processing sequencer 103 registers in the IO scheduler 104, the type of the processing (read/write), an ID for specifying the processing, and the information specifying an area of the buffer memory 106 which is to be processed. There are occasions where the processing sequencer 103 specifies a plural number of read processing commands or a plural number of write processing commands. The ID for specifying the processing is used for discriminating the various processing operations. Thus, in the processing shown in FIG. 4, the processing sequencer 103 in registering a data read request of data to be transferred registers the ID for identifying the type of the processing and the read processing, while also registering a block of data to be transferred as an area in the recording medium 101 as a target of processing. If there are a plural number of recording mediums, the processing sequencer 103 also registers the information for specifying the recording mediums. The processing sequencer 103 verifies which processing has been completed, based on the ID specified at the time of registration.

The IO scheduler 104 records the processing registered by the processing sequencer 103. The IO scheduler 104 selects a recorded processing in accordance with a predetermined algorithm to get the taken-out processing executed by the medium control unit 105. The predetermined algorithm may be exemplified by for example the sequence of registration. The processing which minimizes the movement distance of the magnetic head or the optical head of the recording medium 101 from the current position to the position of the target of the processing may be initially selected. If the storage unit 11 is a disc array device including a plural number of the recording mediums 101 and the medium control unit 105 is provided in association with each recording medium, the IO scheduler 104 selects the processing for the recording medium 101 taken charge of by the medium control unit 105 associated with the recording medium 101 the processing of which was attempted to be taken out.

When the processing being executed by the medium control unit 105 has been finished, the IO scheduler 104 takes out the next processing. When the processing is the read processing, the medium control unit 105 causes the recording medium 101 to read out data from the area specified on the recording medium 101 to cause the read data to be written in the specified area of the buffer memory 106. When the processing is the write processing, the medium control unit 105 causes the recording medium 101 to write the data from the specified area in the recording medium 101 to write the read-out data of the specified area of the buffer memory 106 in the specified area on the recording medium 101. When the processing is finished, the relaying device 15 notifies the processing sequencer 103 of the completion of the processing.

If the data supplied from outside is a message of the control system, such as command, message for completion of preparation for reception or the message for completion of reception, the communication unit 102 delivers the input data to the processing sequencer 103. If the data supplied from outside is the data to be written in the storage unit 11, the communication unit makes an inquiry to the processing sequencer 103 as to the site for data storage. The communication unit 102 causes the data to be stored in the area of the buffer memory 106 specified by the processing sequencer 103.

The communication unit 102 also performs the processing of transmitting the command specified by the processing sequencer 103 or the notice of completion to the specified relaying device or to the host. Additionally, the communication unit performs the processing of transmitting data in the buffer memory 106 specified by the processing sequencer 103 to the specified relaying device or to the host.

On receipt of the notice for completion from the storage unit 11, that is, on completion of data transfer to the relaying device 15, the host 10 recognizes that data transfer from the storage unit 11 to the storage unit 12 has been finished.

The operation of the relaying device 15 is now explained. In the relaying device 15, data from the storage units 11 and 12 (command or transferred data) is received by the communication unit 150. On receipt of the write command, sent from the storage unit 11 in the step S101, the communication unit 150 delivers the write command to the relaying processor 151.

The relaying processor 151 acquires an area necessary for storage of data, sent from the storage unit 11, in the buffer memory 152, as shown in FIG. 5 (step S120). Based on the information on the amount of data, contained in the write command, the relaying processor 151 acquires the area necessary for storage of the data, and instructs the communication unit 150 to send the notice of completion of preparation for reception to the storage unit 11 (step S121). Responsive to the instruction, the communication unit 150 sends a message for completion of preparation for reception to the storage unit 11. The relaying processor also instructs the communication unit 150 to send the write command to the storage unit 12 (step S122). The communication unit 150 is responsive to the instruction to send the write command to the storage unit 12. This write command is the command to cause the data received from the storage unit 11 to be written on the storage unit 12.

The relaying processor awaits data arrival from the storage unit 11 (step S123). On receipt of the data and an inquiry from the communication unit 150 as to the area of the buffer memory 152 in which to store the data, the relaying processor advises the communication unit 150 of the area acquired in the step S120 (step S124). The relaying processor 151 awaits completion of storage of the data in the buffer memory 152 (step S125). On receipt of a notice from the communication unit 150 to the effect that the totality of data has been stored in the buffer memory 152, the relaying processor instructs the communication unit 150 to notify the storage unit 11 of the completion of the write command (step S126). The communication unit 150 is responsive to the instruction to transmit a message of the completion of reception to the storage unit 11.

The relaying processor 151 awaits transmission of the completion of preparation from the storage unit 12 (response to the write command sent in the step S122) (step S127). When notified from the communication unit 150 of the receipt of the message for completion of preparation from the storage unit 12, the relaying processor causes the communication unit 150 to send the data stored in the buffer memory 152 to the storage unit 12 (step S128). The relaying processor then awaits transmission of a message on completion of reception from the storage unit 12 (step S129). When notified from the communication unit 150 of the receipt of the message for completion of reception from the storage unit 12, the relaying processor terminates the processing.

On receipt of a command from outside, the communication unit 150 sends the received command to the relaying processor 151. On receipt of various messages from outside, the communication unit 150 notifies the relaying processor 151 of the receipt of the messages. If data is received, the communication unit inquires the relaying processor 151 of the area of the buffer memory 152 in which to store the data, and causes the data to be stored in the specified area in the buffer memory 1 152. Moreover, the communication unit is responsive to the instruction from the relaying processor 151 to transmit the specified message to the specified storage unit. If the area in the buffer memory 152 and the storage unit of the destination of transmission are specified, the communication unit sends the data in the area to the specified storage unit.

If, when the relaying processor 151 determines the storage unit of the destination of data transferred, the storage unit of the destination, the storage unit 12 in the present embodiment, is fixedly determined, no particular selecting processing is carried out. However, if the storage unit of the destination is determined responsive to the storage unit of the source, the storage unit 11 in the present embodiment, the processing of selecting the storage unit of the destination is carried out depending on the storage unit which is the source of data transfer. There is an occasion where the destination is specified by the storage unit of the source prior to the data transfer to the storage unit of the destination. Meanwhile, the data stored in the buffer memory 152 is discarded on completion of data transfer to the storage unit of the destination (storage unit 12 in the present embodiment).

On receipt of the write command transmitted in the step S122 by the relaying device 15, the communication unit 102 of the storage unit 12 delivers the write command to the processing sequencer 103. This processing sequencer 103 acquires an area in the buffer memory 106 necessary for storage of data sent from the relaying device 15. The processing sequencer 103 causes the communication unit 102 to send a message of the completion of preparation to the relaying device 15. This message of the completion of preparation is the message awaited by the relaying device 15 in the step S127. When data is sent from the relaying device 15, the communication unit 102 of the storage unit 12 makes an inquiry at the processing sequencer 103 of an area in which to store the data to cause the data to be stored in the buffer memory 106. After storage of the totality of the data, the communication unit sends the message as to the completion of reception to the relaying device 15. This message as to the completion of reception is the message awaited by the relaying device 15 in a step S129. After storage of the data in the buffer memory 106, the processing sequencer 103 of the storage unit 12 registers the sort of the processing (herein the writing), the identification ID of the processing, the information as to the area in the recording medium 101 to be processed and the information indicating the area in the buffer memory 106 being processed, in the IO scheduler 104. The IO scheduler 104 is responsive to the write request to command the medium control unit 105 to write the data as the target of writing. The medium control unit 105 is responsive to the contents of registration to effect data writing from the buffer memory 106 to the recording medium 101.

In the present embodiment, the relaying device 15 is installed at a side which is outside a range of the area estimated to be affected by a disaster, such as earthquake, when such disaster breaks out on the installation site of the storage unit 11. Moreover, relaying device 15 is installed in such a place that the data transfer time between the storage unit 11 and the relaying device 15 is shorter than the data transfer time when the data is directly transferred between the storage unit 11 and the relaying device 15. If, when the data is being transferred from the storage unit 11 to the storage unit 12 for backup, data transfer to the relaying device 15 comes to a close, the host 10 employing the storage 11 recognizes that data transfer from the storage unit 11 to the storage unit 12 has been completed.

Thus, even if the storage unit 11 is affected by a disaster, the relaying device 15 is not, and moreover the data transfer time from the storage unit 11 to the relaying device 15 is short, resistance against disasters is improved. Moreover, since the host 10 is able to commence the next processing without awaiting the data saving in the storage unit 12, processing delay caused by data transfer may be diminished.

Embodiment 2

Figure 6:
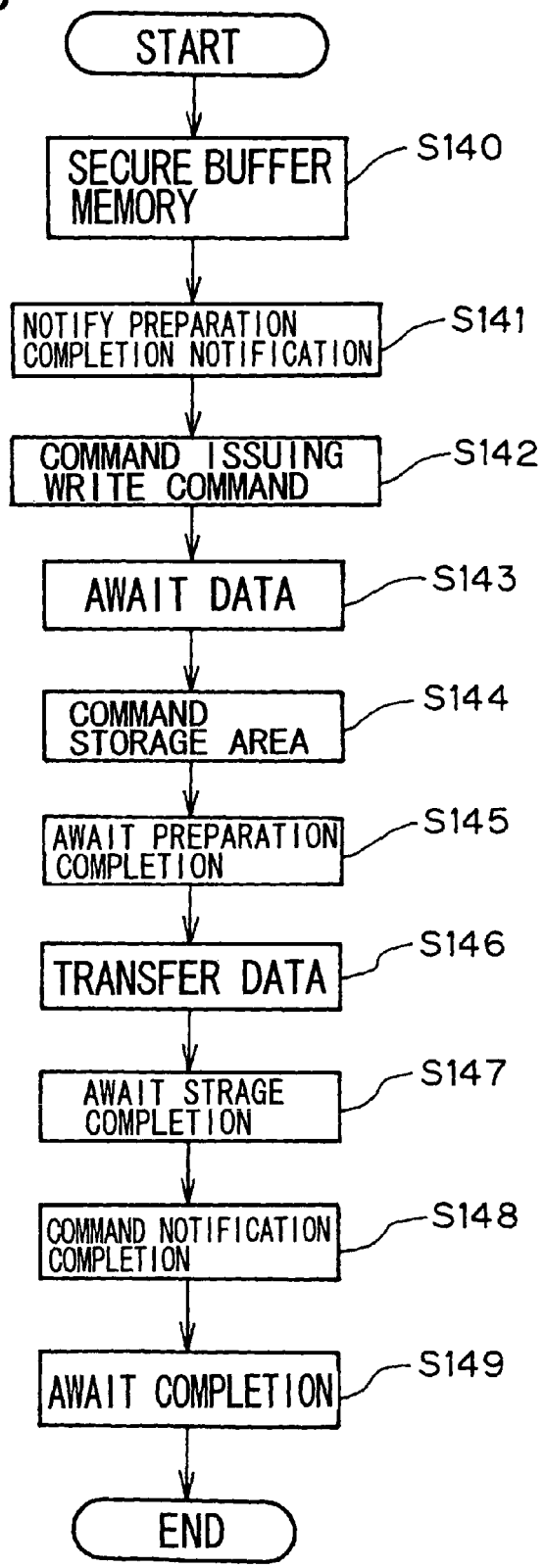
FIG. 6 is a flowchart showing the operation of a relaying processing unit of a second embodiment.

In the first embodiment, the relaying device 15 starts data transfer to the storage unit 12 after receiving the totality of one-block data from the storage unit 11. Alternatively, the relaying device 15 may start data transfer to the storage unit 12 without awaiting the completion of reception of one-block data from the storage unit 11. FIG. 6 depicts a flowchart showing the operation of the relaying processor 151 in the second embodiment which manages control to commence data transfer to the storage unit 12 without awaiting the completion of the data reception from the storage unit 11. Meanwhile, the structure of the data copying system, storage units 11 and 12 and the relaying device 15 is the same as that of the first embodiment (see FIGS. 1 to 3).

The relaying processor 151 receives the write command, sent by the storage unit 11 in the step S101, as in the first embodiment described above. The relaying device 15 then acquires an area necessary for storage of the data sent from the storage unit 11 in the buffer memory 152 (step S140), as shown in FIG. 6. Based on the information on the data amount contained in the write command from the storage unit 11, the relaying processor 151 acquires a data storage unit area, and instructs the communication unit 150 to send the notice for completion of preparation for reception to the storage unit 11 (step S141), while also instructing the communication unit 150 to send the write command to the storage unit 12 (step S142). This write command is the command for causing the data received from the storage unit 11 to be written in the storage unit 12.

The relaying processor 151 awaits data arrival from the storage unit 11 (step S143). On receipt of the arriving data and an inquiry from the communication unit 150 as to the area of the buffer memory 152 in which to store the data, the relaying processor advises the communication unit 150 of the area acquired in the step S140 (step S144). The relaying processor 151 awaits transmission of a message notifying the completion of preparation from the storage unit 12 (step S145). When notified from the communication unit 150 that the message notifying the completion of preparation from the storage unit 12 has been received, the relaying processor causes the communication unit 150 to transmit data stored in the buffer memory 152 to the storage unit 12 (step S146).

When the processing of step S146 is being performed, the data from the storage unit 11 is written in the buffer memory 152, and data read out from the buffer memory 152 is sent to the storage unit. At this time, the communication unit 150 manages control so that the data read position (read address) does not outpace the write position (write address). That is, when the read position has overtaken the write position, data read from the buffer memory 152 is discontinued.

The relaying processor awaits the completion of data storage unit in the buffer memory 152 (step S147) and, on receipt of a notice from the communication unit 150 that all data have been written in the buffer memory 152, the relaying processor instructs the communication unit 150 to notify the storage unit 11 of the completion of the write command (step S148). The relaying processor then awaits transmission of a message of the completion of reception from the storage unit 12 (step S149). When a notice is made from the communication unit 150 that the message of the completion of reception from the storage unit 12 has been received, the relaying processor terminates the processing.

In the present embodiment, data transfer from the relaying device 15 to the storage unit 12 may be completed at an earlier time than in the first embodiment. The operation of the storage units 11 and 12 is the same as that of the first embodiment.

Embodiment 3

Figure 7:
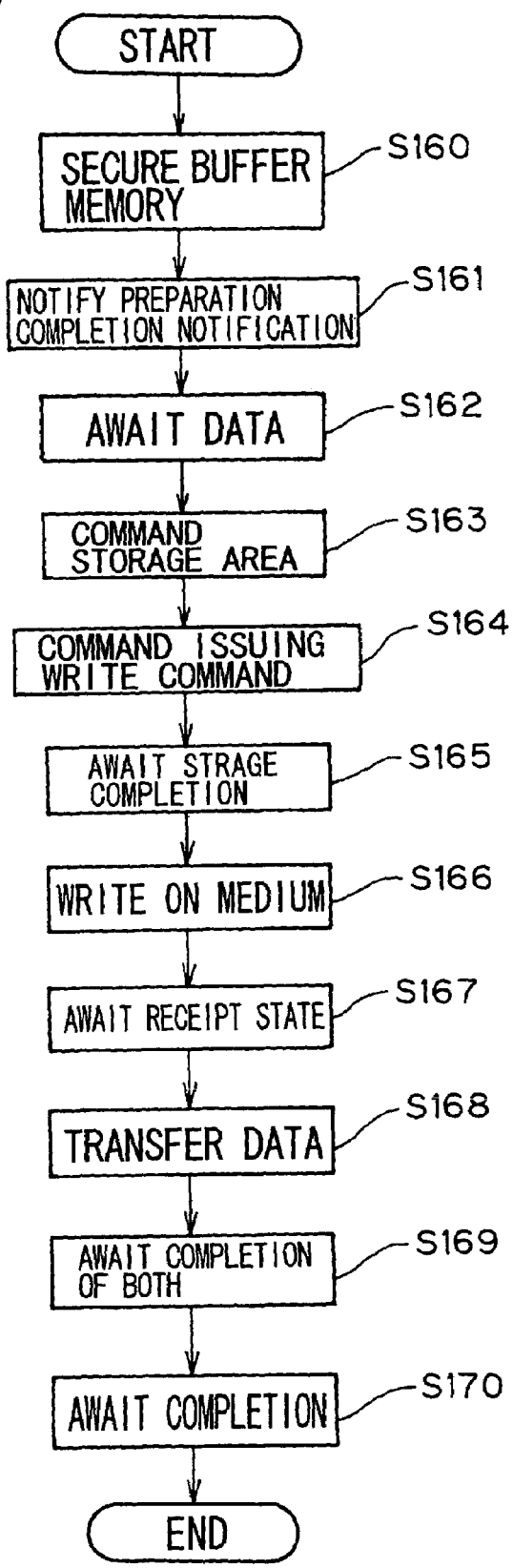
FIG. 7 is a flowchart showing the operation of processing sequencer of a third embodiment.

In the first and second embodiments, data backup for the storage unit 11 is realized. The data of the storage unit 11 may, however, be transferred by mirroring to the storage unit 12. FIG. 7 depicts a flowchart showing the operation of the processing sequencer 103 in the storage unit 11 in the storage unit controller 100 in a third embodiment, that is, in case of effecting the mirroring. Meanwhile, the configuration of the data copying system, storage units 11 and 12 and the relaying device 15 is the same as that of the first embodiment (see FIGS. 1 to 3). Moreover, in the storage unit 11, the operation of the communication unit 102, IO scheduler 104 and the medium control unit 105 is the same as that in the first embodiment.

The backup shown in the first and second embodiments is commenced on the occasion of the host 10 issuing a copy command to the storage unit 11. The mirroring of the third embodiment is commenced on the occasion of the host issuing a command instructing data writing to the storage unit 11.

On receipt of the write command from the host by the communication unit 102 of the storage unit 11, the communication unit 102 delivers the write command to the processing sequencer 103. The processing sequencer 103 then acquires an area necessary for storing the data received from the host 10 in the buffer memory 106, as shown in FIG. 7 (step S160). The processing sequencer 103 also instructs the communication unit 102 to send a notice on the completion of preparation to the host 10 (step S161). The communication unit 102 is responsive to the instruction to send the notice on the completion of preparation to the host 10.

The processing sequencer 103 then awaits data arrival from the host 10 (step S162). On receipt of the arriving data and an inquiry from the communication unit 102 as to the area of the buffer memory 106 in which to store the data, the relaying processor advises the communication unit 102 of the area acquired in the step S160 (step S163). The processing sequencer then instructs the communication unit 102 to send the write command to the relaying device 15 (step S164). The communication unit 102 is responsive to the instruction to send the write command to the relaying device 15.

The processing sequencer 103 then awaits the completion of data storage in the buffer memory 106 from the host 10 (step S165). When a notice is received from the communication unit 102 that the totality of the data have been stored in the buffer memory 106, the processing sequencer 103 registers in the IO scheduler 104 the type of processing (herein the writing), identification (ID) of the processing, the information indicating the area in the recording medium 101 as a target for processing and the information indicating the area in the buffer memory 106 as a target for processing. The IO scheduler 104 is responsive to the write request to instruct the medium control unit 105 to write data of interest. The medium control unit 105 effects data writing on the recording medium 101 from the buffer memory 106, depending on the contents of the registration (step S166).

The processing sequencer 103 awaits transmission of the completion of preparation of receipt from the relaying device 15 (response to the write command sent in the step S164) (step S167). When notified from the communication unit 102 of the receipt of the message for completion of preparation for reception from the relaying device 15, the processing sequencer 103 causes the communication unit 102 to send the data stored in the buffer memory 106 to the relaying device 15 (step S168). The processing sequencer then awaits transmission of a message on completion of reception from the relaying device 15 and a notice on the end of write completion from the medium control unit 105 (step S169). When the notice on the receipt of the write completion from the relaying device 15 is received from the communication unit 102, and a notice on the completion of writing is received from the medium control unit 105, the processing sequencer notifies the host 10 of the write completion (step S170) to terminate the processing. On receipt of the notice on the completion from the storage unit 11, that is, on completion of data transfer to the relaying device 15 and data writing on the recording medium 101, the processing sequencer recognizes that the mirroring has been completed.

The operation of the relaying device 15 relaying the data sent from the storage unit 11, or the operation of the storage unit 12 causing the data sent from the relaying device 15 to be stored in the recording medium 101, is the same as that of the first embodiment described above.

In the preset embodiment, the relaying device 15 is not affected by the disaster, even though the storage unit is affected by the disaster. Moreover, the data transfer time from the storage unit 11 to the relaying device 15 is short, resistance against disasters is improved. Additionally, the time as from transmission of the write command from the host until the start of the next processing may be shorter.

Embodiment 4

Figure 8:
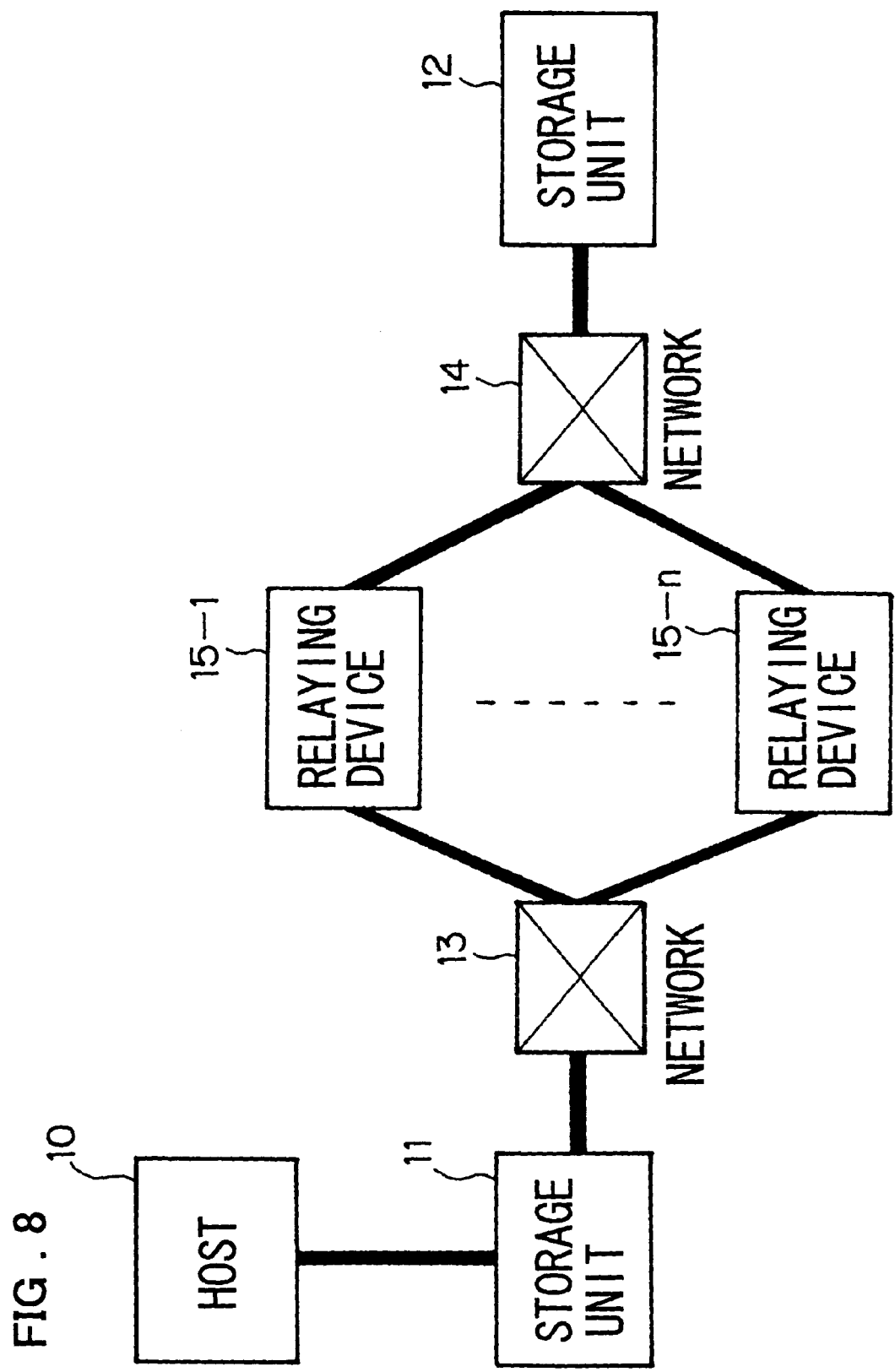
FIG. 8 is a block diagram showing a fourth embodiment of a data copying system.

FIG. 8 depicts a block diagram showing a configuration of the data copying system according to the fourth embodiment of the present invention. In the data copying system, shown in FIG. 8, a storage unit 11 is locally connected to a host 10 using the storage unit 11. The storage unit 11 is connected over a network 14 to a plurality of relaying devices 15-1 to 15-n. These relaying devices 15-1 to 15-n are similar in structure to the relaying device 15 of the first embodiment. The structure of the storage units 11 and 12 is the same as that of the storage units 11 and 12 of the first embodiment, while the structure of the relaying devices 15-1 to 15-n is the same as that of the relaying device 15 of the first embodiment. The operation of the relaying devices 15-1 to 15-n transferring the data received from the storage unit 11 to the storage unit 12 or the operation of the storage unit 12 storing the received data in the recording medium 101 is similar to the operation of the relaying device 15 or the storage unit 12 of the first embodiment described above.

The storage unit sends data on its own, as in the first embodiment described above. That is, the storage unit 11 directly sends the data to the relaying device 15, instead of the host 10 reading out data from the storage unit 11 to send the data to the relaying devices 15-1 to 15-n. Similarly, the storage unit 12 receives data directly from the relaying device 15. On the other hand, the relaying devices 15-1 to 15-n are mounted outside a range of the area estimated to be affected by a disaster, such as earthquake, when such disaster breaks out on the mounting sites of the storage units 11 and 12. Moreover, relaying devices 15-1 to 15-n are provided in such places that the data transfer time between the storage unit 12 and the relaying devices 15-1 to 15-n is shorter than the data transfer time when the data is directly transferred between the storage units 11 and 12.

Figure 9:
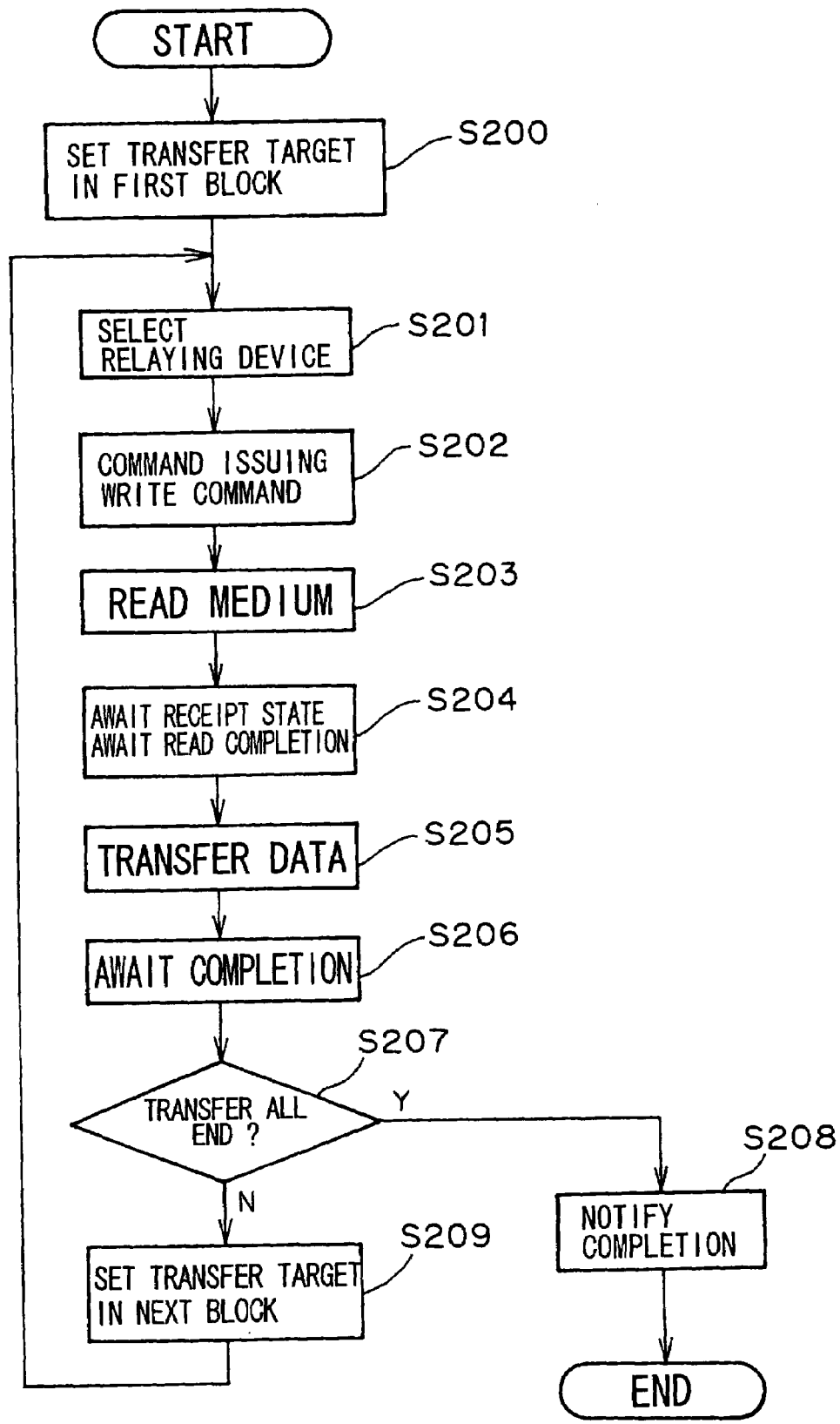
FIG. 9 is a flowchart showing the operation of a processing sequencer.

The operation of the data copying system is now explained. FIG. 9 depicts a flowchart showing the operation of the processing sequencer 103 in the storage unit controller 100 of the storage unit 11. Here, a case in which the storage unit 11 as a source of data transfer sends data to the storage unit 12 as the destination of data transfer to effect backup is explained.

On receipt of a copy command from the host 10 via communication unit 102, the processing sequencer 103 sets the leading block of the range of data to be copied as being a block for data transfer (step S200), as shown in FIG. 9. The processing sequencer then selects one of the relaying devices 15-1 to 15-n for use in the data transfer (step S201). It is assumed here that the relaying device 15-1 is selected. The processing sequencer 103 then instructs the so selected relaying device 15-1 to send the write command to the selected relaying device 15-1 (step S202). The processing sequencer 103 also registers a read request of data to be transferred in the IO scheduler 104 (step S203). The operation of the IO scheduler 104 and the medium control unit 105 when the read request has been registered in the step S203 is similar to the operation in the step S102 already explained in connection with the first embodiment.

The processing sequencer 103 awaits both the message on the completion of preparation for reception from the relaying device 15-1 and the notice on the completion of the read from the medium control unit 105, supplied via communication unit 102 (step S204). When both of these are supplied, the processing sequencer 103 instructs the communication unit 102 to send data stored in the buffer memory 106 to the relaying device 15-1 (step S205). The processing sequencer 103 awaits a message on completion of reception, which message is received from the relaying device 15-1 via communication unit 102 (step S206).

The communication unit 102 sends data stored in the buffer memory 106 in the step S203 to the relaying device 15-1 and, when a message on completion of reception from the relaying device 15-1 is received, the communication unit 102 outputs a message on the completion of reception to the processing sequencer 103. On receipt of the message on completion of reception, the processing sequencer 103 confirms whether or not transfer of the totality of the data to be copied to the relaying device 15 has been completed (step S207). If the transfer has not come to a close, the block next following the data to be copied is set as being the block to be transferred (step S209). Then, processing goes back to the step S201.

If the transfer of the totality of data to be copied has been finished, the processing sequencer 103 instructs the communication unit 102 to output a notice on the completion to the host 10 (step S208) to terminate the processing.

Meanwhile, the amount of data for one block is set in a system in advance. It is also possible for the processing sequencer 103 to change the amount of one-block data depending on the capacity of the buffer memory 106 of the storage unit 12 of the destination of data transfer and on the capacity of the buffer memory 152 of the relaying device 15.

Among the methods for selecting the relaying device in the step S201, there are such methods consisting in sequentially selecting the relaying devices 15-1 to 15-n, selecting a relaying device with light load, that is, the relaying device not used for other data transfer, and in utilizing a random number for selection.

Figure 10:
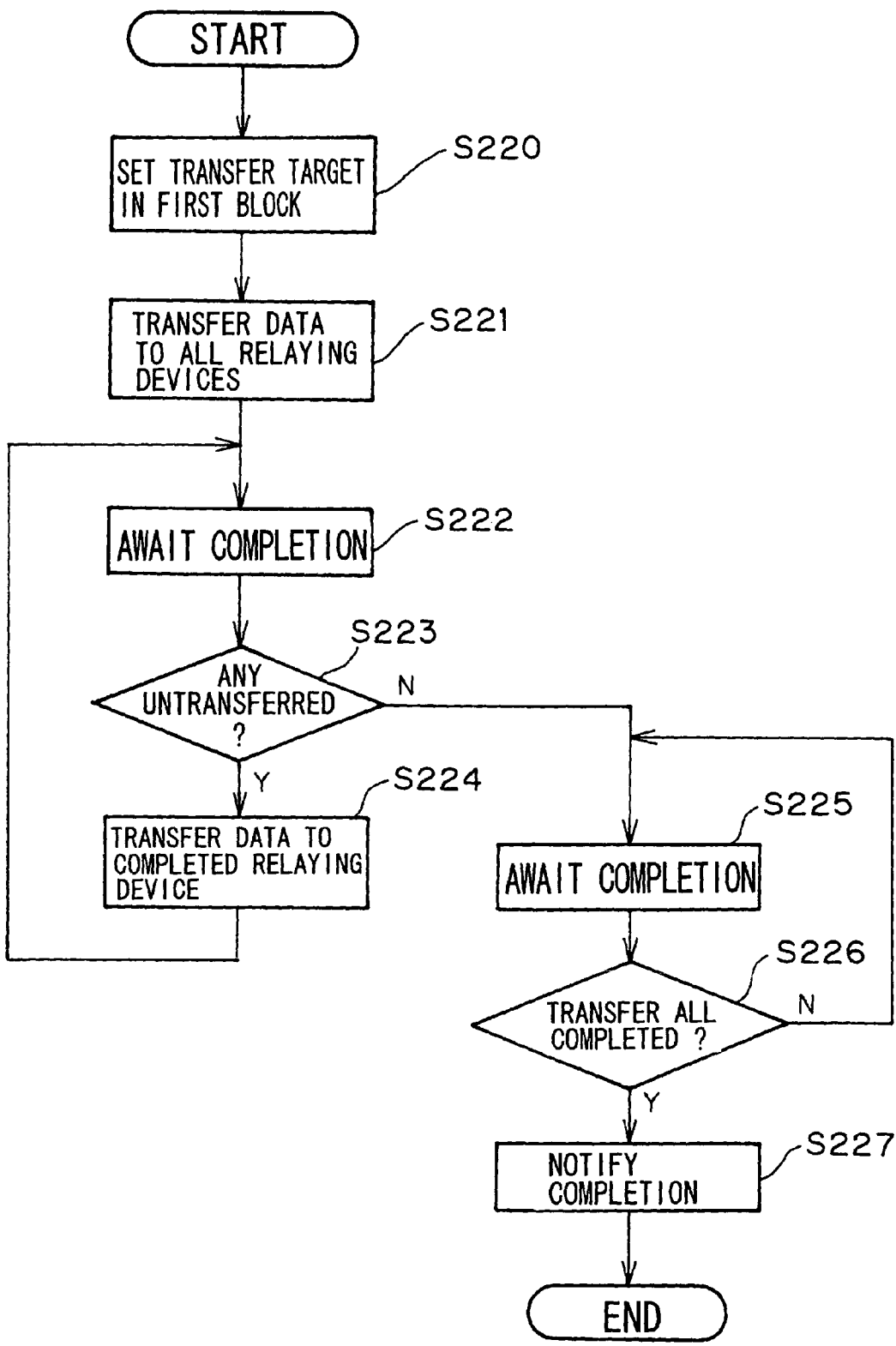
FIG. 10 is a flowchart showing the operation of a storage unit.

Alternatively, data transfer may be executed in parallel by simultaneously employing plural relaying devices. FIG. 10 depicts a flowchart showing the operation of the storage unit 11 when plural relaying devices are used simultaneously. Here, a case of transmitting one-block data is taken as an example.

If, in the storage unit 11, the processing sequencer 103 sets the leading block of the range of data to be copied as being the block of data transfer (step S220), the storage unit 11 sends data to the totality of the relaying devices 15-1 to 15-n (step S221)

Figure 11:
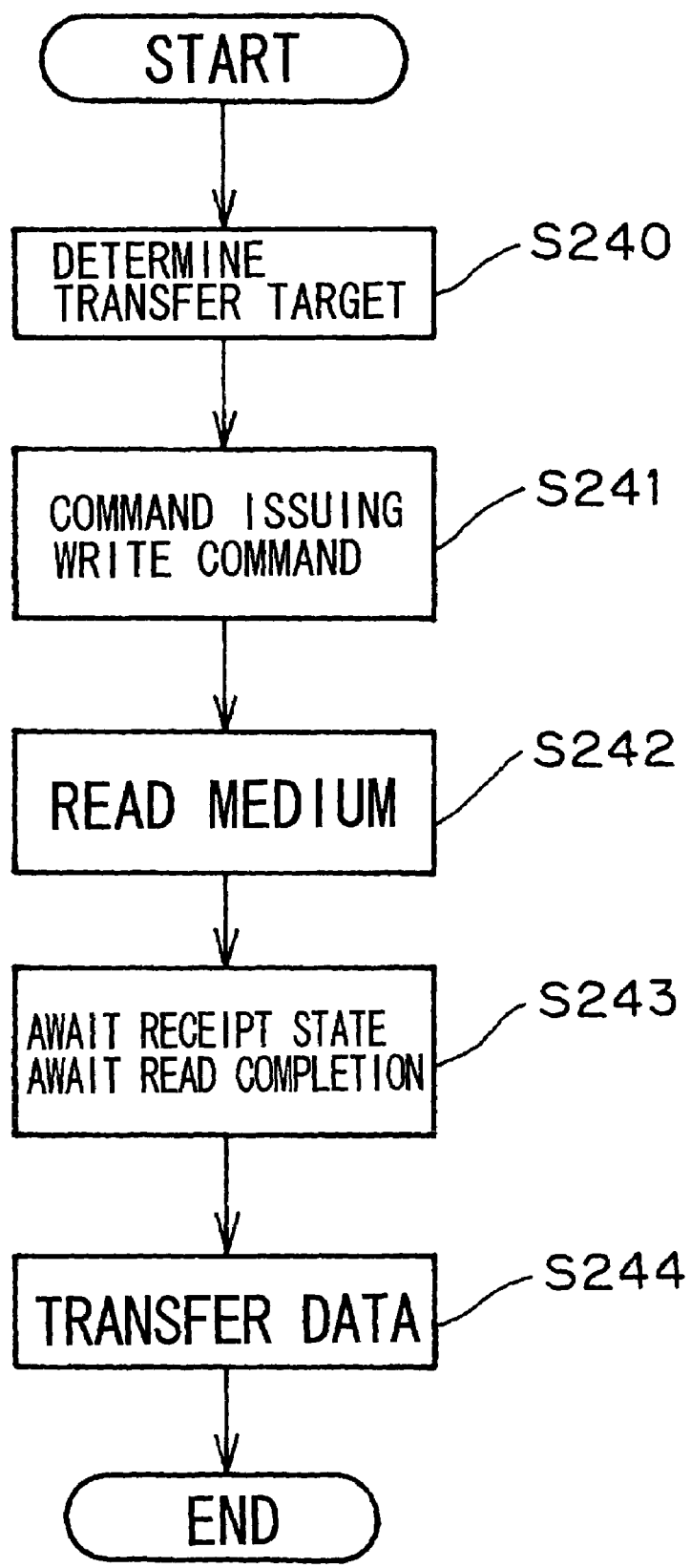
FIG. 11 is a flowchart specifically showing the processing of a step S221.

FIG. 11 depicts a flowchart specifically showing the processing of the step S221. The processing sequencer 103 sends data to the relaying devices 15-1 to 15-n in accordance with the flowchart shown in FIG. 11. A case in which the processing sequencer 103 sends data to the relaying device 15-1 is taken as an example for illustration. From the data stored in the buffer memory 106, the processing sequencer 103 selects data to be sent to the relaying device 15-1 (step S240). The processing sequencer 103 instructs the communication unit 102 to send a write command to the relaying device 15-1 (step S241). The processing sequencer 103 also registers in the IO scheduler 104 a read request for data to be transferred (step S242). The operation of the IO scheduler 104 and the medium control unit 105 when the read request has been registered in the step S242 is similar to the operation in the step S102 explained in connection with the first embodiment described above. The processing sequencer 103 awaits both a message for completion of preparation for reception from the relaying device 15-1, received via communication unit 102, and a notice for completion of read from the processing unit 105 (step S243). On receipt of both, the processing sequencer 103 instructs the communication unit 102 to send the data stored in the buffer memory 106 to the relaying device 15-1 (step S244). Although a case of sending data to the relaying device 15-1 is here taken as an example for explanation, the processing sequencer 103 executes the processing of the steps S240 to S244 on the totality of the relaying devices 15-1 to 15-n.

If the processing sequencer 103 is notified from the communication unit 102 that the message for completion of reception has been received from any of the relaying devices (step S222), the processing sequencer 103 verifies whether or not there is remaining any data to be transferred (step S223). If there is such data, the processing sequencer instructs the communication unit 102 to send the write command to the relaying device, which has sent the message on the completion of reception (step S224). Meanwhile, the specified processing of step S224 is the processing indicated in FIG. 11.

If it is confirmed in the step S223 that there is remaining no data to be transferred, the processing sequencer 103 awaits the message for completion of reception from each relaying device (step S225). On receipt of the message of completion of reception from the totality of the relaying devices which have transferred the data (step S226), the processing sequencer 103 instructs the communication unit 102 to output a notice on completion to the host 10 (step S227) to terminate the processing.

Figure 12:
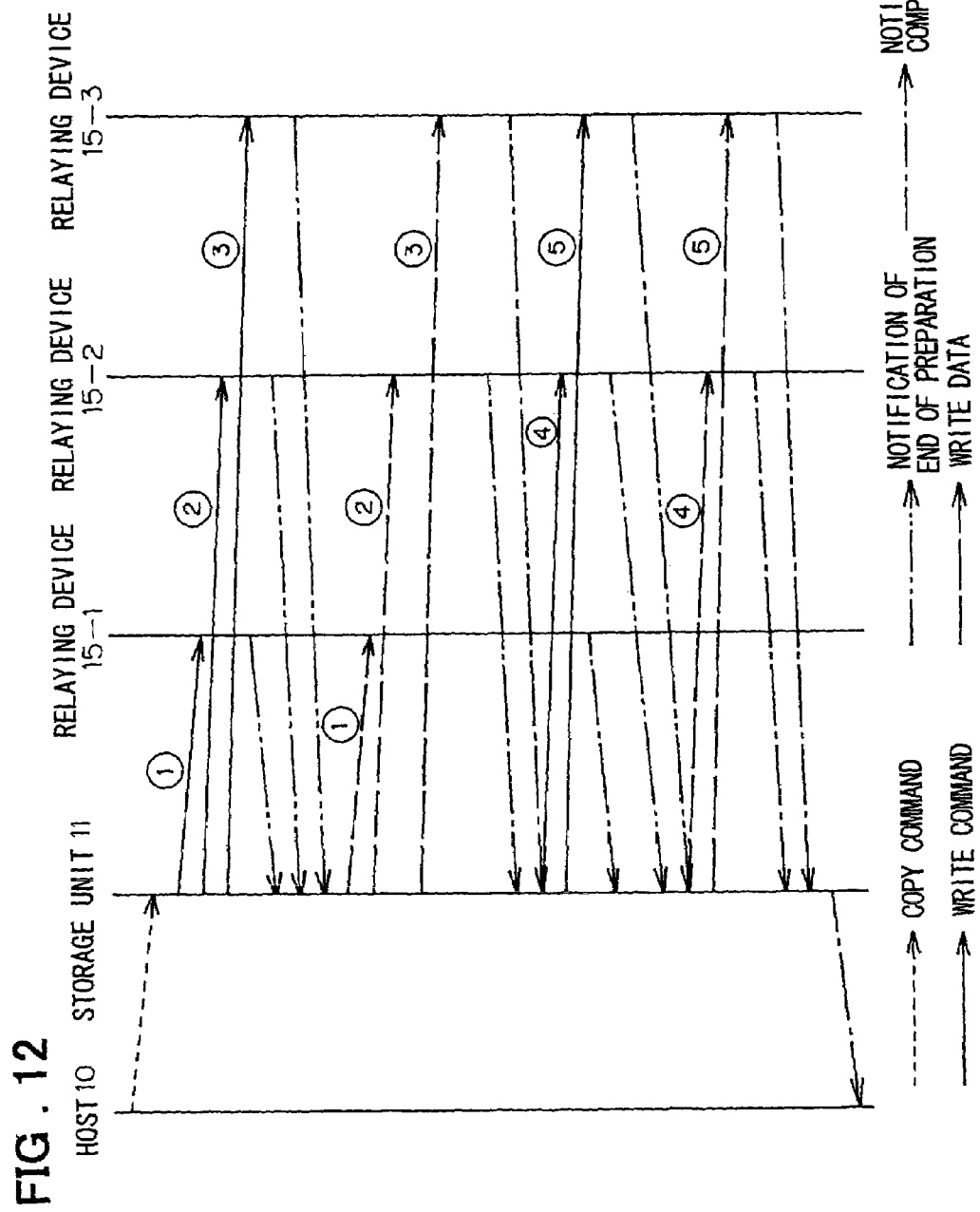
FIG. 12 is a timing chart showing an example of data transfer.

FIG. 12 depicts a timing diagram showing an instance in which one-block data is divided into five portions and three relaying devices 15-1, 15-2 and 15-3 are used. The storage unit 11 is responsive to the copy command from the host 10 to send the write command to each of the relaying devices 15-1, 15-2 and 15-3. The storage unit sends data (1), (2) and (3) to the relaying devices 15-1, 15-2 and 15-3, which have sent the messages on the completion of the preparation of receipt, respectively.

In the instance shown in FIG. 12, since the relaying devices 15-2 and 15-3 have already sent notices for completion, the storage unit 11 sends a write command to the relaying devices 15-2 and 15-3 and subsequently sends data (4) and (5). At a time point when the reception of the notices for completion from the totality of the relaying devices 15-1, 15-2 and 15-3 has been confirmed, the storage unit 11 outputs the notice for completion to the host 10.

In the present embodiment, data transfer can be executed using plural routes, so that the effect of the use ratio of the individual routes or the processing capability of the relaying devices may be rendered less outstanding. For example, in the instance shown in FIG. 12, either the route to the relaying device 15-1 is congested, or the relaying device 15-1 is of low processing capability. However, the congestion of the route to the relaying device 15-1 or the low processing capability of the relaying device 15-1 does not affect the data transfer from the storage unit 11 seriously because the other relaying devices 15-2 or 15-3 may be used.

In the foregoing explanation, different data are sent to the respective relaying devices 15-1 to 15-n. Alternatively, the write command of the same data may be sent to the respective relaying devices 15-1 to 15-n. For example, it is assumed that there are data A to C as data to be sent. The storage unit 11 sends write commands for any of the data A to C to the respective relaying devices 15-1 to 15-n.

In this case, the storage unit 11 provides an identifier for each set of the same data to be sent to the respective relaying devices 15-1 to 15-n, and appends an identifier to each write command. The identifier may be a numerical figure denoting the sequence of the respective sets of data to be sent. For example, if data A is sent first to the respective relaying devices, an identifier indicating [1] is appended to each write command sent to each relaying device. If then data B is to be sent to each relaying device, an identifier indicating [2] is appended to each write command sent to each relaying device. Similar identifiers may be appended to the write command of the remaining data.

Should the relaying devices 15-1 to 15-n notify the storage unit 11 of the completion of data transfer, the identifier appended to the write command is also intimated. Thus, the storage unit 11 receives the response, having the same identifier appended thereto, from each of the relaying devices 15-1 to 15-n. If the identifier appended to the response is an identifier which is received by the storage unit 11 for the first time, the storage unit 11 notifies the end of the data transfer to the host 10. If subsequently the response having the same identifier appended thereto is received, no processing is performed on the response.

The relaying devices 15-1 to 15-n transmit the write command, with the identifier appended thereto, to the storage unit 12 of the standby system. Thus, the storage unit 12 receives the write command, having the same identifier appended thereto, from each of the relaying devices 15-1 to 15-n. When the identifier appended to the write command is an identifier which is received by the storage unit 12 for the first time, the storage unit 12 executes the processing in accordance with the write command. If then the write command having the same identifier appended thereto is subsequently received, the storage unit 12 only sends a notice indicating the end of the data transfer to the relaying device which has sent the write command.

If the write command of the same data is sent to each relaying device, processing can be prosecuted using the one of the plural routes for the data transfer having the fastest speed. Thus, the response awaiting time from the relaying devices in case of mirroring or backup by the storage unit 11 can be shorter, as a result of which the time until the host 10 commences the next processing can be shortened.

In the first to fourth embodiments, it is possible to provide a non-volatile storage unit in the relaying device 15, in which case the relaying device 15 records the command and data received from the storage unit 11 in the non-volatile storage unit, while the command recorded on the non-volatile storage unit is sent at an optional timing to the storage unit 12. The non-volatile storage unit provided in the relaying device 15 may be a disc array device, which is a set of unit magnetic disc devices, unit optical disc devices or unit magneto-optical disc devices. Alternatively, a memory with battery backup may be used.

When the communication amount of the network 14, connected to the relaying device 15 and to the storage unit 12, is below a preset threshold value, it is sufficient for the relaying device 15 to issue a write command to the storage unit 12. The write command may be issued at such a timing when a preset time has elapsed since the command and the data are recorded on the non-volatile storage unit, when the time is a predetermined time point, or when the storage unit 12 has requested a write command to be issued.

If the command and data from the storage unit 11 are recorded in the non-volatile storage unit in this manner, there is no risk of the command or data being lost. The write command may be issued to the storage unit 12 at an optional timing without the issuing of the command being operatively associated with write command receipt from the storage unit. As a result, there is no necessity for the storage unit 12 to be in operation at all times. Similarly, there is no necessity of the network 14 being perpetually connected to the relaying device 15 or to the network 14, so that the management cost for the network 14 may also be diminished.

It is also possible that a write command is issued to the storage unit 12 in timed relation to write command receipt from the storage unit 11, as shown in the first to fourth embodiments, with the command or data being recorded on the non-volatile memory when the amount of the communication exceeds a preset threshold value. In this case, the communication amount of the network 14 can be averaged. On the other hand, a network with an inexpensive management cost may be used as the network 14, thus reducing the overall cost of the data copying system.

In the first to fourth embodiments, the data transfer processing means may be implement by the processing sequencer 103 and the communication unit 102. The relaying processing means may be implemented by the relaying processor 151 and by the communication unit 150.

Embodiment 5

Figure 13:
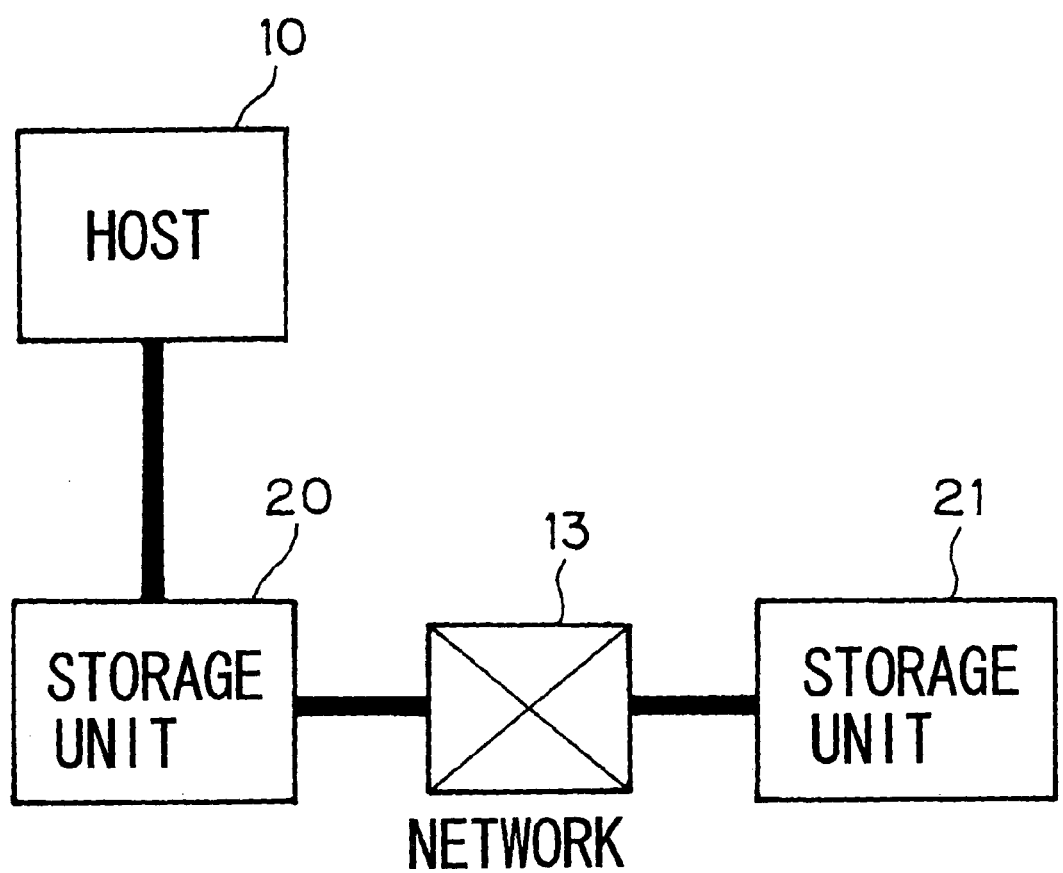
FIG. 13 is a block diagram showing a fifth embodiment of a data copying system.

FIG. 13 depicts a block diagram showing a fifth embodiment of the data copying system according to the present invention. In the data copying system, shown in FIG. 13, the storage unit 20 is locally connected to the host 10 employing the storage unit 20. The storage unit 20 is connected to the storage unit 21 over network 13.

The storage units 20 and 21 may, for example, be each a unit magnetic disc device, a unit optical disc device or a unit magneto-optical disc device. As the storage units 20 and 21, a disc array device, which is a set of unit magnetic disc devices, unit optical disc devices or unit magneto-optical disc devices, may be used. The host 10 and the storage unit 20 are interconnected by for example the SCSI, Fiber channel or Ethernet (trademark).

Figure 14:
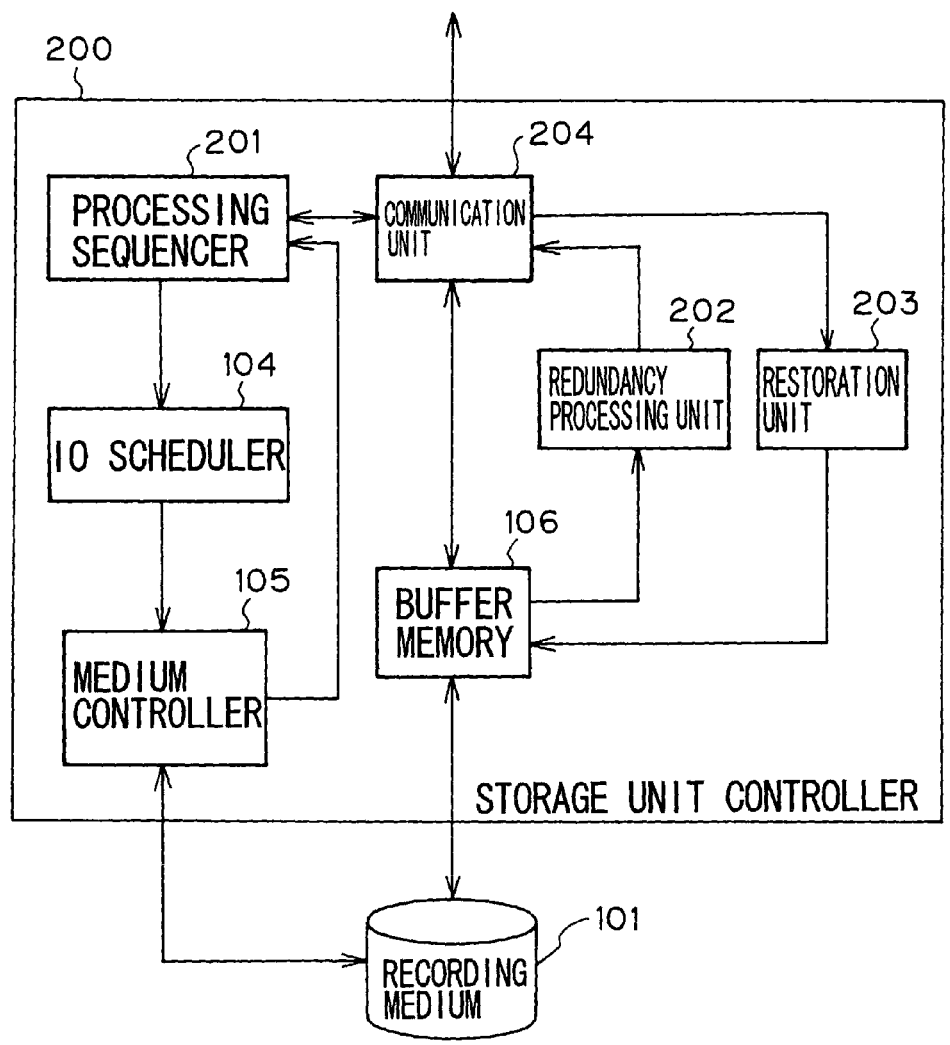
FIG. 14 is a block diagram showing an illustrative structure of a storage unit.

FIG. 14 is a block diagram showing a configuration of the storage unit 20 shown in FIG. 13. Meanwhile, the storage unit 20 is configured as shown in FIG. 14. The storage unit 20 includes a storage unit controller 100 and a recording medium 101 as a main part of the storage unit 11. The storage unit controller 200 includes a communication unit 204 for communication with the host 10 and with other storage units, a processing sequencer 201 for supervising the sequence of various processing operations, an IO scheduler 104 for sequence control of processing commands for the recording medium 101, a medium control unit 105 for controlling the operations of the recording medium 101 in accordance with processing commands issued by the IO scheduler 104, a buffer memory 106 for storing temporarily data from e.g. the host 10 to the recording medium 101 or data from the recording medium 101 to the host 10, a redundancy processing unit 202 for providing for redundancy for data sent to the other storage units, and a restoration unit 202 for restoring original data from the redundancy processed data sent from the other storage units. The processing sequencer 103 is implemented by for example a CPU operating in accordance with a preset program.

Figure 15:
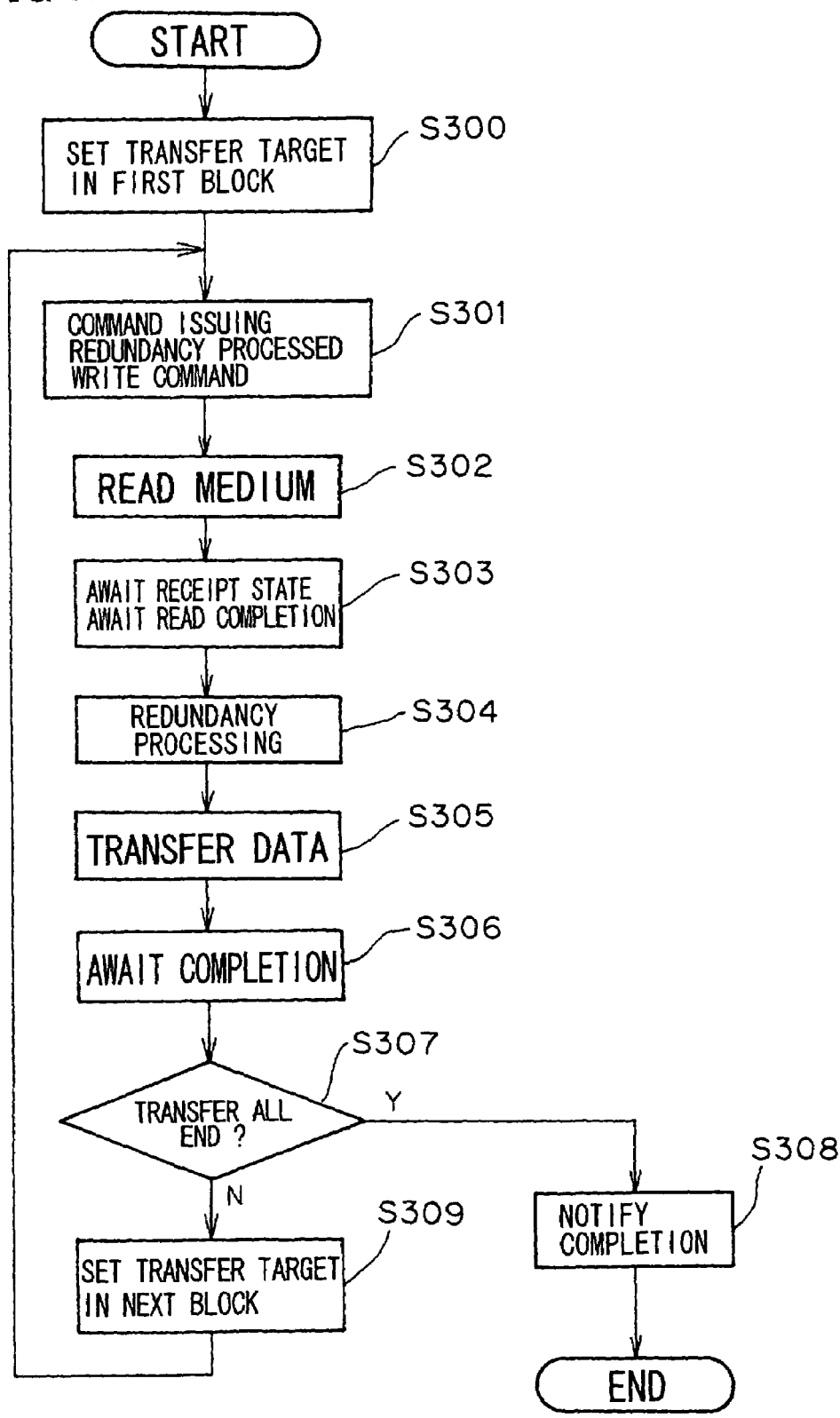
FIG. 15 is a flowchart showing the operation of the processing sequencer.
Figure 16:
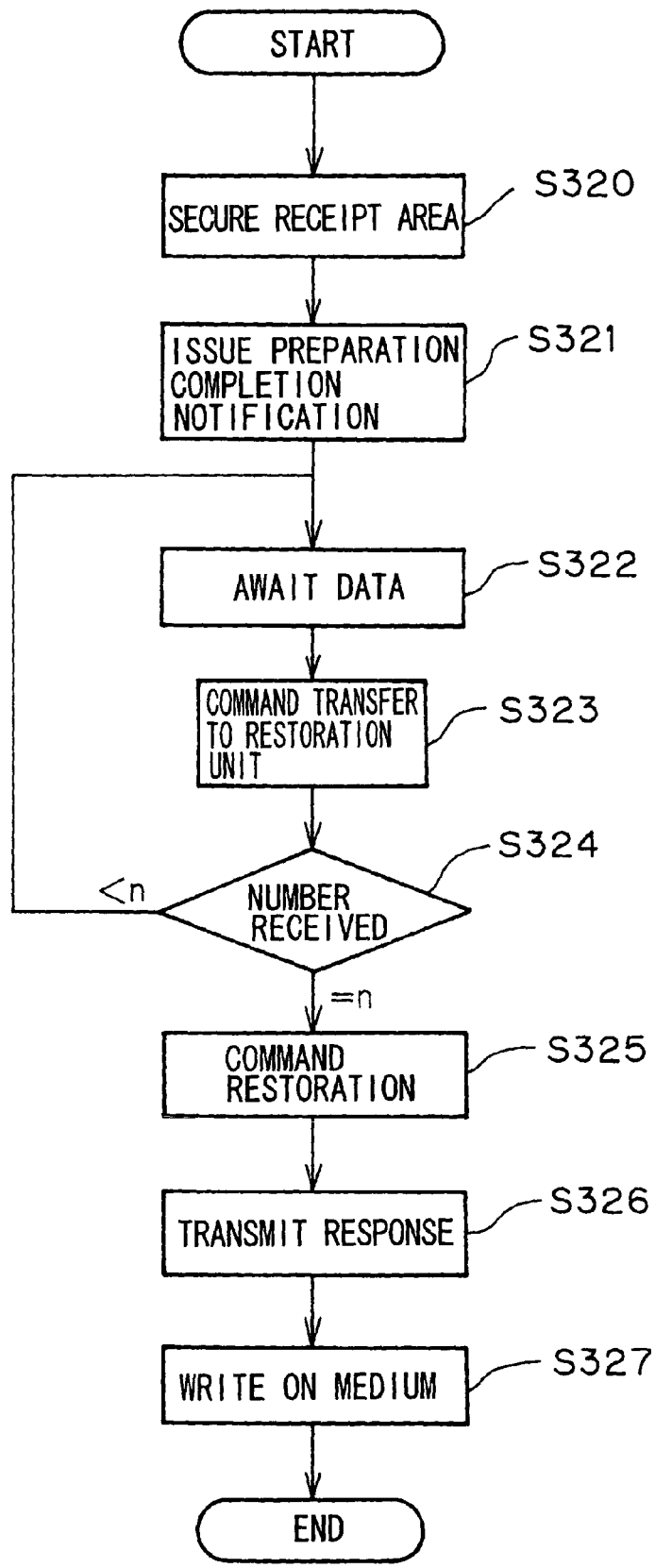
FIG. 16 is a flowchart showing the operation of a communication unit.

The operation of the data copying system of the fifth embodiment is now explained by referring to the flowcharts of FIGS. 15 and 16. FIG. 15 depicts a flowchart showing the operation of the processing sequencer 201 in the storage unit controller 200. FIG. 16 depicts a flowchart for illustrating the operation of the communication unit 204.

On receipt of the copy command from the host 10 via communication unit 204, the processing sequencer 201 sets the leading block of the range of the data to be copied as being a block of data transfer (step S300). The processing sequencer 201 then instructs the storage unit of the destination of copying, as specified by the copy command, to send a redundant write command to the storage unit of the destination of copying, as specified by the copy command (step S301). The redundancy processed write command is a command for writing based on redundancy processed data. In the redundancy processed write command, there are contained the information indicating the block size, that is the data amount, and the information indicating that the data is to be redundancy processed. The processing sequencer 201 registers a read request of data to be transferred in the IO scheduler 104. The IO scheduler 104 is responsive to the read request to command the medium control unit 105 to read data to be transferred. The medium control unit 105 operates in accordance with the read command to output the data to be transferred from the recording medium 101 to the buffer memory 106 (step S302).

The processing sequencer 201 awaits both the message indicating the completion of preparation of receipt from the storage unit 21, received through the communication unit 204, and the notice for read completion from the medium control unit 105 (step S303). When both are received, the processing sequencer 201 causes the redundancy processing unit 202 to turn the data stored in the buffer memory 106 into redundancy processed data (step S304). The redundancy processing is carried out by creating redundancy processed data from original data. In the following explanation, the set of the original data and the newly created redundancy processed data is termed as a set of redundancy processed data. The processing sequencer 201 instructs the communication unit 204 to send the set of the redundancy processed data to the storage unit 21. The communication unit 204 is responsive to this command to send the set of the redundancy processed data to the storage unit 21 (step S305).

It is noted that the communication unit 204 sends the original data and the redundant data as separate data assemblages to the storage unit 21. This "data assemblage" means a minimum data transfer unit of the various data transfer protocols. Among the specified examples of the "data assemblages", there are, for example, segments in TCP or UDP, packets in Internet protocols, and frames in the fiber channel protocol or in the physical layer of the Ethernet (trademark). Thus, if transmission is made in accordance with e.g., the Internet protocol, the communication unit 204 sends the original data and the redundant data by separate packets. Meanwhile, error detection data for detecting errors incurred during transmission (so-called garbled data) is usually appended in the inside of the data transfer unit, such as packet. The redundant data formulated in the step S304 is data sent as an assemblage of independent data and is different from error detection data appended to e.g. packets.

The original data is divided and, based on the so divided original data, redundant data is created, as explained later. In the step S305, the communication unit 204 sends the divided original data as individual data transfer units. It is now assumed that the original data is divided into N data and m redundant data are created from the N data. In this case, the communication unit sends the original data and the redundant data with N and m packets (or segments, frames etc), respectively. When the communication unit 204 has sent the original data and the redundant data as separate data assemblages, the processing sequencer 201 awaits a message for completion of reception from the storage unit 21, received by the communication unit 204 (step S306).

When the communication unit 204 has sent the totality of the sets of the redundancy processed data (original data and the redundant data) to the storage unit 21, and has received the message for completion of reception from the storage unit 21, the communication unit 204 outputs a message on the completion of reception to the processing sequencer 201. On receipt of the message for completion of reception, the processing sequencer 201 verifies whether or not the transfer of the totality of the data to be copied has been completed (step S307). If the transfer has not been completed, the processing sequencer 201 sets the block next following the range of data to be copied as being a block of the data transfer (step S309). Then, processing goes back to the step S301.

If the transfer of the totality of data to be copied has been completed, the processing sequencer 201 instructs the communication unit 204 to output the notice for the completion to the host 10 (step S308) to terminate the processing.

Meanwhile, the amount of one-block data is set in advance in the system. It is possible for the processing sequencer 201 to vary the amount of one-block data depending on the capacity of the buffer memory 106 of the storage unit 21 of the destination of data transfer.

If the data supplied from outside is a command or a message of a control system, such as a message indicating the completion of preparation of receipt or a message indicating the completion of reception, the communication unit 204 delivers the input data to the processing sequencer 201. If the data supplied from outside is data to be written in the storage unit 20, the communication unit 204 inquires the processing sequencer 201 of the location in which to store the data. The data is stored in an area in the buffer memory 106 specified by the processing sequencer 201, or is restored by the restoration unit 203 and subsequently stored in the specified area in the buffer memory 106.

The communication unit 204 also performs the processing of sending the command specified by the processing sequencer 201 or the notice for completion to the specified storage unit or to the host. The communication unit 204 also performs the processing of sending the data in the buffer memory 106 to the specified storage unit or to the host. The communication unit 204 also performs the processing of receiving redundancy processed data from the redundancy processing unit 202 and sends the received data to the specified storage unit or to the host.

When sending the command to other storage units, the communication unit 204 appends to the command a command identifier for distinguishing respective commands. Examples of the command identifier include an issuing number (issuing ID as later explained) which is a number incremented by 1 every time a command is sent. Moreover, in sending the set of the redundancy processed data, a command identifier of the command pertinent to the sending is appended. For example, if the redundancy processed write command is sent, a command identifier for distinguishing the redundancy processed write command is appended. The same command identifier as that of the redundancy processed write command is appended to the set of the redundancy processed data (original data and the redundant data) corresponding to the redundancy processed write command.

The communication unit 204 appends the identifier of the storage unit, as the source of data transfer, to each command or data.

The operation of the redundancy processing unit 202 is explained. The redundancy processing unit 202 acquires the specified data from the buffer memory 106 and, using the prescribed redundancy processing method, makes the set of the redundancy processed data. The redundancy processing unit 202 divides the specified original data into N data, N being a natural number. From the N divided original data, m redundant data are made, m being a natural number. The set of these (N+m) data represents the set of the redundancy processed data. To the set of the redundancy processed data is appended the identification information used at the time of restoration.

A specified instance of the redundancy processing is now explained. The redundancy processing unit 202 divides the original data into N data by such a method consisting in dividing the original data into N equal portions from the leading end. If this method is used, the number indicating the serial number from the leading end is used as the identification number. If the original data is divided into N data, the redundancy processing unit 202 prepares parity data by parity calculations, as in the case of the RAID3 or RAID5 device. These parity data are used as redundant data. That is, in the N data and in the redundant data, the redundant data is prepared so that the sum total of the bits of the respective data is necessarily equal to an odd number (or to an even number). If, when the redundant bits are formulated in this manner, one of the as-divided N original data is erased, the so erased data may be restored.

The method for redundancy processing is not limited to the above-described parity calculations, while the number of the redundant data is not limited to 1. For example, the redundant data may be made by double parity calculations. The ECC (error correction code), derived from the original data, may also be used as redundant data. While there are a large number of the redundancy processing methods, a case where one redundant data is prepared by parity calculations is taken as an example in the following explanation.

The operation of the storage unit 21 as a destination of data transfer is explained. A redundancy processed write command is sent from the storage unit 20 to the communication unit 204 in the storage unit controller 200 of the storage unit 21. On receipt of the redundancy processed write command, the communication unit 204 sends the command to the processing sequencer 201 to instruct the start of the processing derived from the redundancy processed write command (redundancy processed write processing).

FIG. 16 depicts a flowchart showing the operation of the processing sequencer 201 in the storage unit 21. The processing sequencer 201 is able to execute plural redundancy processed write commands in parallel, and discriminates the respective processing operations using the identifier of the storage unit which has issued the command and the command identifier appended to the command.

In the redundancy processed write processing, the processing sequencer 201 acquires an area in the buffer memory 106 for storing data being sent (step S320). The processing sequencer 201 then causes the communication unit 204 to send a notice for completion of preparation for reception to the storage unit 20 which has sent the redundancy processed write command (step S321). The processing sequencer 201 awaits data arrival from the storage unit 20 (step S322). When notified from the storage unit of the effect of the data arrival by the communication unit 204, the processing sequencer 201 specifies the identifier of the storage unit 20 of the source of data transfer and the command identifier appended to the data and instructs the communication unit 204 to send the data to the restoration unit 203 (step S323).

The processing sequencer 201 checks the number of data sent thereto in association with the redundancy processed write command (step S324). Since the command identifier associated with the redundancy processed write command is appended to each data, the processing sequencer 201 is able to check whether or not the respective received data are data sent in association with the redundancy processed write command. If the number of data is less than the preset number (n), the processing sequencer 201 proceeds to a step S322 and, if the number of the data is equal to the preset number (n), the processing sequencer proceeds to a step S325 (step S324). This preset number (n) is the number of data with which it is possible to restore the original data, and differs from one redundancy processing method to another. For example, if one redundant data is created by parity calculations from the original data divided into N data, (N+1) data are transmitted from the storage unit 20. In this case, the original data can be restored if N data are received. Thus, it is sufficient whether or not the number of the received data is less than N.

In the step S325, the processing sequencer 201 specifies the identifier of the storage unit 20 of the source of data transfer, the command identifier and the area in the buffer 106 acquired in the step S320, and instructs the restoration unit 203 to restore the data. The processing sequencer 201 also instructs the communication unit 204 to transmit a response to the storage unit 20 of the source of data transfer (step S326). The processing sequencer 201 also instructs the IO scheduler 104 to write data of the area in the buffer 106 acquired in the step S320 in a medium area specified by the redundancy processed write command (step S327) to terminate the processing. The operation of the IO scheduler 104 and the medium control unit 105 in case this command has been made to the IO scheduler 104 is similar to the operation in the step S102 already explained in connection with the above described first embodiment.

Meanwhile, the processing sequencer 201 instructs the communication unit 204 to discard data pertinent to the redundancy processed write command which has arrived at the communication unit 204 after start of processing in the step S325. For example, if the original data can be restored from N data, the (N+1)st arrival data is unneeded. The data which has arrived at the storage unit 21 after arrival of the needed data is discarded.

The processing in the restoration unit 203 is now explained. The restoration unit 203 includes a buffer memory and causes the data transmitted thereto along with the identifier of the storage unit 20 of the source of data transfer and the command identifier to be stored in the buffer memory. When the identifier of the storage unit 20 of the source of data transfer and the command identifier as well as the storage area in the buffer memory 106 for the restored data are specified and the restoration is commanded, the restoration unit 203 collects data relevant to the identifier of the storage unit 20 of the source of data transfer and the command identifier from its internal memory, and restores the data prior to redundancy processing from the data set based on the identification information appended to the respective data.

It is now assumed that one redundant data is created by parity calculations from the divided N data and that redundancy processing has been carried out, as with devices of RAID3 and RAID5. It is also assumed that, of the divided N original data, the k'th data does not arrive in the storage 21 but the other (N−1) data and the one redundant data, totaling at N data, have arrived in the storage unit 21. In this case, the k'th data can be created by arranging so that, in the k'th data and in the N data, which have arrived, the sum of the respective bits is necessarily an odd number (or an even number). The original data prior to division can be restored by the k'th data created and the other data which have arrived at the storage unit 21. Since the identification information (for example, the number specifying the serial number as counted from the leading end) is appended to each divided data, the pre-division original data can be restored from the as-divided state data. If all of the divided N original data have arrived at the storage unit 21 but the redundant data failed to get to the storage unit 21, it is sufficient to restore the pre-division original data from the N data that have so arrived.

The restoration unit 203 causes the restored data to be stored in the specified area in the buffer memory 106. It should be noted that the area in the internal buffer in the restoration unit 203 used for the restoration processing may be re-used for storage of other data after the end of the restoration processing.

The redundancy processing method is not limited to the method for creating one redundant data by parity calculations, as previously discussed. It is sufficient for the storage 21 of the destination of transmission to manage control so that restoration will be made by a method which is a counterpart of the method for redundancy processing. For example, if ECC is the redundant data, control may be performed by a method corresponding to the ECC.

Although the case of dividing the original data into N data to create redundant data is here shown, it is also possible for the redundancy processing unit 202 in a step S304 to formulate the same data as the original data by copying, without dividing the original data, and to use the so copied data as redundant data. In a step S305, the original data may be transmitted as a unit data assemblage (e.g. one packet, one segment or one frame), while the redundant data, as a copy of the original data, may also be transmitted as a unit data assemblage. Since the original data and the redundant data are the same data, while these data are not divided, the storage unit 21 of the destination of transmission on receipt of one of the original data and the redundant data may directly write the received data on the recording medium 101. The data received later may be discarded. Thus, if the processing sequencer 201 of the storage unit 21 has initially transferred to a step S324, the processing sequencer may immediately proceed to the next step S325. The processing sequencer 201 may then proceed to a step S326 without the restoration unit 203 performing the restoration processing in a step S325.

If the original data and the redundant data are transmitted as the same data and as two separate data assemblages, the storage unit 21 may directly receive the original data the source of the data transfer has attempted to send, even if one of the data is lost in the transmission process.

Here, a case in which the original data is not divided and the same data as the original data is formed by copying and the data so copied is used as redundant data. In creating redundant data, the redundancy processing unit 202 of the storage unit 20 may divide the original data into N data to formulate the same data as the divided N data by copying.

In this case, the N data as copies of the N data resulting from the division become redundant data. In a step S305, the original data is transmitted as an assemblage of N data (for example, as N packets, segments or frames), while the redundant data may also be transmitted as an assemblage of N data. In this case, 2×N data are transmitted to the storage unit 21. If the set of data, among the 2×N data, which is able to restore the original data (first to Nth data after division), is received by the storage unit 21, the storage unit restores the original data based on the received data. That is, the processing sequencer 201 of the storage unit 21 in a step S324 may check whether or not the first to the N'th data after the division have all been received. If all of these data have been received, the processing sequencer 201 may transfer to a step S325 and, if there is any unreceived data, the processing sequencer may go back to the step S322.

If the copied data is transmitted as redundant data, data can be restored at a time point the storage unit 21 has received the as divided first to N'th data, even if part of the 2×N data is discarded in the transmission process. It should be noted that the redundancy processing unit 202 of the storage unit 20 may divide the original data and subsequently create copies of the respective as-divided data, or data which is the same as the original pre-division data may be formulated by copying and the original data as well as the copied data may then be respectively divided.

In the fifth embodiment, redundant data are created and the original data as well as the copied data are separately transmitted. Thus, even if part of the data is lost in the transmission process, the original data can be restored, or the original data, which the source of the transmission has attempted to transmit, can directly be received. The result is that, if part of the original data is lost in the course of transmission, it is unnecessary to notify the storage 20 of the origin of transmission of the non-arrival of the original data to cause the storage unit 20 to re-transmit the data, with the result that the data transfer time may be shortened.

Figure 17:
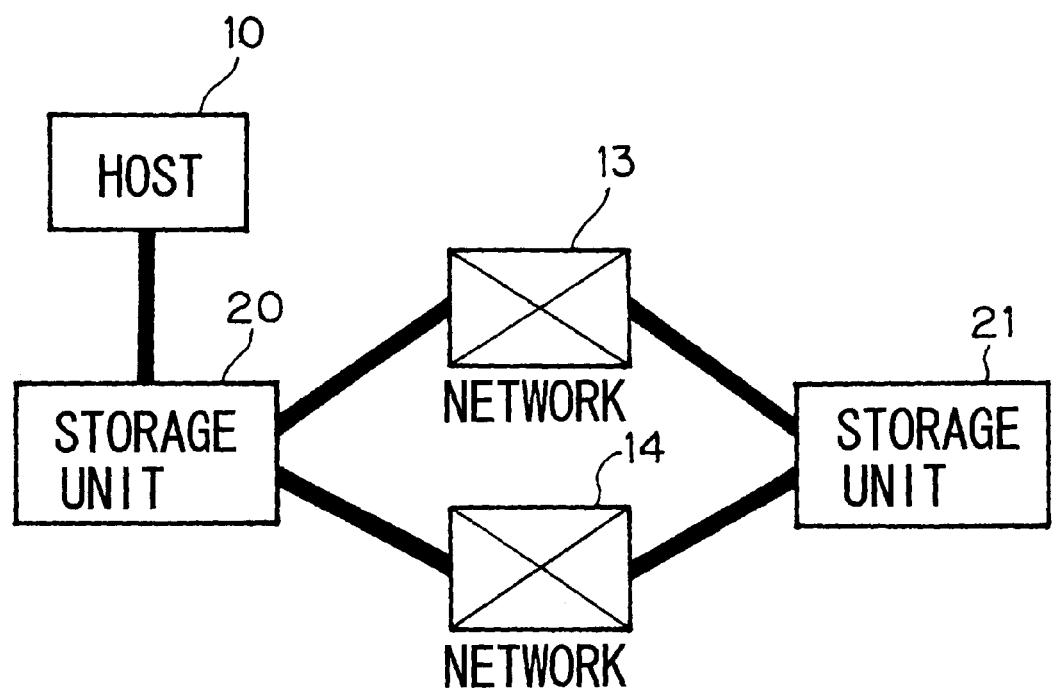
FIG. 17 is a block diagram showing another illustrative structure of the data copying system.

With the data copying system, shown in FIG. 13, the original data and the redundant data, included in the set of the redundancy processed data, are transmitted/received over the network 13. The original data and the redundant data may be transmitted over separate networks. FIG. 17 depicts an illustrative structure of a data copying system in which the original data and the redundant data are transmitted over separate networks. In the illustrative structure shown in FIG. 17, the storage unit 20 is connected over the network 13 to the storage unit 21, while being also connected to the storage unit 21 over the network 14. This structure is similar to the structure shown in FIG. 13 except that the storage units 20 and 21 are interconnected over two networks 13, 14. Moreover, the structure of the storage units 20 and 21 shown in FIG. 17 is similar to the structure shown in FIG. 14. However, the communication unit 204 is connected to the two networks 13, 14.

On the other hand, the operation of the storage unit 20, shown in FIG. 17, is similar to the operation of the storage unit 20 shown in FIG. 13. In the step S305 (see FIG. 15), in case the communication unit 204 sends the set of the redundancy processed data to the storage unit 21, the communication unit 204 sends the original data and the redundant data over respective networks. For example, the communication unit transmits the original data as a data transmission unit (e.g. as a unit packet) over a network 13a to the storage unit 21, while transmitting the redundant data, as copied original data, over the network 14 to the storage unit 21.

With this structure, if one of the networks 13 and 14 is malfunctioning, or if the transfer rate of one of the networks is low, the original data of the redundant data which is the same as the original data may be transmitted over the other network. Thus, with the copied original data as the redundant data, resistance against disasters may be higher. Meanwhile, if the original data is divided into N data to formulate redundant data, the as-divided original data and the redundant data may be transmitted over respective different networks.

Embodiment 6

Figure 18:
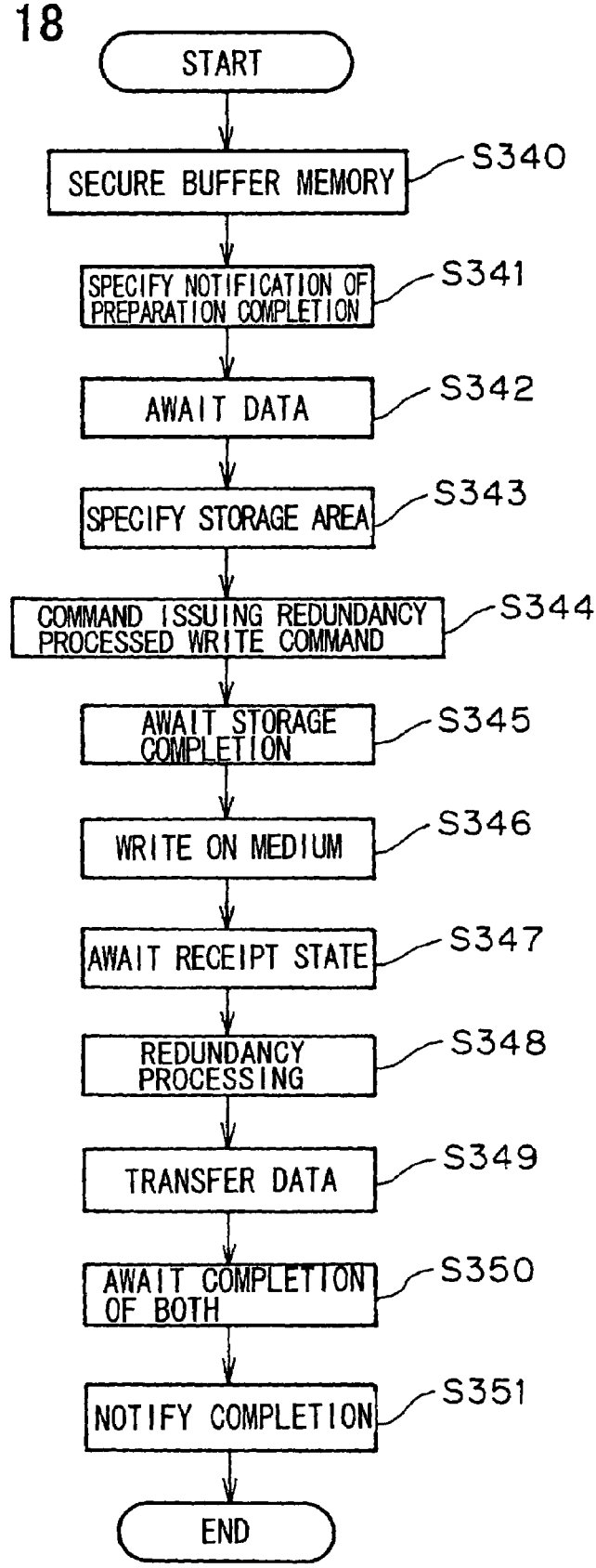
FIG. 18 is a flowchart showing the operation of a processing sequencer of a sixth embodiment.

In the fifth embodiment, the data backup for the storage unit 20 is achieved. However, data of the storage unit 20 may be transferred by mirroring to the storage unit 21. FIG. 18 depicts a flowchart showing the operation of the processing sequencer 201 in the storage unit controller 200 for the storage unit 20 in the sixth embodiment, that is, in case of effecting the mirroring. It is noted that the structure of the data copying system and the structures of the storage units 20 and 21 are similar to that of the fifth embodiment described above (see FIGS. 13 and 14). Moreover, in the storage unit 20, the operations of the communication unit 204, IO scheduler 104 and the medium processing unit 105 is the same as those of the fifth embodiment.

On receipt of the write command from the host 10, the storage unit 20 commences the mirroring. On receipt of the write command from the host 10, the communication unit 204 of the storage unit 204 delivers the write command to the processing sequencer 201. The processing sequencer 201 then acquires an area necessary for storage of the data received from the host 10 in the buffer memory 106 (step S340), as shown in FIG. 18. The processing sequencer 201 also commands the communication unit 204 to send the notice for completion of preparation to the host 10 (step S341). The communication unit 204 is responsive to the commands to send a notice for completion of the preparation to the host 10.

The processing sequencer 201 awaits data arrival from the host 10 (step S342). When the data has arrived and an inquiry as to an area in the buffer memory 106 in which to store the data is received from the communication unit 204, the processing sequencer 201 in a step S343 advises the communication unit 204 of the area acquired in the step S340. The processing sequencer 201 then commands the communication unit 204 to send the redundancy processed write command to the storage unit 21 (step S344). The communication unit 204 is responsive to the command to send the redundancy processed write command to the storage unit 21.

The processing sequencer 201 then awaits the completion of storage of data from the host 10 in the buffer memory 106 (step S345). When notified from the communication unit 204 that the totality of data have been stored in the buffer memory 106, the processing sequencer 201 registers in the IO scheduler 104 the sort of the processing (here the writing), identification for the processing (ID), the information indicating the area in the recording medium 101 to be processed and the information indicating the area in the buffer memory 106 to be processed. The IO scheduler 104 is responsive to the write request to instruct the medium processing unit 105 to write data of interest. The medium processing unit 105 is responsive to the contents of the registration to write data from the buffer memory 106 to the recording medium 101 (step S346).

The processing sequencer 201 in a step S347 awaits a message as to the completion of preparation for reception, sent from the storage unit 21 (response to the redundancy processed write command sent in the step S344). When informed by the communication unit 204 of the fact of receipt of the message on the completion of the preparation for reception from the storage unit 21, the processing sequencer 201 instructs the redundancy processing unit 202 to redundancy-process the data stored in the buffer memory 106. The redundancy processing unit 202 is responsive to the instruction to execute redundancy processing as in the fifth embodiment (step S348). It is possible in the step S348 to divide the original data into N data to formulate the redundant data from the as-divided data. It is also possible to copy the original data for use as redundant data, thus without dividing the original data, to copy the same data as the respective data divided from the original data to use the copied data as redundant data, or to copy the same data as the original data to divide the original and copied data.

The processing sequencer 201 then instructs the communication unit 204 to send the set of data, redundancy-processed by the redundancy processing unit 202, to the storage unit 21 (step S349). The communication unit 204 is responsive to the instruction to send the set of the redundancy-processed data (as-divided original data and redundant data) to the storage unit 21. The processing sequencer 201 then awaits transmission from the storage unit 21 of the message on completion of reception and the notice from the medium control unit 105 on the completion of writing (step S350). On receipt from the communication unit 204 of the message on the completion of reception from the storage unit 21 and the notice from the medium control unit 105 on the completion of writing, the processing sequencer 201 notifies the host of completion (step S351) to terminate the processing. Meanwhile, the operation of the storage unit 21 receiving the set of the redundancy processed data from the storage unit 20 is the same as that of the fifth embodiment described above.

The storage units 120 and 121 may be interconnected over the networks 13 and 14, as in the case shown in FIG. 17. If, in the step S349, the communication unit 204 sends the set of the redundancy processed data, the original data and the redundant data may be transmitted over different networks.

In transmitting/receiving data between the storage units and the relaying device, in the data copying systems of the first to fourth embodiments, the set of the redundancy processed data may be transmitted or received, as indicated in the fifth or sixth embodiment. In such case, the same meritorious effects as those achieved in the fifth or sixth embodiment may be achieved in the first to fourth embodiments.

In the fifth and sixth embodiments, data transfer processing means is implemented by the processing sequencer 201 and the communication unit 204. The redundancy processing is achieved by the redundancy processing unit 202. The restoration is achieved by the restoration unit 203. The storage processing means is implemented by the processing sequencer 201, IO scheduler 104 and the medium control unit 105.

Embodiment 7

Figure 19:
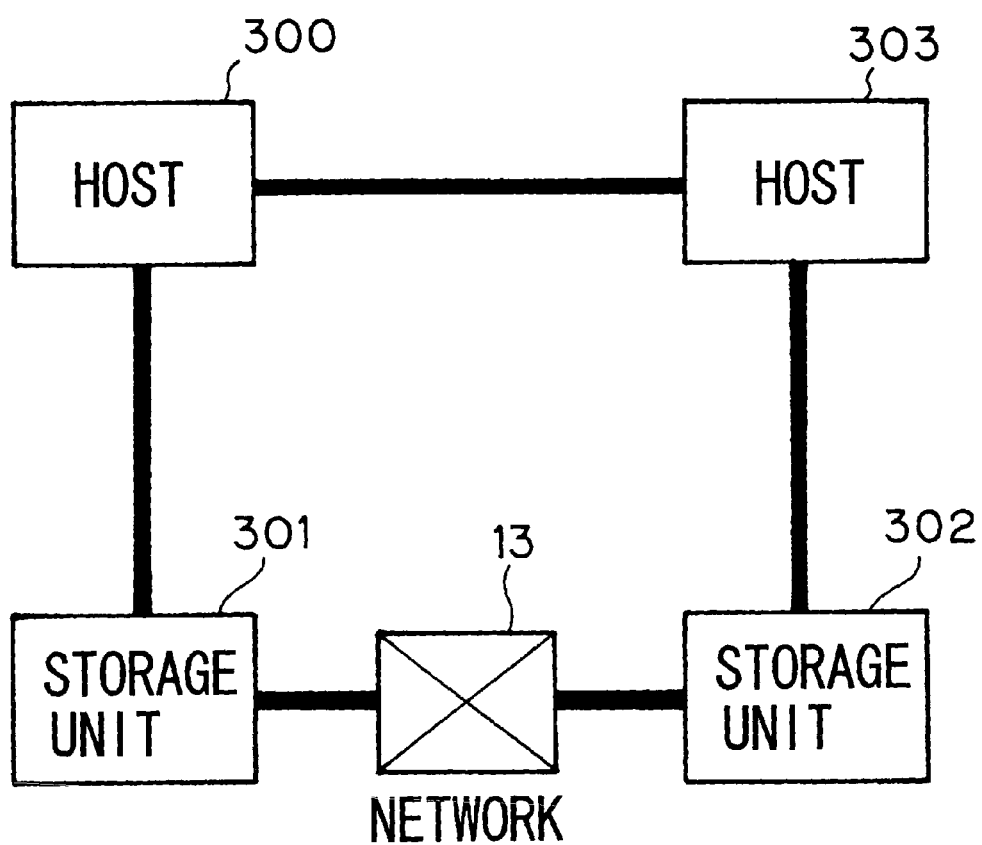
FIG. 19 is a block diagram showing a seventh embodiment of the data copying system.

FIG. 19 is a block diagram showing a seventh embodiment of the data copying system according to the present invention. In the data copying system, shown in FIG. 19, a storage unit 301 is locally connected to a host (higher rank device) 300 using the storage device 301, while a storage unit 302 is locally connected to a host 303 employing the storage unit 302. The storage unit 301 is connected over a network 13 to the storage unit 302, while the hosts 300 and 303 are interconnected such as to enable communication. The hosts 300 and 303 are preferably interconnected over a leased line. However, the hosts may also be interconnected over a network other than the leased line, such as the Internet.

The storage units 301 and 302 may, for example, be each a unit magnetic disc device, a unit optical disc device or a unit magneto-optical disc device. As the storage units 301 and 302, a disc array device, which is a set of unit magnetic disc devices, unit optical disc devices or unit magneto-optical disc devices, may be used. The hosts 300 and 303 and the storage units 301 and 302 are interconnected by for example the SCSI, Fiber channel or Ethernet (trademark). Meanwhile, it is assumed that, in the system shown in FIG. 19, the host 300 is the normal operating host which is in operation when the system is operating trouble-free, while the host 303 is a standby system host which is in operation when a trouble has occurred in the host 300.

The hosts 300 and 303 execute the processing in accordance with the application program held by the hosts 300 and 303. The application program is referred to below as an application. In this application, data held in the storage units 301 and 302 is the target for processing. For example, if the deposits of bank's customers are stored in the storage units 301 and 302, the hosts 300 and 303 e.g. updates the data in the storage units 301 and 302 in accordance with a deposit data management application. Although it is the host which actually performs the operations, it is postulated that the operation is that of the application.

In the present embodiment, data in the storage unit 301 of the normal system is mirrored to a storage unit 303 of the standby system existing in a remote place. It is noted that the data is not written in a storage medium of the storage unit 303 of the standby system, at a time point the data is written in the storage unit 301, but the data is held in a buffer memory for synchronization provided to the storage unit 303 of the standby system at a timing specified by the host 300. The data in the buffer memory for synchronization of the storage unit 303 of the standby system is written in a preset recording medium at a timing as specified by the host 300. It is assumed that data A and B must have been written in the storage unit when the host commences processing X. In this case, at a time point the data A has been written in the storage unit 301, simply the data A is held in the buffer memory for synchronization in the storage unit of the standby system 302, while no data is written the recording medium of the standby system 302. After the host 300 has written data B in the storage unit 301, the host 300 specifies the write timing in the recording medium of the storage unit of the standby system 302 and, at this timing, the storage unit of the standby system 302 writes data A and B in the buffer memory for synchronization in the storage unit of the standby system 302.

The timing in which an application program is able to directly start the operation at such and such a data state is termed a restart enabling point. That is, the restart enabling point means a timing for which the prevailing state of written data allows for re-start of the processing by the application program. In the above instance, the time interval as from the writing of the data A and B in the storage unit of the normal system 301 until the writing of the next data represents the restart enabling point which allows the start of the processing X.

Figure 20:
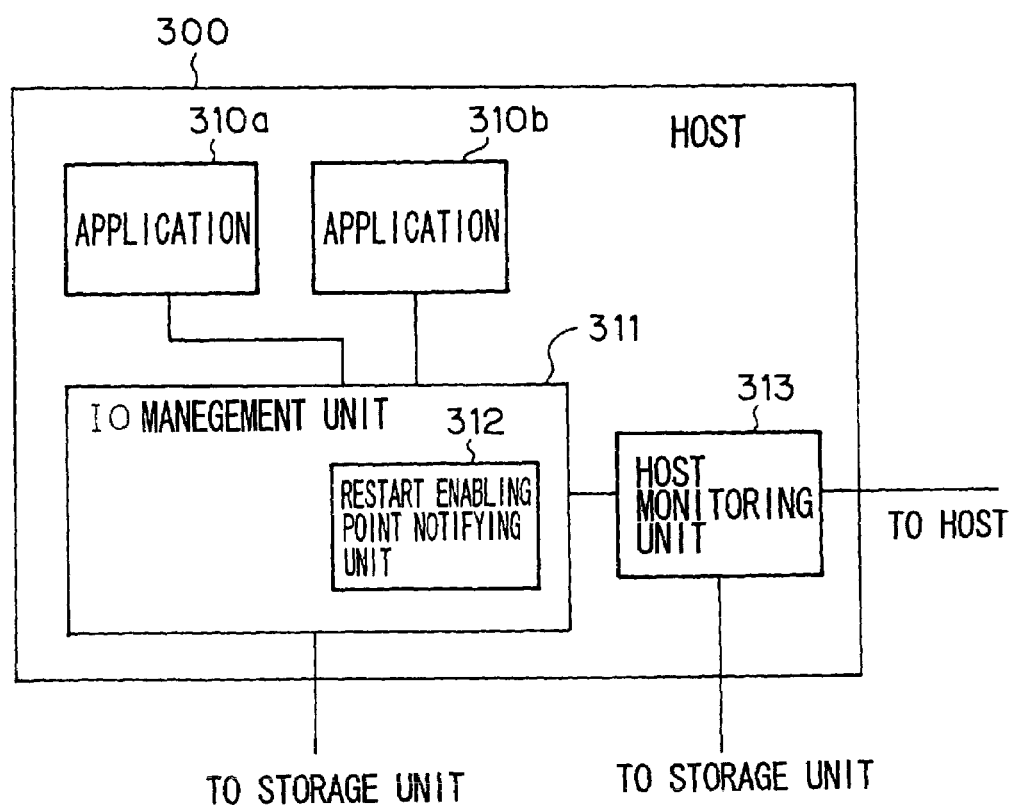
FIG. 20 is a block diagram showing an illustrative structure of a host.

FIG. 20 depicts a block diagram showing a configuration example of the host 300. In the host 300, one or plural applications are in operation. Here, two applications 310a and 310b are shown as an example. Using an IO management unit 311, the applications 310a and 310b access data in the storage unit 301. The IO management unit 311 includes a restart enabling point notifying unit 312 for advising the storage unit 301 of the restart enabling point. In the restart enabling point, the restart enabling point notifying unit 312 executes the processing of notifying the storage unit 301 that the timing is the restart enabling point (processing of notifying the restart enabling point). There is also provided a host monitoring unit 313 for monitoring the state of the host 300. Meanwhile, the structure of the host 303 is similar to that of the host 300.

The applications 310a and 310b in the present embodiment are provided with a re-start function. That is, the applications 310a and 310b are those applications which realize the processing restart enabling functions when the data recording state in the recording medium 101 of the storage unit is a preset state.

Figure 21:
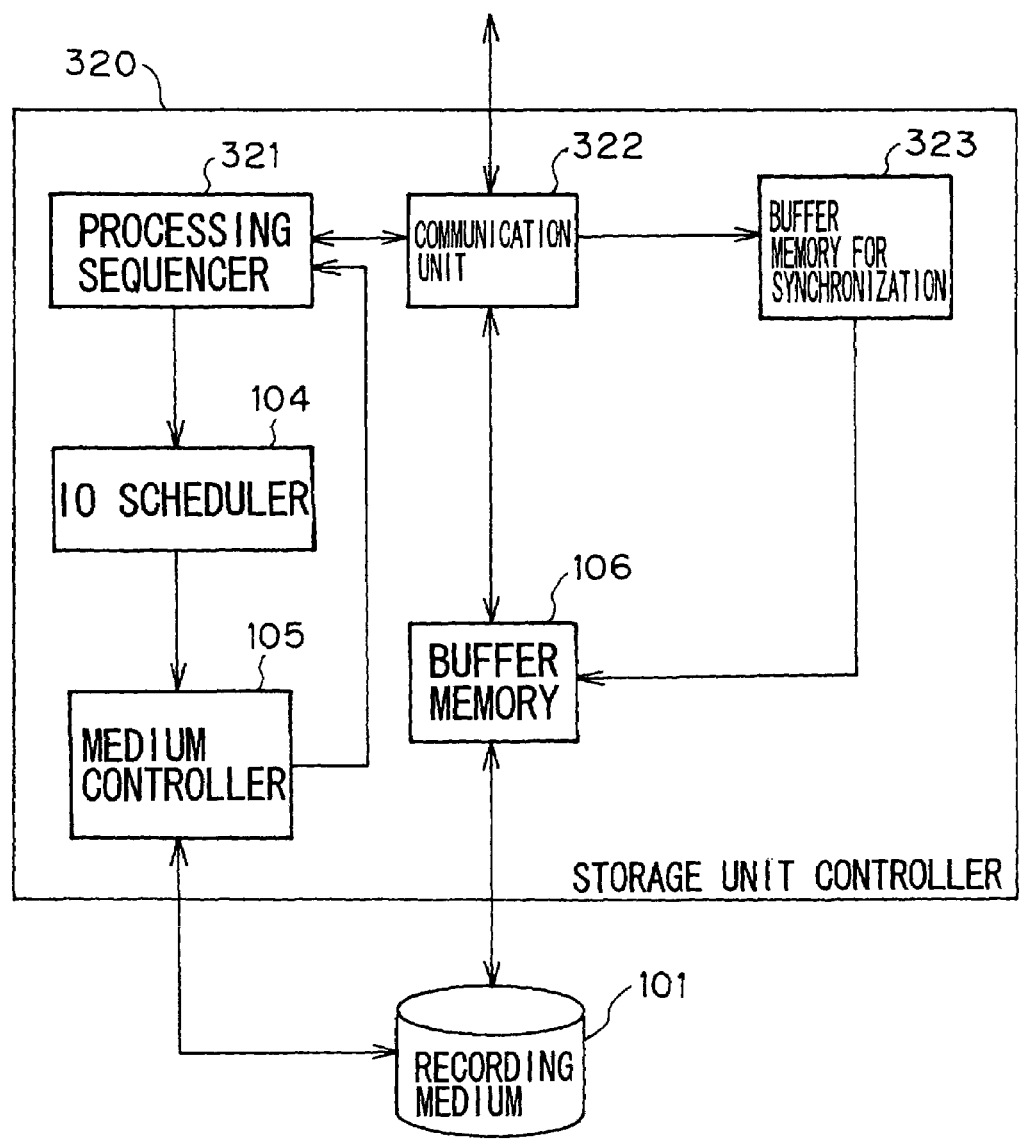
FIG. 21 is a block diagram showing an illustrative structure of a storage unit.

FIG. 21 depicts a block diagram showing an illustrative structure of the storage unit 301 shown in FIG. 19. Meanwhile, the storage unit 302 is of a structure shown in FIG. 21. Referring to FIG. 21, the storage unit 301 includes a storage unit controller 320 and a recording medium 101 which is a main part of the storage unit. The storage unit controller 320 includes a communication unit 322, for communication with the host 300 and with other storage units, a processing sequencer 321 for managing the sequence of various processing operations, an IO scheduler 104 for controlling the sequence of processing commands for the recording medium 101, a medium control unit 105 for controlling the operation of the recording medium 101 in accordance with the processing commands issued by the IO scheduler 104, a buffer memory 106 for temporary storage of data from the host 300 to the recording medium 101 and from the recording medium 101 to the host 300, and a buffer memory for synchronization 323 for transiently storing the data sent from other storage units. The processing sequencer 321 is implemented by a CPU operating under control by a program. The operation of the IO scheduler 104 and the medium control unit 105 is similar to the operation of the IO scheduler 104 and the medium control unit 105 in the first embodiment described above.

Meanwhile, there are occasions where a semiconductor memory is used as the buffer memory for synchronization 323, while there are occasions where a storage device of a larger capacity, such as a magnetic disc device, an optical disc device or a magneto-optical disc device, is used as the buffer memory for synchronization.

When the applications 310a and 310b read out data from the storage unit 301, the host 300 requests the storage unit 301 to read out data. The processing sequencer 321 of the storage unit 301 copies the requested data from the recording medium 101 to the buffer memory 106 by e.g. the IO scheduler 104, and routes the data to the host 300.

The schematics of the operation of the host 300 writing data in the storage unit are now explained. The host 300 causes data to be written in the storage unit 301 by outputting the write command to the storage unit 301. If the time is the restart enabling point after outputting one or plural write commands, the timing being the restart enabling point is intimated by outputting the restart enabling point notifying command to the storage unit 301.

On receipt of the write command, the storage unit 301 writes data in the recording medium 101 in accordance with the write command. The storage unit 301 also outputs a delay write command to the storage unit of the standby system 302 to cause the data to be held in the buffer memory for synchronization 323 of the storage unit 302. A delayed write command commands holding data, which should be written on the recording medium 101, in the buffer memory for synchronization 323, and writing the data on the recording medium 101 on delivery of a delay data reflecting command as later explained.

On receipt of the restart enabling point notification command, the storage unit 301 sends the delay data reflecting command (delay write execution command) to the storage unit 302. This delay data reflecting command instructs the data stored in the buffer memory for synchronization to be written in the recording medium 101. On receipt of the delay data reflecting command, the storage unit of the standby system 302 writes data stored in the buffer memory for synchronization 323 in the recording medium 101. By these operations, the recording medium 101 of the storage unit 302 is maintained in the state in which it can start processing at any time.

Figure 22:
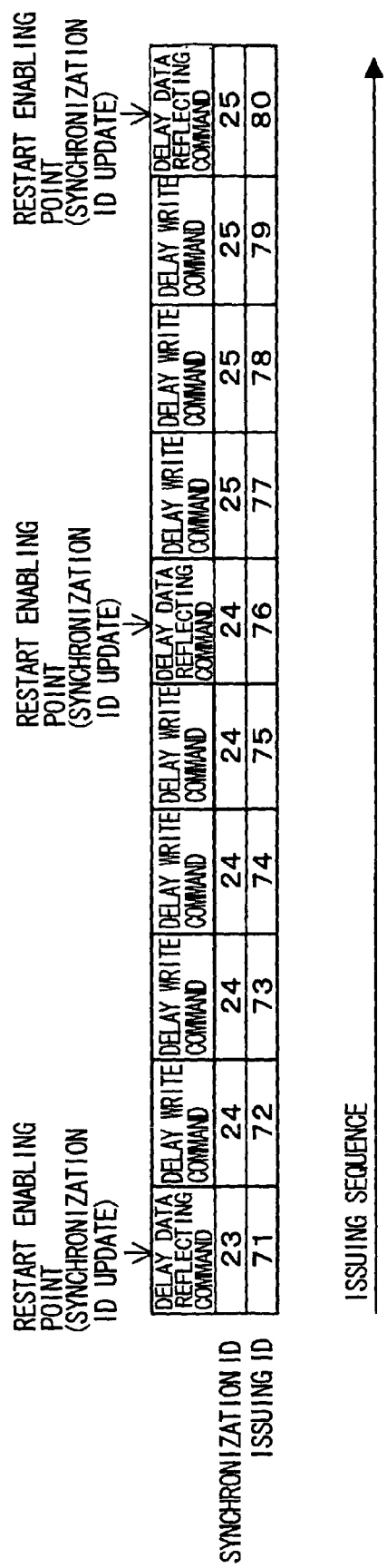
FIG. 22 is a diagrammatic view showing typical synchronization IDs and issuing IDs.

The storage unit 301 appends the synchronization ID and the issuing ID to the delay write command and to the delay data reflecting command to transmit the resulting command data. FIG. 22 illustrates examples of the synchronization ID and the issuing ID. The storage unit 301 updates the synchronization ID each time it receives the restart enabling point notification command from the host 300. Thus, the same synchronization ID is appended to the delay write commands output as from a given restart enabling point to the next restart enabling point. The storage unit 301 also appends the synchronization ID, directly previous to the updating, to the delay data reflecting command which is issued on receipt of the restart enabling point notification command. The as-updated synchronization ID is appended to the subsequently issued delay write command. In an instance shown in FIG. 22, "24" or "25", which is the as-updated synchronization ID, is appended to the delay write command, while "23" or "24", which is the pre-update synchronization ID, is appended to the delay data reflecting command, output directly thereafter.

The storage unit 301 updates an issuing ID each time the delay write command or the delay data reflecting command is issued (that is, each time the delay write command or the delay data reflecting command is created and transmitted). The instance shown in FIG. 22 shows a case where the issuing ID of the delay write command or the delay data reflecting command is incremented by 1.

On receipt of the write command from the host 300, the storage unit 301 sends the delay write command to the storage unit 302 and then sends data corresponding to the delay write command. This data need not be transmitted in the same sequence as the sequence in which the delay write commands are issued. For example, it is assumed that the storage unit 301 issues the delay write command for writing data p and q and subsequently issues the next delay write command for writing data r. In this case, the sequence of data transfer by the storage unit 301 is not limited to the sequence of p, q and r. The transmission of the data r may be commenced before completion of transmission of the data p and q. However, in transmitting the delay data reflecting command to the storage unit 302, the delay data reflecting command needs to be transmitted after completion of transmission of data of the so far issued delay write commands.

Meanwhile, the storage unit 301 appends the location of writing the data specified by the delay write command (offset address, sector number or block number etc) as well as the data size to the delay write command.

Figure 23:
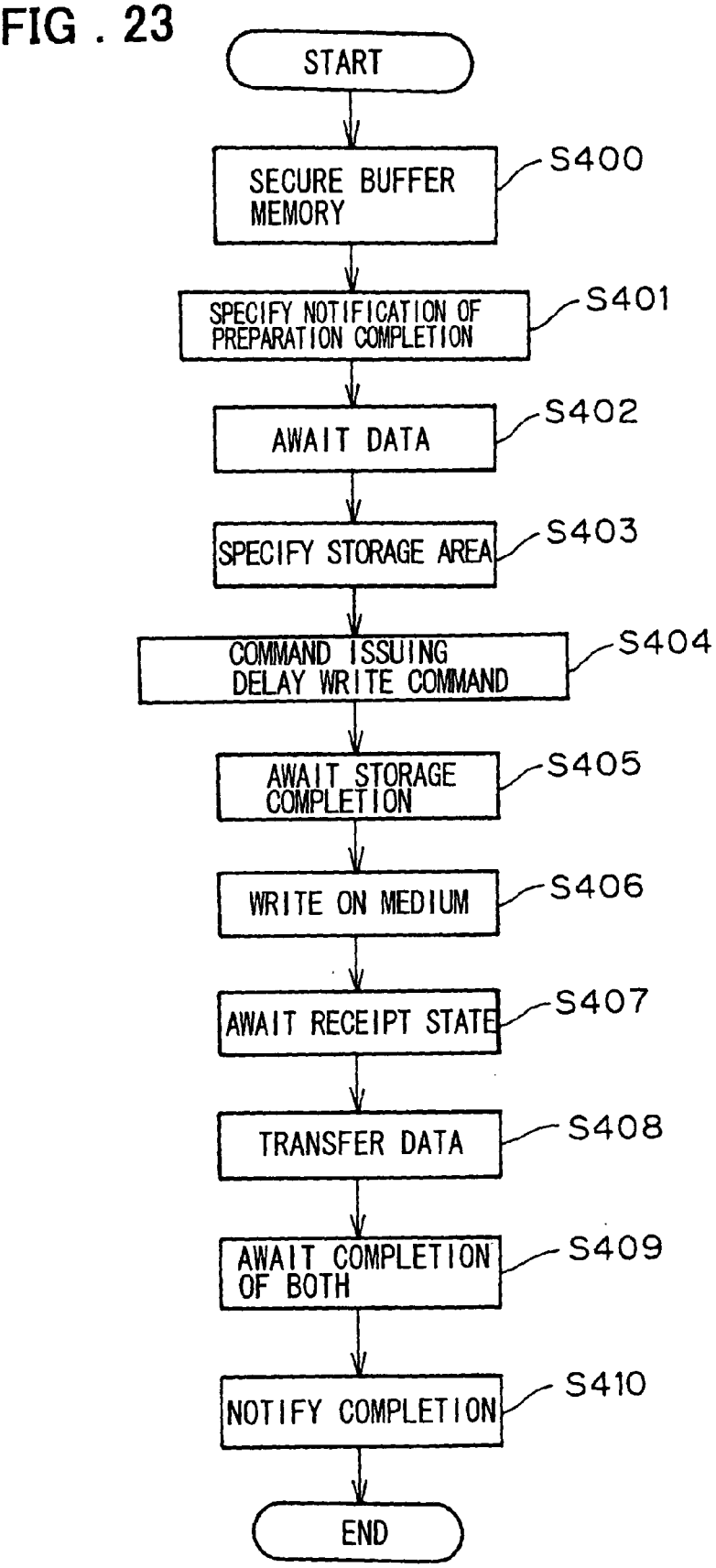
FIG. 23 is a flowchart showing the operation of the processing sequencer.

The operation of the applications 310a and 310b writing data in the storage unit 301 is now explained. FIG. 23 is a flowchart for illustrating the operation of the processing sequencer 321 in the storage unit controller 320.

In writing data in the storage unit 301, the applications 310a and 310b output a write command to the communication unit 322 in the storage unit controller 320 of the storage unit 301. On receipt of the write command, the communication unit 322 delivers the write command to the processing sequencer 321 to instruct the processing sequencer 321 to commence the processing.

On receipt of the write command, the processing sequencer 321 in a step S400 acquires an area in the buffer memory 106 necessary for storing data sent from the host 300, as shown in FIG. 23. The processing sequencer 321 in a step S401 instructs the communication unit 322 to send a notice for the end of preparation to the host 300. The communication unit 322 is responsive to the instruction to send the notice for the end of preparation to the host 300.

The processing sequencer 321 then awaits data arrival from the host 300 (step S402) and, on receipt of the data and an inquiry of the area in the buffer memory 106 for storing the data from the communication unit 322, the processing sequencer 321 advises the communication unit 322 of the area acquired in the step S400 (step S403). The processing sequencer 321 also instructs the communication unit 322 to transmit the delay write command to the storage unit 302 as the synchronization ID is specified (step S404). The communication unit 322 is responsive to the instruction to send the delay write command to the storage unit 302. The synchronization ID and the issuing ID are appended to the delay write command, as explained previously. The same synchronization ID is appended to each delay write command output as from a given restart enabling point until the next restart enabling point. The issuing ID is updated each time the delay write command or the delay data reflecting command is updated (see FIG. 22).

The processing sequencer then awaits completion of storage of the data from the host 300 in the buffer memory 106 (step S405). When notified by the communication unit 322 of the fact that all data have been stored in the buffer memory 106, the processing sequencer 321 registers in the IO scheduler 104 the sort of the processing (herein the writing), the identification ID of the processing, the information as to the area in the recording medium 101 to be processed and the information indicating the area in the buffer memory 106 to be processed. The IO scheduler 104 is responsive to the write request to instruct the medium control unit 105 to write the data as the target of writing. The medium control unit 105 is responsive to the contents of registration to effect data writing from the buffer memory 106 to the recording medium 101 (step S406).

The processing sequencer 321 in a step S407 awaits an arrival of a message on completion of the preparation from the storage unit 302 (response to the delay write command). If the message indicating receipt from the storage unit 302 of the completion of preparation is received from the communication unit 322, the processing sequencer 321 causes the communication unit 322 to send the data stored in the buffer memory 106 to the storage unit 302 (step S408). The processing sequencer 321 then awaits the transmission from the storage unit 302 on the completion of reception and the notice from the medium control unit 105 on the completion of writing (step S409). If the message indicating the completion of reception from the storage unit 302 and a notice for write completion are received from the medium control unit 105, the processing sequencer 321 notifies the host 300 of the fact of completion (step S410) to terminate the processing.

The data transmitting sequence in the step S408 may be different from the delayed write command issuing sequence. It is assumed that the storage unit 301 receives the write commands in succession from the host 300 and issues the delay write command with a delay. In this case, the storage unit 301 may start transmission of data corresponding to the subsequent delay write command (step S408) before completion of transmission of data corresponding to the previously issued delayed write command (step S408).

Figure 24:
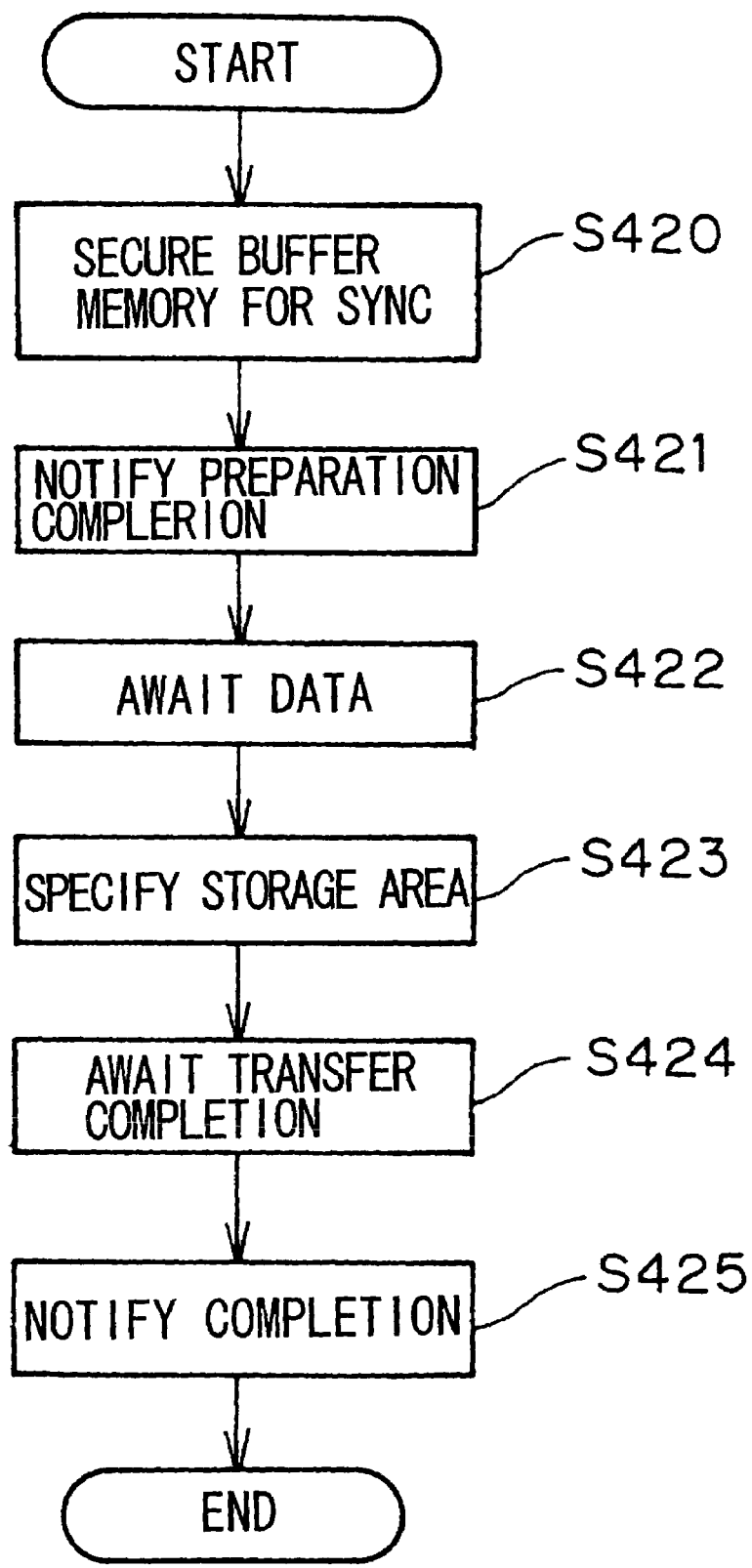
FIG. 24 is a flowchart showing the operation when the processing sequencer has received a delay write command.

The processing when the delay write command is received by the storage unit 302 is now explained. FIG. 24 depicts a flowchart showing the operation when the processing sequencer 321 is received by the processing sequencer 321 in the storage unit controller 320 of the storage unit 302.

The processing sequencer 321 first acquires an area necessary for the received data in the buffer memory for synchronization 323 (step S420) and instructs the communication unit 322 to send the notice for completion of preparation for reception to the source of transmission of the request (here the storage unit 301). The communication unit 322 is responsive to the instruction to send the message for completion of the preparation of receipt to the source of transmission (step S421). The processing sequencer then awaits the data arrival (step S422). On receipt of the data and the inquiry from the communication unit 322 of the data storage position, the processing sequencer in a step S423 notifies the communication unit 322 of the area of the buffer memory for synchronization 323, acquired in the step S420. The processing sequencer then awaits the completion of storage of the data from the destination of transmission of the request (step S424) and, on completion of data storage, instructs the communication unit 322 to notify the destination of request transmission of the fact of completion of the processing relevant to the delay write command (step S425). The communication unit 322 is responsive to the instruction to notify the destination of request transmission of the completion of the processing pertinent to the delay write command (step S425). The processing sequencer 321 then terminates the processing.

In writing data on the recording medium 101, the processing sequencer 321 manages control not to write the portions of the data which have the same synchronization ID as that of the data already stored in the buffer memory for synchronization 323 and which are stored in an area of the buffer memory for synchronization even partially overlapping with the storage area of the buffer memory for synchronization for the stored data. That is, the processing sequencer 321 manages control so that data processed based on the next following delay write command is valid insofar as the data written in the same area is concerned.

It is assumed that the delay write command instructing the data writing in a given area in the recording medium 101 has arrived at the storage 302 and that the delay write command instructing the writing in the same area also has arrived. It is further assumed that the two delay write commands have the same synchronization ID. In this case, data is written once between the restart enabling points and further data is overwritten. Thus, it is unnecessary for the processing sequencer 321 to hold the initially written one of the data written in the same area in the buffer memory for synchronization 323 of the standby storage 302. When the delay write command is newly received from the storage unit 301, the processing sequencer 321 checks whether or not the data to be overwritten is present in the buffer memory for synchronization 323. If the data to be overwritten is identified, the data is deleted from the buffer memory for synchronization 323.

The operation of the applications 310a and 310b notifying the storage unit 301 of the restart enabling point, by way of the processing for notifying the restart enabling point, is now explained. In the following instance, a case in which the application 310a executes the processing for notifying the restart enabling point is taken as an example.

When the application 310a notifies the restart enabling point, the application 310a instructs the IO management unit 311 to notify the restart enabling point. When the IO management unit 311 is commanded by the application 310a to notify the restart enabling point, the restart enabling point notifying unit 312 issues a restart enabling point notification command to the storage unit 301.

When the restart enabling point notification command arrives at the storage unit 301, the restart enabling point notification command is supplied to the communication unit 322 in the storage unit controller 320. On receipt of the restart enabling point notification command, the communication unit 322 delivers the restart enabling point notification command to the processing sequencer 321 to command the start of the processing for notification of the restart enabling point.

Figure 25:
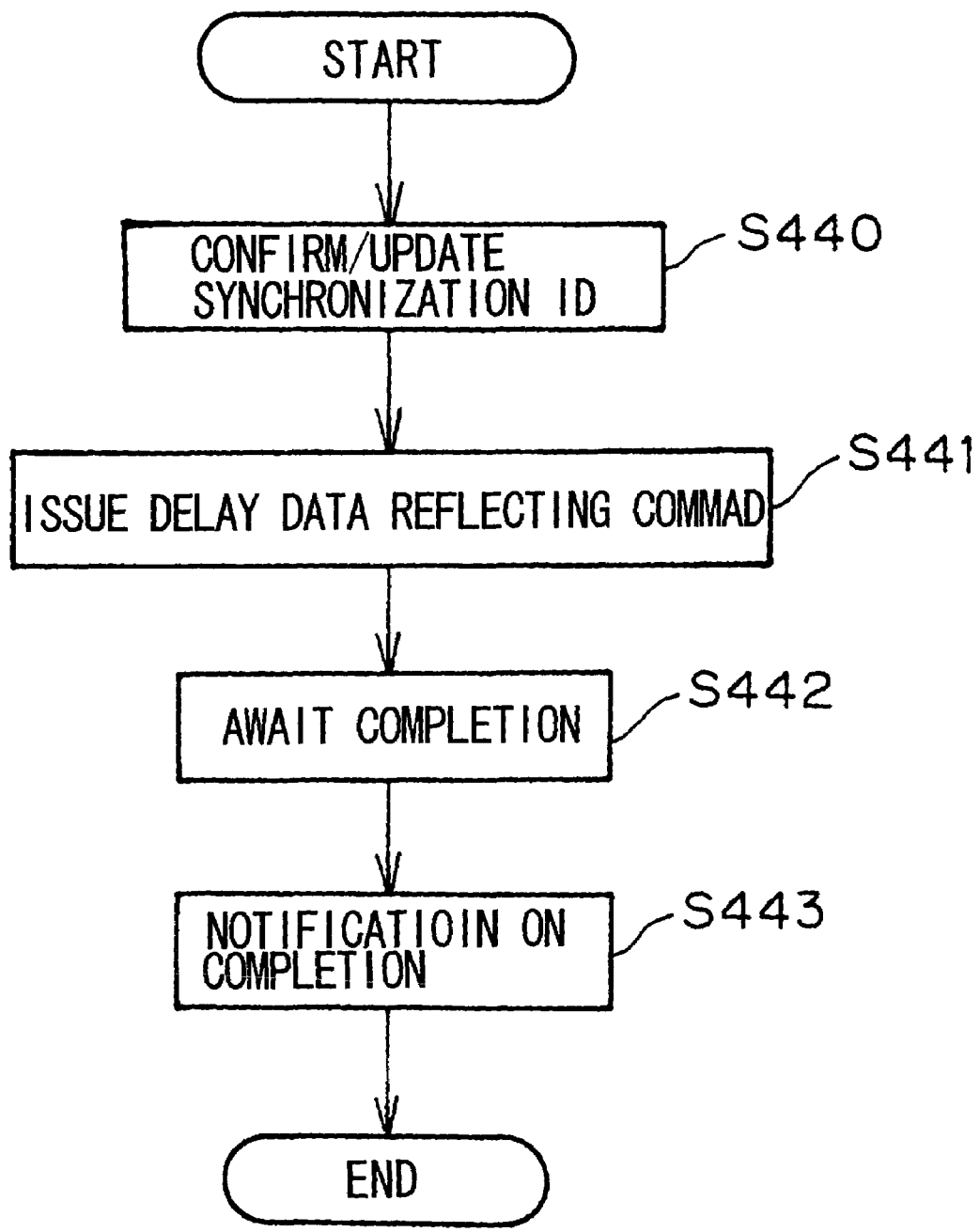
FIG. 25 is a flowchart showing the operation of delay data reflecting processing.

FIG. 25 depicts a flowchart showing the operation of the processing sequencer 321. The processing sequencer 321 first holds the value of the internal synchronization ID at a given time point and subsequently updates the value of the synchronization ID (step S440). The holding of the value of the synchronization ID is holding the value in e.g. a register. The processing sequencer 321 then instructs the communication unit 322 to transmit the delay data reflecting command, specifying the synchronization ID held in the step S440, to the storage unit 302. The communication unit 322 is responsive to the instruction to transmit the delay data reflecting command to the storage unit 302 (step S441). The processing sequencer 321 then awaits a message indicating the completion of processing based on the delay data reflecting command from the storage unit 302 (step S442). When notified by the communication unit 322 that the message indicating completion of the processing has arrived, the processing sequencer 321 notifies the host 300 of the completion of the processing which is based on the restart enabling point notification command, through the communication unit 322 (step S443) to terminate the processing.

It is noted that, to each delay write command, output after transmission of one delay data reflecting command, not only the synchronization ID saved in e.g. a register but also the post-update synchronization ID is appended, as shown in FIG. 22.

The operation when the delay data reflecting command of the storage unit 302 is received is now explained. When the delay data reflecting command has arrived at the storage unit 302, the delay data reflecting command is supplied to the communication unit 322 of the storage unit controller 320 of the storage unit 302. On receipt of the delay data reflecting command, the delay data reflecting command is delivered to the processing sequencer 321 to command the start of the delay data reflecting processing.

Figure 26:
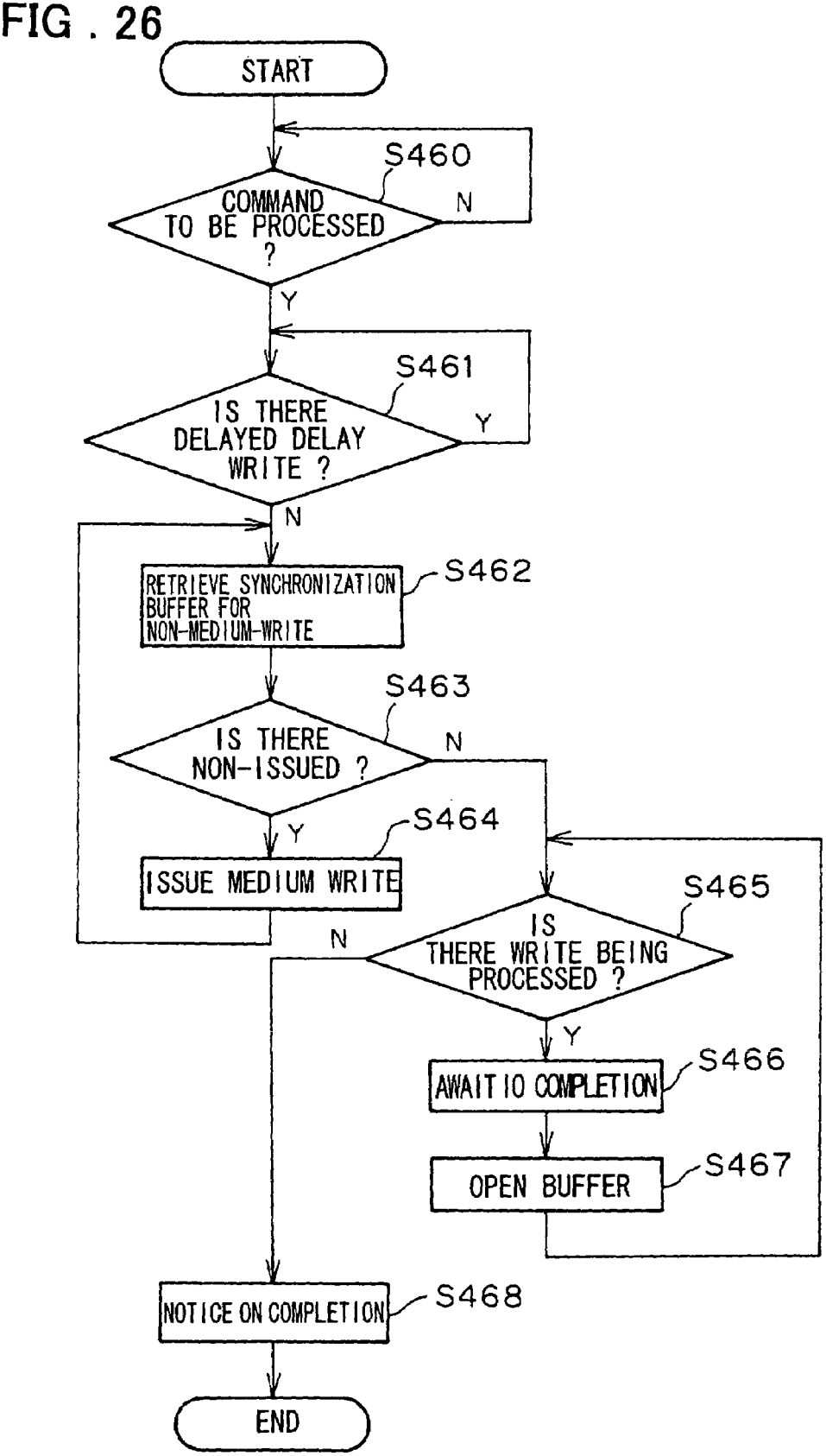
FIG. 26 is a flowchart showing the delay data reflecting processing.

FIG. 26 depicts the flowchart showing the processing of reflecting the delay data by the processing sequencer 321 in the storage unit controller 320 of the storage unit 302. The processing sequencer 321 verifies whether or not the value of the synchronization ID appended to the arriving delay data reflecting command is the value next following the delay data reflecting command processed last time (step S460). If the value is not the next value, the processing sequencer 321 awaits the arrival of the delay data reflecting command having a value of the synchronization ID next following the synchronization ID of the delay data reflecting command processed last time. It is assumed that, in the instance shown in FIG. 22, the delay data reflecting command processed last time is the delay data reflecting command of the synchronization ID "23". If then the delay data reflecting command with the synchronization ID "25" is received, the processing sequencer 321 awaits the arrival of the delay data reflecting command of the synchronization ID "24". After executing the processing of the steps S461 to S468 on the delay data reflecting command with the synchronization ID "24", the processing sequencer 321 executes the processing as from the steps S461 ff. on the delay data reflecting command with the synchronization ID "25".

If the synchronization ID is the value next following the directly previous synchronization ID, it is checked whether or not the totality of data corresponding to the delay write commands having issuing ID values ranging between the value of the issuing ID of the delay data reflecting command processed last time and held and the issuing ID appended to the delay data reflecting command currently processed have been recorded in the buffer memory for synchronization 323 (step S461). For example, assume that, among the commands shown in FIG. 22, the issuing ID of the delay data reflecting command processed last time is "71" and that the issuing ID of the delay data reflecting command currently processed is "76". In such case, it is checked whether or not data corresponding to the delay write commands with the issuing ID of "71" to "75" are all recorded in the buffer memory for synchronization 323. It is noted that the data deleted as being the overwritten data need not be included in this recording check. Should there be dropout, the processing sequencer 321 waits until all data associated with the respective delay write commands have arrived at the storage unit of the standby system 302 and recorded in the buffer memory for synchronization 323.

In a step S463, the processing sequencer 321 retrieves the buffer memory for synchronization 323 to search for the delay write command which has the synchronization ID coincident with the synchronization ID specified by the delay data reflecting command and which is not being write-processed. For example, should the delay data reflecting command with the issuing ID of "76" of FIG. 22 be received and processed, the delay write command which has the synchronization ID coincident with the synchronization ID "24" appended to its command and which is not being write-processed is retrieved. If, as a result of retrieval, such command is not found, it indicates that there is no delay write command the data write processing of which on the recording medium 101 has not been commenced. In this case, processing transfers to a step S465. If the delay write command being retrieved has been found, it indicates that there exists a delay write command the data write processing of which on the recording medium 101 has not been commenced. In this case, processing transfers to a step S464.

In the step S464, a command of writing corresponding data in the buffer memory for synchronization 323 (write request) in a location for writing data on the recording medium 101, specified by the delay write command as found by the retrieval of the step S462 (offset address), is registered in the IO scheduler 104. The IO scheduler 104 is responsive to the write request to command the medium control unit 105 to write data as a target for data transfer. The medium control unit 105 is responsive to the write command to output the data from the buffer memory for synchronization 323 to the recording medium 101. The processing sequencer 321 sets the retrieved area in the buffer memory for synchronization 323 as an area being write-processed to go back to the step S462.

In the step S465, it is checked whether or not the data is being output from the buffer memory for synchronization 323 to the recording medium 101. If the data is being output, processing transfers to a step S466 and, if the processing has already come to a close, processing transfers to a step S468. In the step S466, the processing sequencer 321 waits until one of the data outputting operations to the recording medium 101 is finished, and sets the area in the buffer memory for synchronization 323, which has been the target of the finished processing, to a non-use state (step S467). The processing sequencer 321 then goes back to the step S465. In the step S468, the processing sequencer 321 instructs the communication unit 322 to notify the source of transmission of the delay data reflecting command, herein the storage unit 301, of the completion of the processing corresponding to the delay data reflecting command. The communication unit 322 is responsive to the instruction to notify the source of transmission of the delay data reflecting command of the completion of the processing. The processing sequencer 321 also updates the synchronization ID and the issuing ID, held as the information of the delay data reflecting command, processed last time, to those of the delay data reflecting command, currently processed, to complete the processing.

The operation on breakout of a disaster is now explained. If the host 300 has become unusable due to e.g. a disaster, the storage unit 302 is switched from the standby system to the normal system. The host 303 takes over the processing from the host 300.

The operation of the host 303 since the detection of a malfunction until restart is now explained. First, the host monitoring unit 313 in the host 303 detects the abnormalities of the host 300. On detection of the abnormalities of the host 300, the host monitoring unit 313 issues a delay data discarding command to the storage unit 302 of the standby system, and awaits a response to the delay data discarding command. On receipt of the response, the host monitoring unit 313 of the stand-by system host 303 executes the applications 310a and 310b of the stand-by system host 303. As from this time, data write/read from the host 303 is carried out for the storage unit 302.

Meanwhile, the host monitoring unit 313 of the host 303 is having communication with the host 300 at all times or periodically. If the host monitoring unit 313 becomes unable to communicate with the host during a prefixed time or an abnormality is reported from the host 300, the host monitoring unit 313 recognizes that a disaster has broken out in the host 300. In order for the host 303 to reliably recognize the abnormality of the host 300, the host 303 is desirably connected to the host 300 over a leased line.

The operation in case the storage unit 302 of the standby system has received the delay data discarding command from the host of the standby system 303 is now explained. On arrival of the delay data discarding command at the storage unit 302, the delay data discarding command is sent to the communication unit 322 of the storage unit controller 320 of the storage unit 302. On receipt of the delay data discarding command, the communication unit 322 delivers the delay data discarding command to the processing sequencer 321 to command the start of the processing for discarding the delay data.

Figure 27:
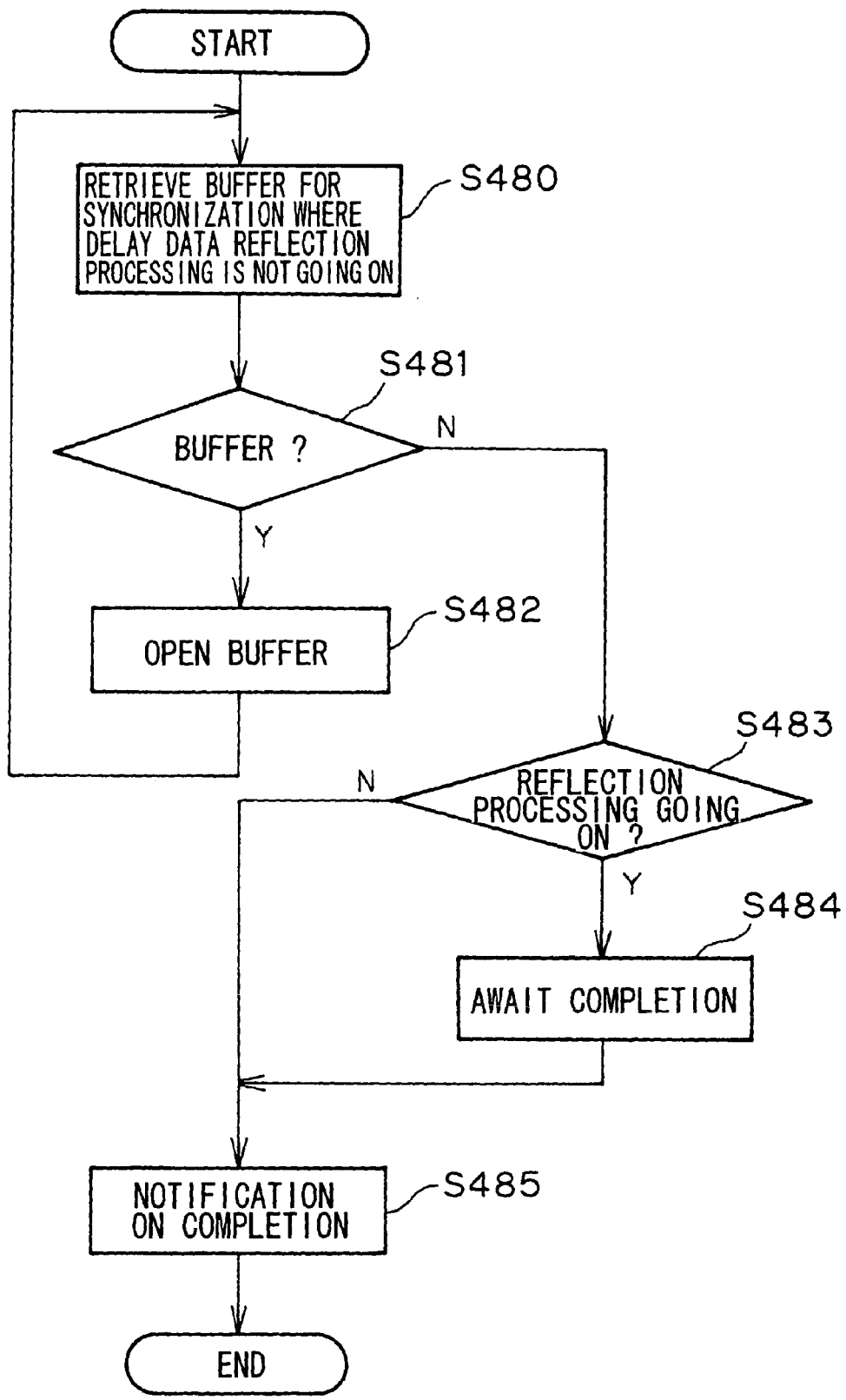
FIG. 27 is a flowchart showing the delay data discarding processing.

FIG. 27 depicts a flowchart showing the processing for discarding the delay data executed by the processing sequencer 321. The processing sequencer 321 retrieves the buffer memory for synchronization 323 (step S480). In this step S480, the processing sequencer 321 retrieves data that need not be moved to the recording medium 101 because the delay data reflecting command has as yet not been delivered. If, as a result of the retrieval, the data has not been found, the processing sequencer 321 proceeds to a step S483 and, if the data has been found, the processing sequencer proceeds to a step S482 (step S481). For example, if the data reflecting command of the issuing ID of "76", among the commands shown in FIG. 22, has not been received, but data of one or more delay write commands of the issuing IDs of "72] to "75" are stored in the buffer memory for synchronization 323, the processing sequencer 321 proceeds to the step S482. If the delay data reflecting command of the issuing ID of "76" has been received and the data of the respective delay write commands have been moved to the recording medium 101, the processing sequencer 321 proceeds to the step S483.

In the step S482, the processing sequencer 321 sets the area in the buffer memory for synchronization 323, having recorded the data found in the step S480, to a non-use state, and subsequently goes back to the step S480. Then, in the next step S481, the processing sequencer proceeds to the step S483. If, in the step S483, the delay data reflecting processing is going on, the processing sequencer 321 proceeds to a step S484 and, if otherwise, the processing sequencer 321 proceeds to a step S485.

In the step S484, the processing sequencer 321 awaits the completion of the delay data reflecting processing then going on. When the processing has been completed, the processing sequencer 321 moves to the step S485. In this step 485, the processing sequencer 321 instructs the communication unit 322 to notify the source of issuance of the delay data discarding command, herein the host 303, of the completion of the processing pertinent to the delay data discarding command. The communication unit 322 is responsive to the instruction to notify the completion of the processing to the issuing source of the delay data discarding command. The processing sequencer 321 then terminates the processing.

In the present embodiment, when the host of the normal system 300 outputs the write command to the storage unit 301, the storage unit of the standby system 302 receives data written from the storage unit 301. However, the data is not recorded in the recording medium 101, but is recorded in the buffer memory for synchronization 323. On receipt of the restart enabling point notification command, the storage unit 302 causes the data to be moved from the buffer memory for synchronization 323 to the recording medium 101. If the delay data discarding command is received, the storage unit 302 sets the buffer memory for synchronization 323 to a non-use state. Thus, the recording medium 101 of the storage unit 302 is maintained at all times in a state in which the processing by the applications 310*a* and 310*b* can be commenced. As a result, if an abnormality has occurred in the host 300, the host 303 can immediately continue the processing.

Moreover, the storage unit of the normal system 301 does not transmit the data written during the tine between the restart enabling points to the storage unit of the standby system 302 at a time, but sends the write commands in each timing of receipt of the write command. Since the large amount of data is not transmitted at a time, the data transfer time with the host 302 may be diminished.

The respective commands received by the storage unit of the standby system 302 from the storage unit 301 are supervised by the synchronization ID and the issuing ID, such that the sequence of arrival of data sent by the storage unit of the normal system during the time between the restart enabling points may be arbitrary. Since no limitations are imposed on the sequence in which the delay write command sends the data corresponding to the delay write command, designing may advantageously be facilitated.

In the present embodiment, the case in which both the synchronization ID and the issuing ID are appended to the delay write command and to the delay data reflecting command has been explained. Alternatively, only the issuing ID may be appended. In such case, when the delay data reflecting command is received, the processing sequencer 321 of the storage unit of the standby system 302 only has to execute the following processing operations in place of performing the steps S460 and S461. When the delay data reflecting command is received, the processing sequencer 321 verifies whether or not all of the commands having appended thereto all of the issuing IDs between the issuing ID of the delay data reflecting command processed last time and the issuing ID of the currently received delay data reflecting command have been received. If all commands which have the respective issuing commands appended, have been received, the processing as from step S462 (see FIG. 26) is executed. If all commands which have the respective issuing commands appended, have not been received, the processing as from the step S462 is commenced on receipt of all the respective commands.

It is assumed that, of the respective commands, in which the synchronization Id is not appended, shown in FIG. 22, the delay data reflecting command, having the issuing ID "71", is the delay data reflecting command processed last time. If thereafter the delay data reflecting command with the issuing ID "76" is received, the processing sequencer 321 checks to see whether or not the commands with the issuing IDs "72" to "75" have been received. The processing sequencer commences the processing as from the step S462 after receipt of all of these commands. If the processing sequencer 321 has received the delay data reflecting command with the issuing ID "80" before receipt of the issuing ID "76", the processing sequencer 321 verifies whether or not the commands with the issuing IDs of "72" to "79" have been received. When the commands with the issuing IDs of "72" to "76" have all been received, the processing sequencer proceeds to process the delay data reflecting command with the issuing ID "76". When thereafter the commands with the issuing IDs "77" to "79" have all been received, the processing sequencer proceeds to process the delay data reflecting command with the issuing ID "80".

When the synchronization ID is also appended to each command, the data to be overwritten may be specified when the delay write command has been received. If the synchronization ID is not used, the processing sequencer 321 specifies the data to be overwritten, just prior to start of the processing of the step S462, and deletes the data from the buffer memory for synchronization 323

In the seventh embodiment, a delay write requesting means and a write execution requesting means are implemented by the processing sequencer 321 and the communication unit 322 of the storage unit 301. A temporary storage means is implemented by the buffer memory for synchronization 323. A storage processing means is implemented by the processing sequencer 321, IO scheduler 104 and the medium control unit 105 of the storage unit 302. A restart enabling point notifying means is implemented by the restart enabling point notifying unit 312.

Embodiment 8

Figure 28:
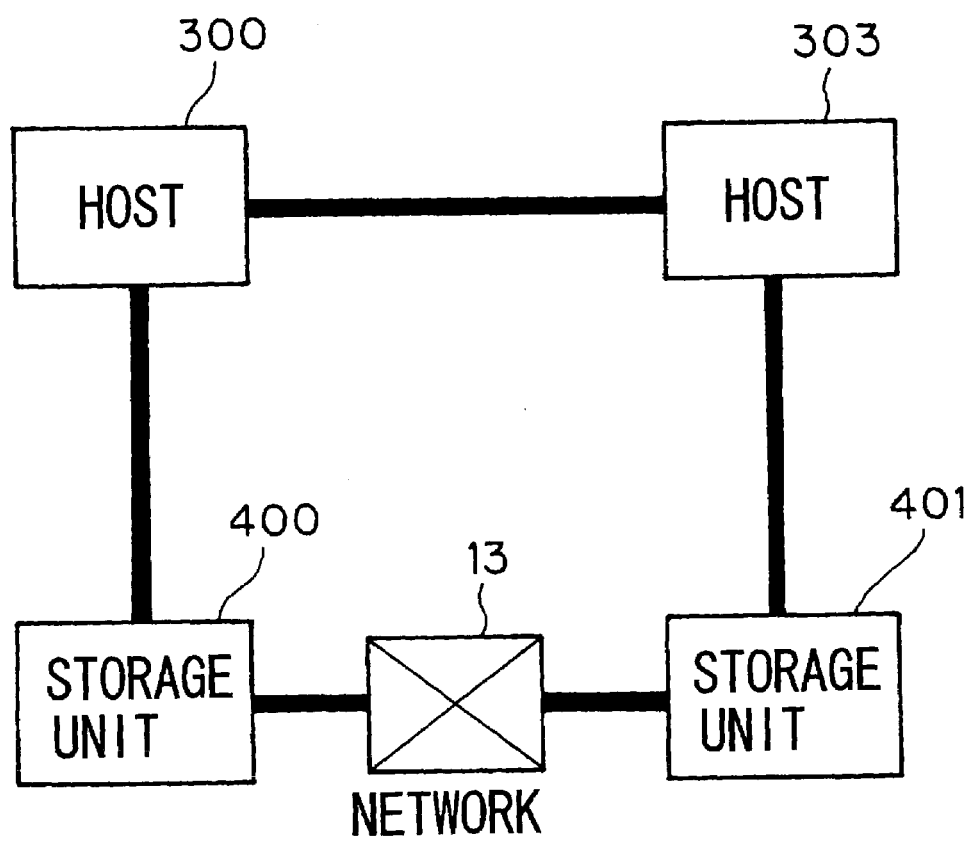
FIG. 28 is a block diagram showing an eighth embodiment of the data copying system.

FIG. 28 depicts a block diagram showing the eighth embodiment of the data copying system according to the present invention. In the present embodiment, the storage unit plays a crucial role in data transfer. Moreover, the data in the normal system is mirrored to a remote place. In addition, a storage unit of the standby system, capable of saving snap shots at least one generation before, is provided in the system. By the snap shots one generation before is meant the address information of the recording medium 101 in which data was stored in the latest restart enabling point.

In the data copying system, shown in FIG. 28, a storage unit 400 is locally connected to a host 300 employing the storage device 400, while a storage unit 401 is locally connected to a host 303 employing the storage unit 401. The storage unit 301 is connected over the network 13 to the storage unit 302, while the hosts 300 and 303 are interconnected, such as to enable communication, in order for the host 303 to monitor the status of the host 300. The hosts 300 and 303 are preferably interconnected over a leased line. However, the hosts may also be interconnected over a network other than the leased line, such as the Internet. Meanwhile, the structure of the hosts 300 and 303 is similar to the structure of the hosts 300 and 303 in the seventh embodiment (see FIG. 20).

The storage units 400 and 401 may, for example, be each a unit magnetic disc device, a unit optical disc device or a unit magneto-optical disc device. As the storage units 400 and 401, a disc array device, which is a set of unit magnetic disc devices, unit optical disc devices or unit magneto-optical disc devices, may be used. The hosts 300 and 303 and the storage units 400 and 401 are interconnected by for example the SCSI, Fiber channel or Ethernet (trademark). Meanwhile, it is assumed that, in the system shown in FIG. 28, the host 300 is the host of the normal system which is in operation when the system is operating trouble-free, while the host 303 is a host of the standby system which is in operation when a trouble has occurred in the host 300.

In the present embodiment, the applications 310a and 310b, operating on the host 300, perform restart enabling point notifying processing, during its operation, for notifying the storage unit 301 that the timing is a restart enabling point in which the applications can directly restart the operation for the current data state. It should be noted that the operation of the hosts 300 and 400 when the applications 310a and 310b read out data from the storage unit 400 is similar to that of the usual data read processing, and that the operation of the IO scheduler 104 and the medium control unit 105 in the storage unit 400 is similar to that of the IO scheduler 104 and the medium control unit 105 in the first embodiment.

The applications 310a and 310b in the present embodiment are the applications equipped with the re-start functions. That is, the applications are such applications in which the processing can be restarted when the data recording state of the recording medium 101 of the storage unit is the preset state.

Figure 29:
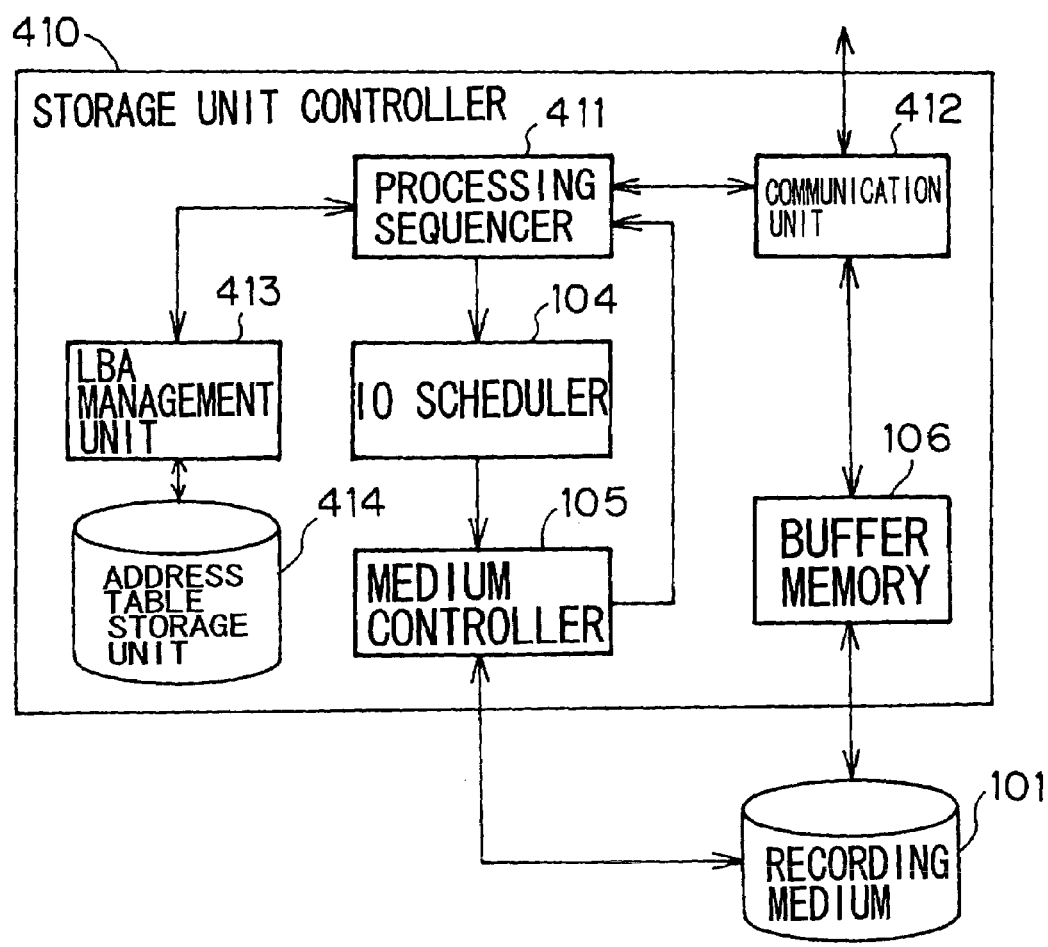
FIG. 29 is a block diagram showing an illustrative structure of a storage unit.

FIG. 29 depicts a block diagram showing an illustrative structure of the storage unit 400 shown in FIG. 28. The structure of the storage unit 401 is similar to that shown in FIG. 29. The storage unit 400 includes a storage unit controller 410 and a recording medium 101 as a main part of the storage unit. The storage unit controller 410 includes a communication unit 412 for communication with the host 300 and other storage units, a processing sequencer 411 for supervising the sequence of various processing operations, an IO scheduler 104 for managing sequence control of processing commands for the recording medium 101, a medium control unit 105 for controlling the operations of the recording medium 101 in accordance with processing commands issued by the IO scheduler 104, a buffer memory 106 for temporary storage of data from the host 300 to the recording medium 101 or from the recording medium 101 to the host 300, an LBA management unit 413 for supervising the logical block addresses, and an address table storage unit 414 having stored an address table used for supervising the logical block addresses. The processing sequencer 321 may be implemented by for example a CPU operating under a preset program.

Meanwhile, there are occasions where a semiconductor memory is used as the buffer memory for synchronization 323. In addition, a recording device of a larger storage capacity, such as a magnetic disc device, an optical disc device or a magneto-disc device, may be used.

The storage units 400 and 401 manage data by a physical address space of the recording medium 101. If a request from another device, such as a request for data write or data read, is accepted, the write area or the read area is specified by the addresses of the logical address space. The logical address space at the restart enabling point is termed the snap shot logical address space, while the logical address at the latest time point is termed the latest logical address space. The storage units 400 and 401 prosecute the processing using the information of the snap shot logical address space and the information of the latest logical address space. There are occasions where the storage units 400 and 401 supervise plural snap shot logical address spaces.

Figure 30:
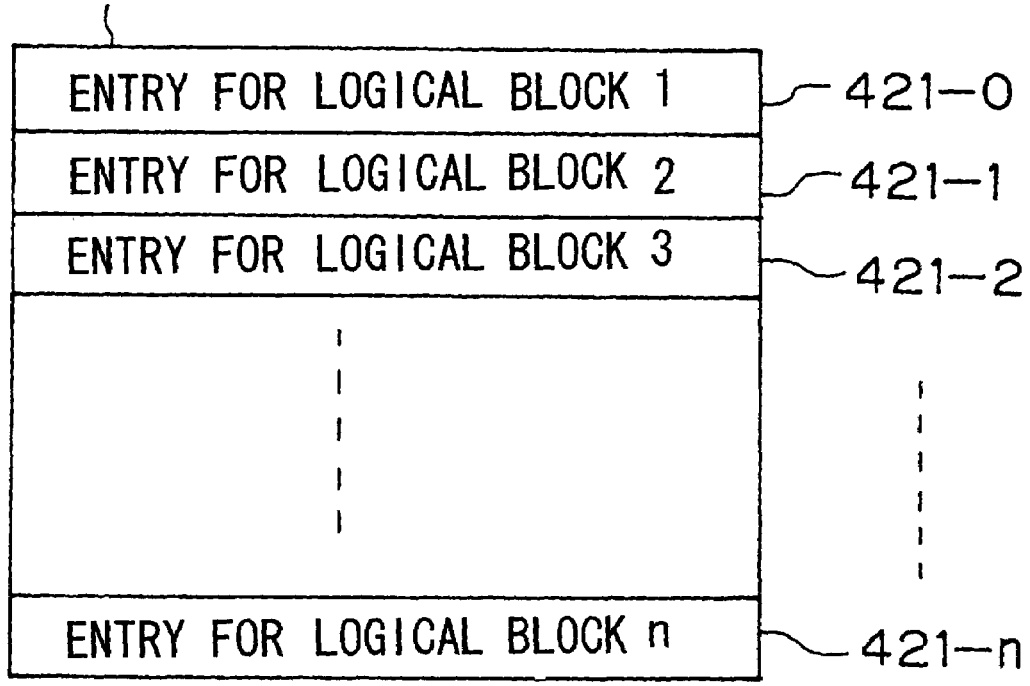
FIG. 30 is a diagrammatic view showing an illustrative address table.

FIG. 30 shows an instance of the address table stored in the address table storage unit 414. The address table 420 is made up by plural entries 420-0 to 420-n. The entries 420-0 to 420-n correspond to logical blocks obtained on division of the logical address space into plural fixed-length data.

Figure 31A:
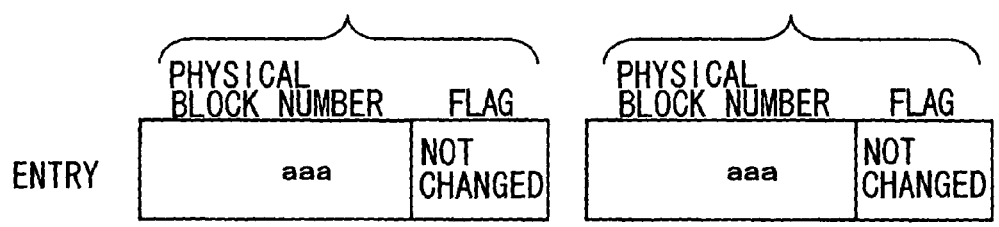
FIGS. 31A to 31D are diagrammatic views showing entries.

FIG. 31a illustrates the entries. The physical block numbers in the storage unit, associated with the latest logical address space, and the physical block numbers, associated with the snap shot logical address space, make up the information forming the respective entries 420-0 to 420-n. Each physical block number is associated with a flag used for recording that the block number has been changed since the latest formulation of the snap shot. The physical block number is a unique number accorded to each physical block and is obtained on dividing the address space of the storage units into plural data of a fixed length. Meanwhile, there is no necessity of according a flag to the physical block number associated with the snap shot logical address space.

Figure 31B:
Figure 31C:
Figure 31D:

FIG. 31b shows an example of the initial state of one entry. FIG. 31b indicates that data is stored in an address corresponding to the physical block number "aaa". Since data is not changed as from the restart enabling point, the physical block number corresponding to the latest logical address space is also "aaa". It is assumed that a request has been made for writing in an address corresponding to the physical block number "aaa". In such case, the writing is made to another address and a physical address number "bbb" associated with the address is held as the physical block number associated with the latest logical address space. The flag corresponding to the latest logical address space is updated to "changed". When the time is the restart enabling point, the information corresponding to the latest logical address space is copied to the information corresponding to the snap shot logical address space, as shown in FIG. 31d. The flag associated with the latest logical address space is set to "not changed".

In the present embodiment, the information corresponding to the snap shot logical address space is used as a snap shot.

As a result, the data, attempted to be written newly, is written, until the next restart enabling point, in an address different from the address in which it has been attempted to write the data. Thus, the data at the time of the restart enabling point is left. By managing the writing of data in the storage unit of the standby system in this manner, the host 303 is able to re-start the processing immediately even if an abnormality has occurred in the host 300.

On the other hand, the address table storage unit 414 stores an unused block table in which there has been recorded the block number of the physical block not contained in any logical address space. As the address table storage unit 414, a non-volatile semiconductor memory, a magnetic disc device, an optical disc device or a magneto-optical disc device is used. There are occasions where a portion of the storage area of the recording medium 101 is used as the address table storage unit 414.

The operation of the host 300 writing data in the storage units 400 and 401 is now explained. When writing data in the storage unit 400, the host 300 outputs a write command to the communication unit 412 in the storage unit controller 410 of the storage unit 400. On receipt of the write command, the communication unit 412 delivers the write command to a processing sequencer 411 to command the processing sequencer 411 to start the write processing. The write processing executed by the processing sequencer 411 differs depending on whether the storage unit of the destination of data transfer has been set. Meanwhile, the storage unit 401 is set as the destination of data transfer for the storage unit 400, while no destination of data transfer is set for the storage unit 401.

Figure 32:
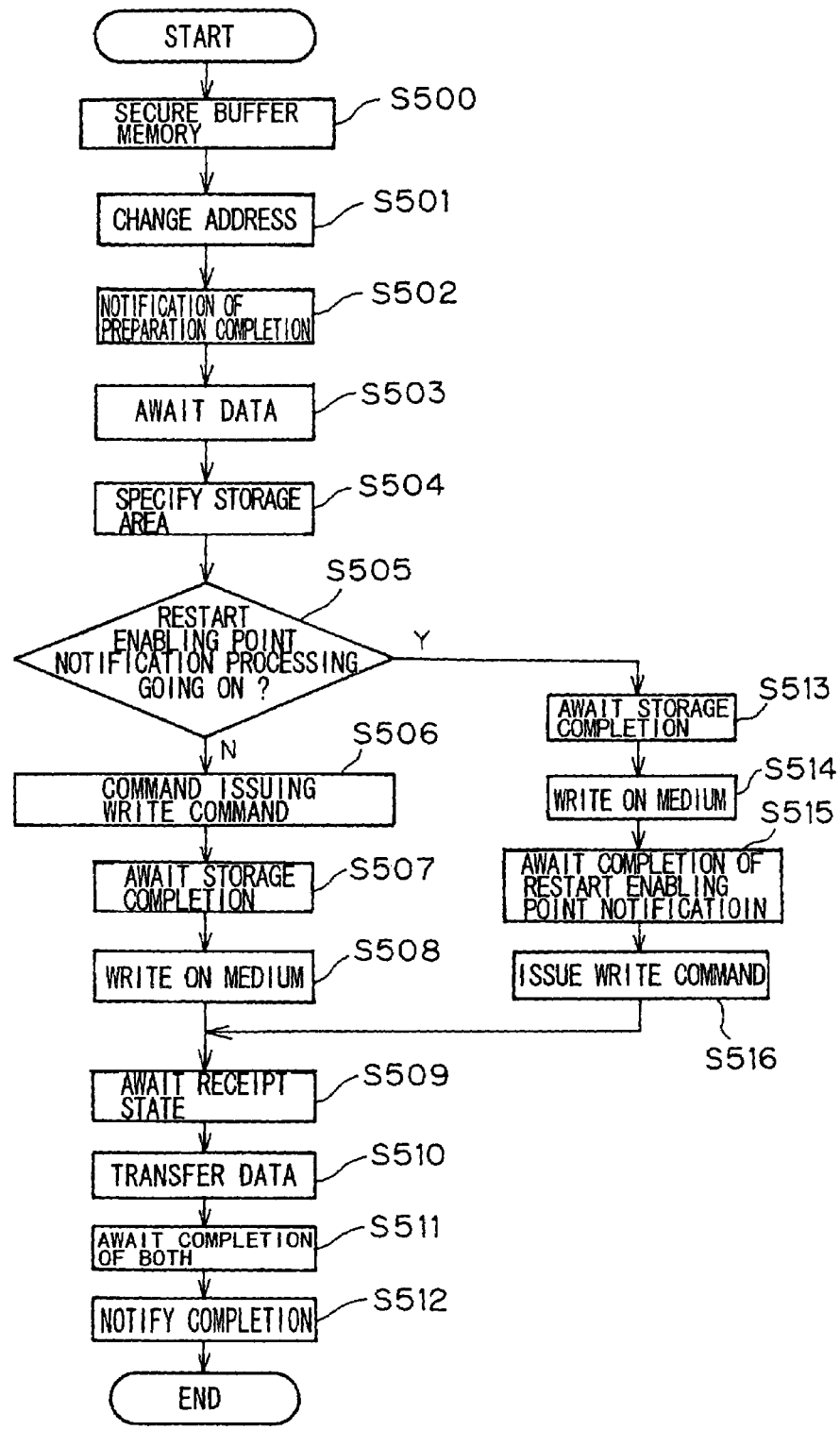
FIG. 32 is a flowchart showing the operation of the processing sequencer.

FIG. 32 depicts a flowchart showing the operation of the processing sequencer 411 in the storage unit controller 410 when the destination of data transfer is set. In the present embodiment, FIG. 32 depicts a flowchart showing the operation of the processing sequencer 411 in the storage unit 400. When the destination of data transfer has been set, the processing sequencer 411 first secures an area necessary for received data in the buffer memory for synchronization 323 (step S500). The processing sequencer 411 then causes the LBA management unit 413 to convert the logical address into the physical address by specifying that the address is the logical address of the destination of writing specified by the write command and also by specifying that the processing is the write processing (step S501). The LBA management unit 413 allocates the physical block number corresponding to the latest logical address space shown in FIG. 31 and returns the physical address associated with the physical block number to the processing sequencer 411. The operation in the LBA management unit 413 in the step S501 will be explained in detail later.

The processing sequencer 411 then instructs the communication unit 412 to send a notice for completion of preparation to the host 300 (step S502). The communication unit 412 is responsive to the instruction to transmit the notice of the completion of preparation to the host 300. The processing sequencer 411 then awaits the arrival of data from the host 300 (step S503). On receipt of the data and an inquiry from the communication unit 412 of the area of the buffer memory 106 in which to store the data, the processing sequencer 411 notifies the communication unit 412 of the area secured in the step S500 (step S504). If the restart enabling point notification processing is executed, the processing sequencer 411 moves to a step S513 and, if otherwise, the processing sequencer 411 moves to a step S506 (step S505). The "restart enabling point notification processing being executed" means a case in which the restart enabling point is notified from the host 300 and preset processing is performed on the storage unit 401. Specifically, the processing sequencer moves to a step S513 or to a step S506 when the processing of steps S562 to S564 is or is not performed, respectively.

In the step S506, the processing sequencer 411 instructs the communication unit 412 to issue a write command to a storage unit of the destination of data transfer, herein a storage unit 401. In this write command, the destination of writing is specified by the logical address. The communication unit 412 is responsive to the instruction to send the write command to the storage unit of the destination of data transfer. The processing sequencer 411 then awaits the completion of storage of the data from the host 300 in the buffer memory 106 (step S507). When the completion of storage of all data in the buffer memory 106 is notified from the communication unit 412, the processing sequencer 411 registers in the IO scheduler 104 the instruction of writing the data stored in the buffer memory 106 in the area corresponding to the physical address converted in the step S501. The IO scheduler 104 is responsive to the write request to instruct the medium control unit 105 to write the data of interest. The medium control unit 105 is responsive to the contents of registration to write data from the buffer memory 106 to the recording medium 101 (step S508).

The processing sequencer 411 awaits the message for completion of preparation from the storage unit 401 (step S509). When notified from the communication unit 412 that the message for completion of preparation has been received from the storage unit 401, the processing sequencer 411 instructs the communication unit 412 to send data stored in the buffer memory 106 to the storage unit 401 (step S510). The processing sequencer then awaits the message for completion of reception transmitted from the storage unit 401 and the notice for write completion from the medium control unit 105 (step S511). When notified from the communication unit 412 that the message for completion of reception transmitted from the storage unit 401 has been received and notified of the completion of writing from the medium control unit 105, the processing sequencer 411 notifies the host 300 of the fact of completion to terminate the processing.

The processing sequencer 411 awaits the completion of data storage in the buffer memory 106 from the host 300. When notified from the communication unit 412 that all data have been stored in the buffer memory 106, the processing sequencer 411 registers in the IO scheduler 104 a command to write data stored in the buffer memory 106 (write request) in an area corresponding to the physical address converted in the step S501 (step S514). The processing sequencer 411 then awaits the completion of the restart enabling point notifying processing (step S515). On completion of the restart enabling point notifying processing, the processing sequencer 411 instructs the communication unit 412 to issue the write command to the storage unit of the destination of data transfer (step S516). This write command specifies the write destination with a logical address. After the step S516, processing transfers to a step S509.

In the processing in the steps S506 to S508 and in the steps S513 to S516, the sequence of the processing of issuing the write command to the storage unit 401 and the sequence of the write processing in the recording medium 101 are reversed. The reason for doing this is as follows: In the steps S506 to S508, the write command is sent to the storage unit 401 and the write processing for the recording medium 101 is prosecuted until a response is returned, so that the write command issuing processing is carried out in advance of the processing of writing in the recording medium 101. On the other hand, in the steps S513 to S516, the storage unit 401 is caused to perform entry changes during the time of waiting for the end of the restart enabling point notification processing. Thus, the write command cannot be transmitted to the storage unit until the end of the restart enabling point notification processing. Consequently, the write processing for the recording medium 101 is prosecuted during the time of waiting for the end of the restart enabling point notification processing.

Figure 33:
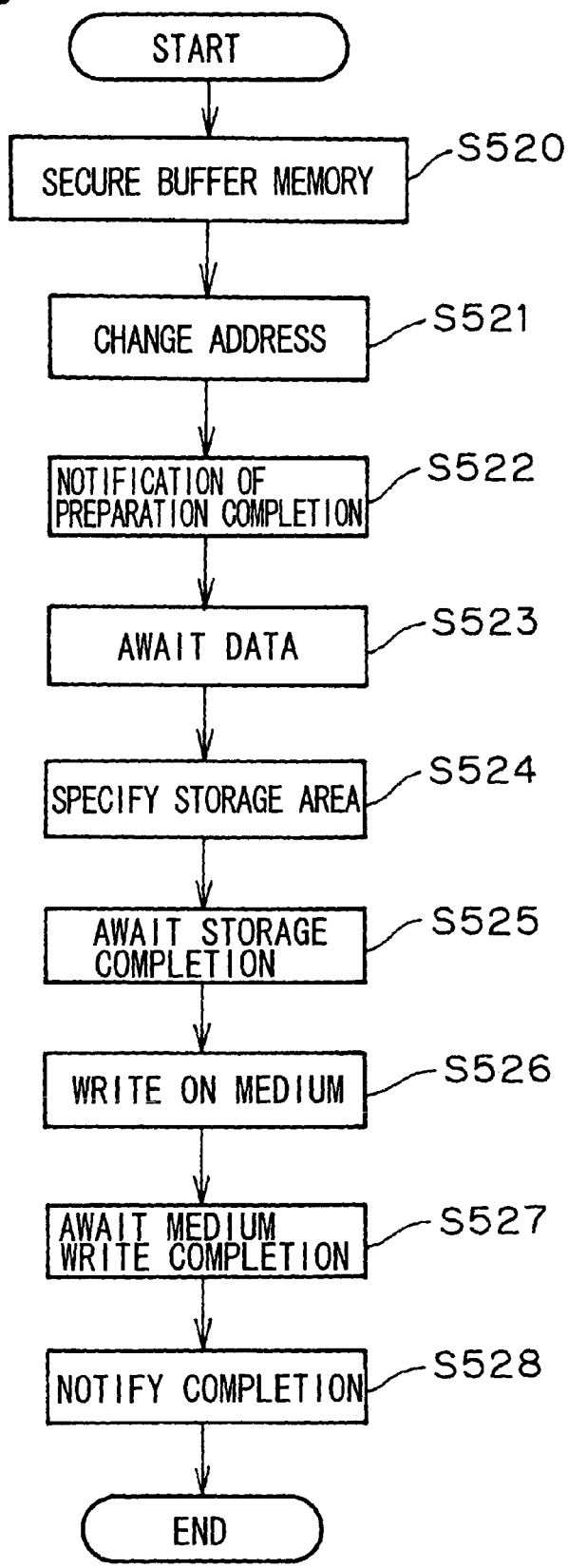
FIG. 33 is a flowchart showing the operation of the processing sequencer.

FIG. 33 depicts a flowchart showing the operation of the processing sequencer 411 in the storage unit controller 410 in case the destination of data transfer is set. That is, in the present embodiment, the flowchart shows the operation of the processing sequencer 411 in the storage unit 401. Specifically, the flowchart shows the operation of the processing sequencer 411 of the storage unit 401 which has received the write command transmitted in the steps S506 and S516.

On receipt of the write command, the processing sequencer 411 secures an area in the buffer memory 106 in which to store the received data (step S520). Moreover, the processing sequencer 411 causes the LBA management unit 413 to change the logical address to the physical address as the address being the logical address of the write destination as specified by the write command and the processing being the write processing are specified (step S521). This processing is similar to the processing of the step S501 (FIG. 32).

The processing sequencer 411 then instructs the communication unit 412 to send the notice for completion of preparation to the storage unit of the origin of data transfer (herein the storage unit 400) (step S522). The communication unit 412 is responsive to the instruction to transmit the notice of the end of preparation to the storage unit of the origin of data transfer. The processing sequencer 411 awaits data arrival from the storage unit of the origin of data transfer (step S523). When the data has arrived and an inquiry is received from the storage unit of the origin of data transfer as to the area of the buffer memory 106 in which to store data, the processing sequencer 411 advises the communication unit 412 of the area acquired in the step S520 (step S524).

The processing sequencer 411 awaits the completion of storage in the buffer memory 106 of data from the storage unit of the origin of data transfer (step S525). When storage of all data in the buffer memory 106 has been notified from the communication unit 412, the processing sequencer 411 registers in the IO scheduler 104 a command (write request) for writing the data stored in the buffer memory 106 in an area corresponding to the physical address converted in the step S521. The IO scheduler 104 is responsive to the write request to instruct the medium control unit 105 to write data of interest. The medium control unit 105 is responsive to the registered contents to write data from the buffer memory 106 to the recording medium 101 (step S526).

The processing sequencer 411 awaits the notice for write completion from the medium control unit 105 (step S527). On receipt of the write completion notification from the medium control unit 105, the processing sequencer 411 notifies the storage unit of the origin of data transfer of the end of the processing (step S528) to terminate the processing.

The storage units 400 and 401 receive the write command, having specified the logical addresses, to commence the write processing. However, the storage units write the data not in the physical addresses associated with the logical addresses, but in separate physical addresses (physical addresses allocated in the steps S501 and S521). Thus, the data of the restart enabling point may be continuously held in the recording medium 101, so that, if an abnormality should occur in the host of the normal system 300, the host of the standby system 303 may restart the processing in a shorter time.

The processing for converting the logical address to the physical address by the LBA management unit 413 is now explained. The conversion processing by the LBA management unit 413 differs depending on whether the designation of the write processing has been made. If the designation to the effect that the processing is the write processing has not been made, the LBA management unit 413 on receipt of the conversion processing as the logical address is specified calculates the logical block number from the logical address and, from the address table storage unit 414, acquires the physical block number associated with the physical block number in the latest logical address space. The LBA management unit 413 also calculates the physical address from the physical block number and the logical block number to notify the processing sequencer 411 of the so calculated physical address. Meanwhile, the logical block number is obtained by dividing the logical block address by the block length and truncating at the decimal point. In calculating the physical address, the physical address is multiplied with the block length to find a product P. On the other hand, the logical address is divided by the block length to find the remainder Q. The sum of P and Q is calculated as being the physical address.

Figure 34:
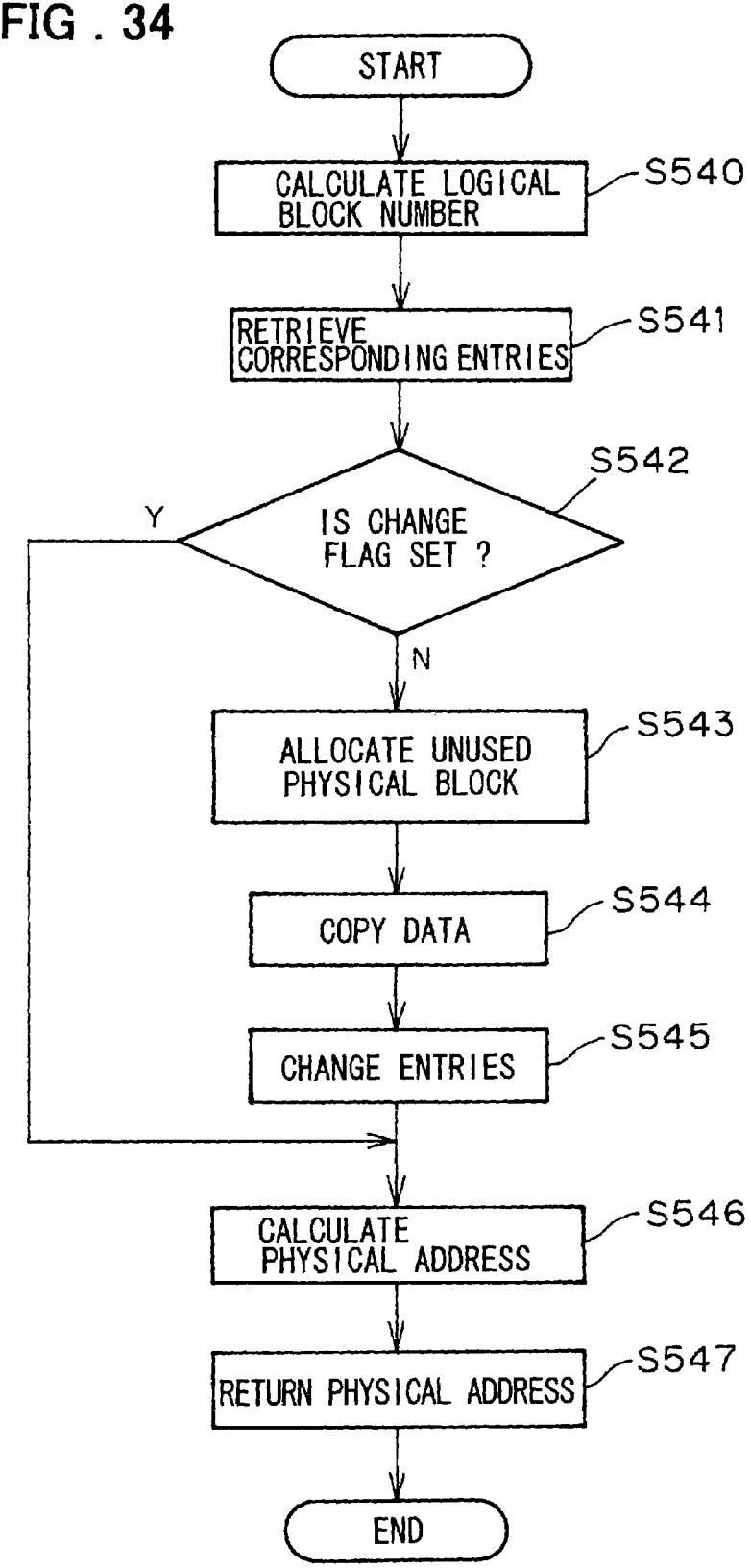
FIG. 34 is a flowchart showing the operation of an LBA management unit.

FIG. 34 depicts a flowchart showing the operation of the LBA management unit 413 in case the processing being the write processing is specified. That is, FIG. 34 depicts a flowchart showing the operation of the LBA management unit 413 in the steps S501 and S521. If the processing being the write processing is specified, the LBA management unit 413 calculates the logical block number from the logical address (step S540). The LBA management unit 413 then acquires, from the address table storage unit 414, the entry corresponding to the logical block number calculated in the step S540 (step S541). In the step S541, the LBA management unit 413 acquires an entry in the latest logical address space. The LBA management unit 413 recognizes the flag paired to the physical block number corresponding to the latest logical address space (step S542). If the flag indicates "changed", processing transfers to a step S546 and, if the flag indicates "not changed", processing transfers to a step S543.

The case in which the flag indicates "not changed" is such a case where the physical block number corresponding to the latest logical address space is equal to the physical block number corresponding to the snap shot logical address space as shown in FIG. 31b. Referring to FIGS. 31b and 31c, the LBA management unit 413 acquires an unused physical block number from the unused block table in the address table storage unit 414 (step S543). It is assumed that the physical block address "bbb" has been acquired. Moreover, from the information of the unused block table, registered in the address table storage unit 414, the information of the acquired physical block number is deleted. The information of the unused block table after the deletion is re-registered in the address table storage unit 414.

In the area corresponding to the physical block number, acquired in the step S543, the information to the effect that the data of an area corresponding to the physical block ("aaa") corresponding in turn to the latest logical address space in the entry acquired in the step S541 is to be copied in the area corresponding to the physical block number "bbb" acquired in the step S543 (copy request), is registered in the IO scheduler 104. The IO scheduler 104 is responsive to the copying request to command the medium control unit 105 to copy the data of interest. The medium control unit 105 performs copying processing between the specified areas in the recording medium 101 (step S544). If the copy processing has been finished, the LBA management unit 413 changes the physical block number ("aaa") corresponding to the latest logical address space of the entry acquired in the step S543 to the physical block number "bbb" acquired in the step S543 and updates the flag paired to the as-changed physical block number to [changed]. The so changed entry is stored in the address table storage unit 414 (step S545). Then, processing transfers to a step S546.

In the step S546, the LBA management unit 413 calculates the physical address from the physical block number of the entry corresponding to the latest logical address space, and notifies the processing sequencer 411 of the so calculated physical address to terminate the processing.

If, after the step S542, the processing as from the step S543 is performed, the physical block number shown in FIG. 31*b* is changed, as shown in FIG. 1*c*. However, when the processing up to the step S547 is finished, the data which is the same as "aaa" is stored in the physical address associated with "bbb". It is in the step S508 or in the step S514 that the storage unit 400 of the normal system rewrites the data of the physical address associated with the "bbb" (see FIG. 32). On the other hand, it is in the step S526 that the storage unit 401 of the standby system rewrites data of the physical address corresponding to the "bbb" (see FIG. 33).

The operation of the applications 310*a* and 310*b* notifying the restart enabling point to the storage unit 400 is now explained. When notifying the restart enabling point to the storage unit 400, the applications command the IO management unit 311 (see FIG. 20) to make notifications of the restart enabling point. The restart enabling point notifying unit 312 in the IO management unit 311 then issues a restart enabling point notification command to the storage unit 400.

When the restart enabling point notification command has arrived at the storage unit 400, this restart enabling point notification command is supplied to the communication unit 412 in the storage unit controller 410. On receipt of the restart enabling point notification command, the communication unit 412 delivers the restart enabling point notification command to the processing sequencer 411 to command the processing sequencer 411 to start the processing for the restart enabling point notification.

Figure 35:
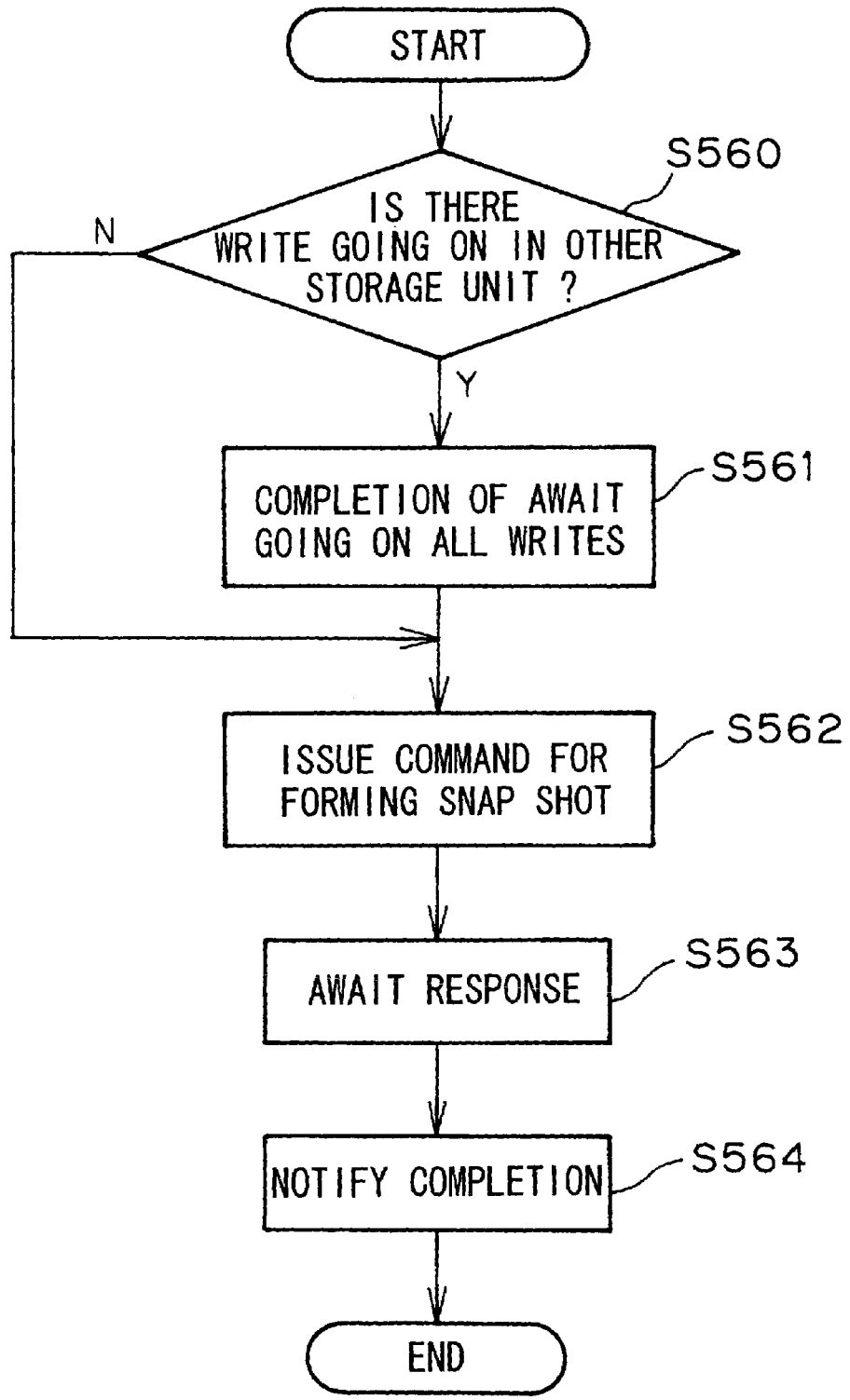
FIG. 35 is a flowchart showing the operation of the processing sequencer.

FIG. 35 depicts a flowchart showing the operation of the processing sequencer 411 which has received the restart enabling point notification command. On receipt of the command, the processing sequencer 411 verifies whether or not there is any write processing request to other storage units which has not been completed, as shown in FIG. 35 (step S560). If there is any, the processing of step S561 is executed. That is, the processing sequencer 411 awaits the completion of the write processing requested to the other storage units (step S561). Meanwhile, the processing sequencer 411 manages the tabulated information indicating whether or not the response to each issued write command has been completed. In the step S560, it is sufficient to give a decision based on this information.

In a state in which the write processing requested to the other storage units has been fully completed, the processing sequencer 411 instructs the communication unit 412 to send a snap shot forming command (snap shot forming request) to the storage unit of the destination of data transfer (herein the storage unit 401). The communication unit 412 is responsive to this command to send the snap shot forming command to the storage unit of the destination of data transfer (step S562). The snap shot forming command is such a command of having the information corresponding to the latest logical address space copied to the information corresponding to the snap shot logical address space and of updating the flag corresponding to the latest logical address space to "not changed". After the step S562, the processing sequencer 411 awaits a response from the storage unit of the destination of transmission (step S563). When notified by the communication unit 412 of the fact of arrival of the response, the processing sequencer 411 instructs the communication unit 412 to notify the host 300 of that effect (step S564) to then terminate the processing.

The operation in case the storage unit 401 as the destination of data transfer has received the snap shot forming command is explained. When the snap shot forming command has reached the storage unit 401, the command is supplied to the communication unit 412 of the storage unit controller 410 of the storage unit 401. On receipt of the snap shot forming command, the communication unit 412 delivers the command to the processing sequencer 411 with a command to start the processing of forming the snap shot.

In the snap shot forming processing, the processing sequencer 411 performs the following processing on the totality of the entries in the address table in the address table storage unit 414. That is, if "changed" is recorded in a flag associated with the latest logical address space, the physical block number associated with the snap shot logical address space of the entry is registered in an unused block table in the address table storage unit 414 as being an unused block. The physical block number corresponding to the latest logical address space is copied in the block number corresponding to the snap shot logical address space. The flag value is also copied at this time. The flag associated with the latest logical address space is then initialized to "not changed".

For example, in the entries shown in FIG. 31*c*, "changed" is recorded in the flag associated with the latest logical address space. In this case, the physical block number "aaa", associated with the snap shot logical address space, is registered as unused block in the unused block table. The physical block number "bbb" associated with the latest logical address space is copied to the block number associated with the snap shot logical address space. The flag "changed" associated with the latest logical address space is copied in similar manner. The entry state is now changed from the state shown in FIG. 31*c* to the state shown in FIG. 31*d*.

If the flag associated with the latest logical address space is "not changed", it indicates that the data stored in the address associated with the physical block number has not been changed as from the directly previous restart enabling point. Thus, no processing is performed on the entry.

After the processing has been finished for the totality of the entries in which the flag associated with the latest logical address space is "changed", the processing sequencer 411 sends a response to the snap shot forming command, using the communication unit 412.

The operation on breakout of a disaster is now explained. If the host 300 has become unusable due to e.g. a disaster, the storage unit 401 is set from the standby system to the normal system. The host 303 also takes over the processing from the host 300.

The operation of the host 303 as from detection of the disaster until application re-start is now explained. First, the host monitoring unit 313 in the host 303 (see FIG. 20) detects an abnormality in the host 300. On detection of an abnormality in the host 300, the host monitoring unit 313 issues a snap shot restoration command to the storage unit 401 of the stand-by system. The host monitoring unit 313 awaits the response to the restoration command. On receipt of the response, the host monitoring unit 313 causes execution of the applications 310*a* and 310*b*. The data write/read for the host 303 then is performed for the storage unit 401.

Meanwhile, the host monitoring unit 313 in the host 303 communicates with the host 300 at all times or periodically. If the host monitoring unit 313 is unable to communicate with the host 300 for a preset time, or an abnormality is reported from the host 300, the host monitoring unit 313 recognizes that a disaster has broken out in the host 300.

The operation in which the storage unit 401 has received the snap shot restoration command is now explained. When the snap shot restoration command has arrived at the storage unit 401, the snap shot restoration command is supplied to the communication unit 412 in the storage unit controller 410 of the storage unit 401. On receipt of the snap shot restoration command, the communication unit 412 delivers the snap shot restoration command to the processing sequencer 411 to command the start of the snap shot restoration processing.

In the snap shot restoration processing, the processing sequencer 411 executes the following processing on the totality of the entries of the address table in the address table storage unit 414. That is, if "changed" has been recorded in the flag associated with the latest logical address space, the physical block number associated with the latest logical address space is registered as an unused block in the unused block table of the address table storage unit 414. As a result, the area corresponding to the physical block number is released as being in the unused state. The stored information indicating the state of data storage in the recording medium (physical block number and the flag corresponding to the latest logical address space) is restored to the state which prevailed at the time of forming of the directly previous snap shot. That is, the physical block number corresponding to the snap shot logical address space is copied to the physical block number corresponding to the latest logical address space. Additionally, the flag corresponding to the latest logical address space is set to "not changed" from "changed".

It is assumed that a given entry is in the state shown in FIG. 31*c* at the time of starting the processing of snap shot restoration. The flag corresponding to this latest logical address space is "changed". Thus, the processing sequencer 411 registers the physical block number "bbb" corresponding to its latest logical address space as an unused block in the unused block table. The physical block number corresponding to the snap shot logical address space is copied to the block number "bbb" corresponding to the latest logical address space. The result is that the block number corresponding to the latest logical address space is "aaa". Moreover, the flag corresponding to the latest logical address space is set from "changed" to "not changed". The result is that the stored information (physical block number associated with the latest logical address space and the flag) goes back to a state prior to the forming of the directly previous snap shot. By executing the processing of snap shot restoration in this manner, the entry goes back to a state in the directly previous restart enabling point.

When the flag corresponding to the latest logical address space is "not changed", it indicates that the data stored in the address corresponding to the physical block number is not changed as from the directly previous restart enabling point. Thus, no processing is performed on the entry.

In the present embodiment, data received from the storage unit 400 is stored in an address corresponding to the newly allocated physical block number in the storage unit 401 of the storage system. On receipt of the snap shot forming command at the restart enabling point, the storage unit 401 holds the information of the newly allocated physical block as a snap shot. Should an abnormality have occurred in the host of the normal system, the newly allocated physical block number is set to the non-use state. If the newly allocated physical block number is set to the non-use state, the host 303 is able to re-start the processing of the applications 310*a* and 310*b*. That is, even if an abnormality should have occurred in the host 300, a short time suffices until the host 303 is able to re-start the processing.

On the other hand, the data written in the recording medium 101 between a given restart enabling point and another restart enabling point is not transmitted at a time to the storage unit 401 of the standby system, but is transmitted each time the write command is received from the 300. Since a large amount of data are not transmitted at a time, a short data transfer time with the host 401 suffices.

A modification of the eighth embodiment is now explained. In the illustrative processing, shown in FIGS. 32 and 35, the write command is issued only after waiting in case restart enabling point notification processing was performed (see step S505). Moreover, if there is any uncompleted write processing, the snap shot forming command is issued only after waiting (see step S560). In the present modification, when the write command is received from the host 300, the storage unit 400 sends the write command to the storage unit 401 without dependency on the state of the restart enabling point notification processing. That is, the storage unit 400 immediately commences the processing as from step S506 after step 504 shown in FIG. 32. On the other hand, when the restart enabling point notification is received from the host 300, the snap shot forming command is issued instantly from the storage unit 400 to the storage unit 401, without dependency on the state of the write processing. That is, when the restart enabling point notification is received, the storage unit 400 immediately commences the processing shown in FIG. 35 as from the step S562.

In the present modification, the storage unit 400 appends the issuing IDs to all of the commands transmitted to the storage unit 401. The storage unit 401 of the standby system holds the information of the processed issuing IDs. The information of the processed issuing IDs is the information indicating up to which of the commands received from the storage unit 400 the processing has proceeded and has been completed. For example, if the content of the information of the processed issuing IDs is "532, it indicates that the processing up to the command with the issuing ID of "53" has been finished.

Figure 36:
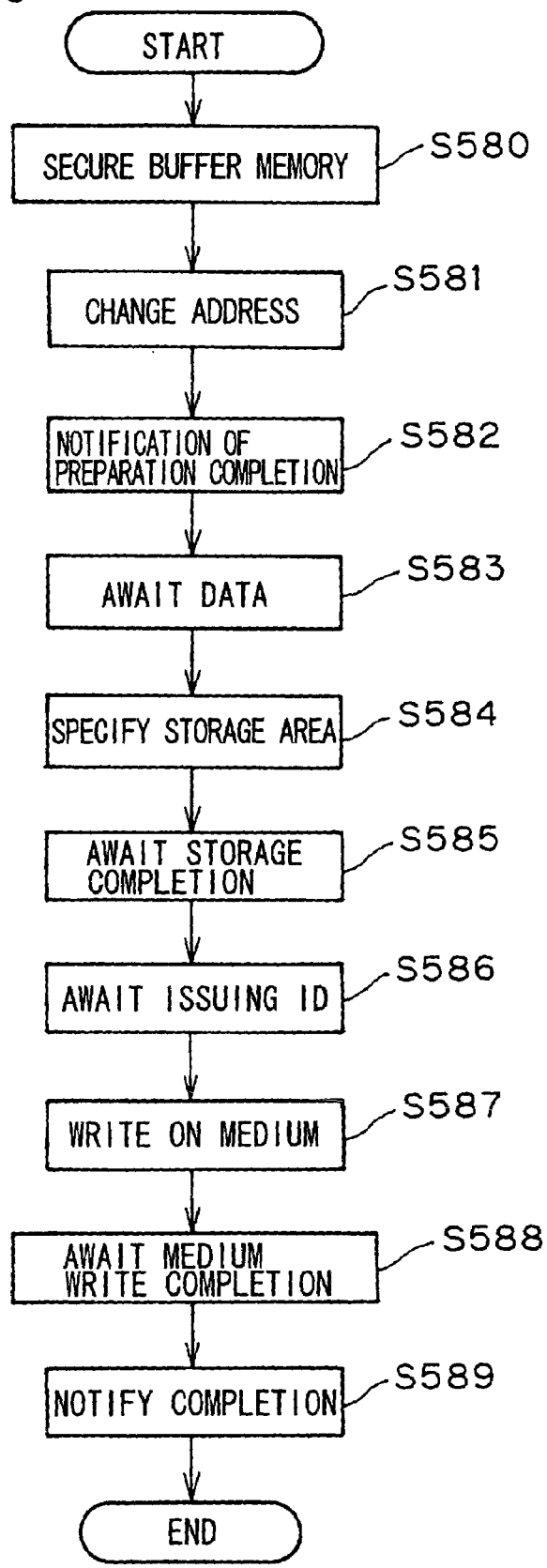
FIG. 36 is a flowchart showing the operation of the processing sequencer.

FIG. 36 depicts a flowchart showing the operation of the processing sequencer 411 of the storage unit 401 which has received the write command. The processing sequencer 411 first secures an area in the buffer memory 106 necessary for received data (step S580). The processing sequencer 411 also causes the LBA management unit 413 to convert the logical address to the physical address as the address being the logical address of the write destination as specified by the write command and the processing being the write processing are specified (step S581). In the step S581, the LBA management unit 413 performs the processing on the entry, as in the case of the step S521, to deliver the physical address to the processing sequencer 411.

The processing sequencer 411 then instructs the communication unit 412 to send the notice on the completion of processing to the storage unit of the origin of data transfer (herein the storage unit 400) (step S582). The communication unit 412 is responsive to the instruction to send the notice on the completion of the preparation to the storage unit of the origin of data transfer. The processing sequencer 411 then awaits data arrival from the storage unit of the destination of data transfer (step S583). When the data has been delivered and an inquiry from the communication unit 412 as to the area in the buffer memory 106 in which to store data is received, the processing sequencer 411 intimates the communication unit 412 of the area secured in the step S580 (step S584).

The processing sequencer 411 then awaits the completion of storage of the data from the storage unit of the source of data transfer (step S585). When notified by the communication unit 412 that all data have been stored in the buffer memory 106, the processing sequencer 411 waits until the value of the processed issuing IDs is equal to the value of the issuing ID appended to the write command being processed less one (step S586). It is assumed for example that the write command of the issuing ID of "54" is received and the operation from step S580 to step S585 is executed. At this time, it cannot necessarily be said that the respective commands, such as write commands or snap shot forming commands, up to the issuing ID of "53" have been received. In this case, the processing on the issuing ID of "54" is discontinued in the step S586 until the respective commands up to the issuing ID of "53" are received and the processing corresponding to the commands is completed. When the information of the processed issuing IDs is equal to "53", the processing on the issuing ID of "54" is re-started and processing transfers to a step S587.

When the value of the information of the processed issuing IDs is equal to the issuing ID less one, the processing sequencer 411 registers in the IO scheduler 104 a command to write data stored in the buffer memory 106 (write request) in an area corresponding to the physical address converted in the step S581. The IO scheduler 104 is responsive to the write request to command the medium control unit 105 to write data of interest. The medium control unit 105 is responsive to the registered contents to execute data write processing from the buffer memory 106 to the recording medium 101 (step S587).

The processing sequencer 411 awaits the notification on write completion from the medium control unit 105 (step S588). On receipt of the notification on write completion from the medium control unit 105, the processing sequencer notifies the storage unit of the origin of data transfer of the completion (step S589). In the step S589, the issuing ID appended to the write command is reflected on the information of the processed issuing IDs. For example, if the processing up to the step S589 has been made on the write command with the issuing ID of "54", the information of the processed issuing IDs is updated from "53" to "54".

When the storage unit 401 has received the snap shot forming command, the modification of the eighth embodiment operates as follows: That is, when the snap shot forming command has arrived at the storage unit 401, the snap shot forming command is supplied to the communication unit 412 of the storage unit controller 410. On receipt of the snap shot forming command, the communication unit 412 delivers the snap shot forming command to the processing sequencer 411 to instruct the start of the snap shot forming processing.

In the snap shot forming processing, the processing sequencer 411 waits until the value of the processed issuing IDs is equal to the issuing ID appended to the request being processed less one. That is, the processing sequencer 411 waits until the processing associated with the command issued directly before the snap shot forming command is completed, as in the step S586, without prosecuting the processing conforming to the snap shot forming command.

When the value of the information of the processed issuing IDs is equal to the value of the issuing ID less one, the processing sequencer 411 performs the following processing on the totality of the entries of the address table in the address table storage unit 414. That is, if "changed" has been recorded in the flag associated with the latest logical address space, the physical block number associated with the latest logical address space is registered in the unused block table of the address table storage unit 414 as an unused block. The physical block number corresponding to the snap shot logical address space is then copied to the block number associated with the latest logical address space. Moreover, the flag associated with the latest logical address space is set to "not changed" from "changed".

If the flag associated with the latest logical address space is "not changed", it indicates that the data stored in the address associated with the physical block number as from the directly previous restart enabling point has not been changed. Thus, no processing is performed on the entry.

When the above processing has been completed in its entirety, the processing sequencer 411 changes the value of the information of the processed issuing IDs to an issued ID appended to the snap shot forming command. Using the communication unit 412, the processing sequencer 411 sends the response corresponding to the snap shot forming command to the storage unit 400.

The present modification differs from the above-described eighth embodiment as to the storage unit 401 prosecuting the processing of the respective commands in the sequence of the issuing IDs. There is no difference in the processing on the entry itself. Thus, if an abnormality should have occurred in the host 300, only a short time suffices until re-start of the processing by the host 303. Moreover, the data transfer time between the hosts 400 and 401 may also be shortened.

In the eighth embodiment, the write requesting means and the snapshot forming requesting means are implemented by the processing sequencer 411 and the communication unit 412 of the storage unit 400. The snap shot forming means may be implemented by the processing sequencer 411, LBA management unit 413 and the address table storage unit 414 of the storage unit 401, while the restart enabling point notification means may be implemented by the restart enabling point notifying unit 312 of the host 300.

Embodiment 9

Figure 37:
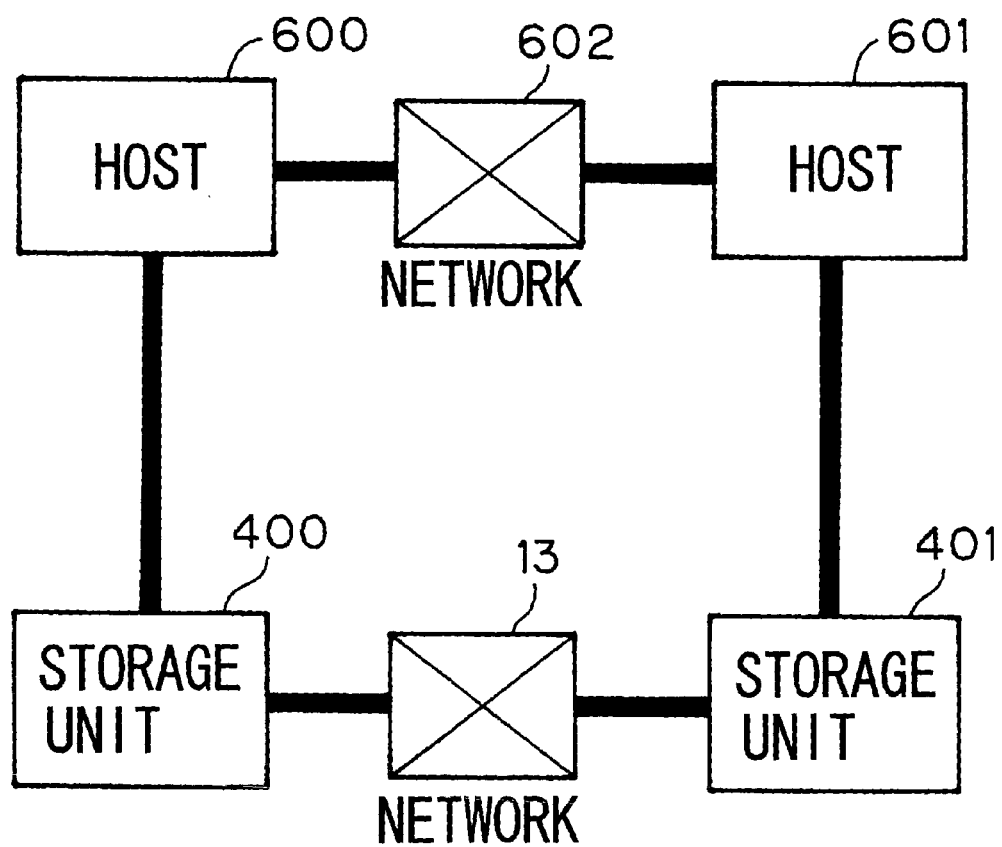
FIG. 37 is a block diagram showing a ninth embodiment of the data copying system.

FIG. 37 depicts a block diagram showing a configuration of the data copying system according to the ninth embodiment of the present invention. In the data copying system, shown in FIG. 37, the storage unit of the normal system 400 is locally connected to a host of the normal system 600 which uses the storage unit 400. The storage unit 401 of the standby system is locally connected to a host of the standby system 601 which uses the storage unit 401. The storage unit 400 is connected over a network 13 to the storage unit 401. The host 600 is connected over a network 602 to the host 601.

The configuration and the operation of the storage units 400 and 401 are the same as the configuration and the operation of the storage units 400 and 401 of the eighth embodiment having the snap shot function (see FIG. 29). The storage units 301 and 302 of the seventh embodiment (see FIG. 21) may also be used in place of the storage units 400 and 401.

The networks 13, 602 may be one network. However, the network 602, to which are connected the hosts 600 and 601, is preferably a leased line.

Figure 38:
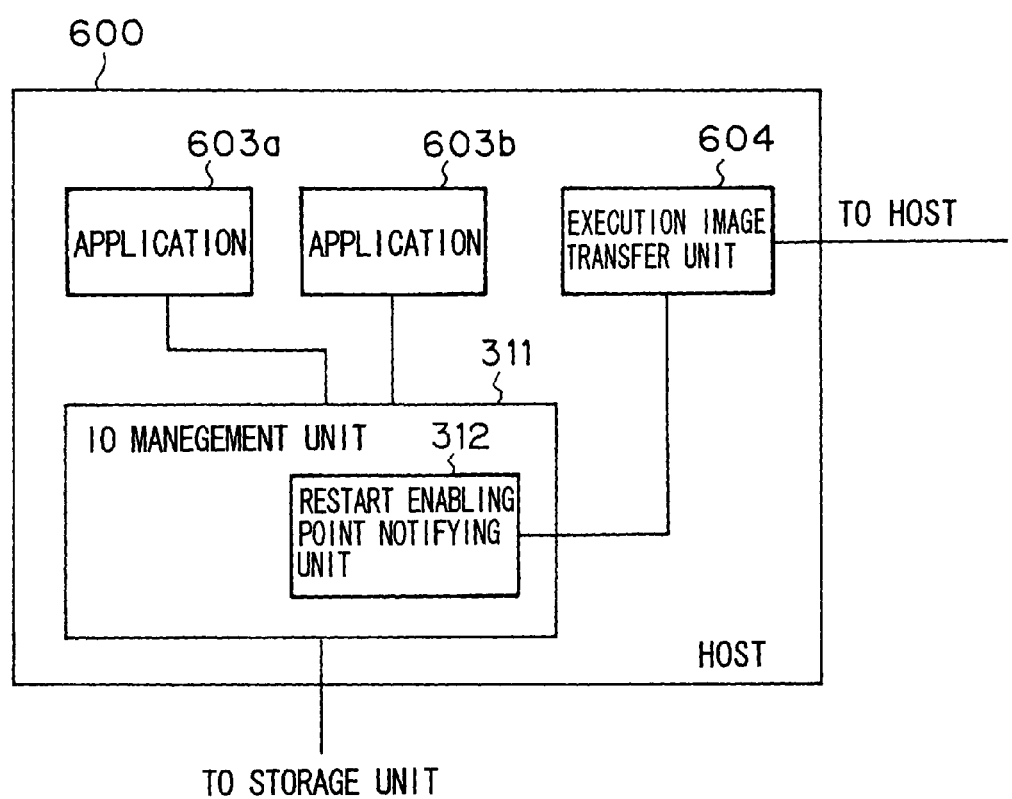
FIG. 38 is a block diagram showing an illustrative structure of a host.

FIG. 38 depicts a block diagram showing an example of a configuration of the host 600. Referring to FIG. 38, one or plural applications are run on the host 600. Here, two applications 603a and 603b are given by way of illustration. The applications 603a and 603b access data in the storage unit 400 using the IO management unit 311. The IO management unit 311 includes a restart enabling point notifying unit 312 for notifying the storage unit 400 of the restart enabling point. There is also provided an execution image transfer unit 604 for transferring an execution image of the applications 603a and 603b and for notifying the restart enabling point notifying unit 312 of the restart enabling point.

The applications 603a and 603b in the present embodiment are applications which are not equipped with restart function, that is, applications not having the function capable of restarting the processing when the data recording state of the recording medium 101 is in a preset state.

Figure 39:
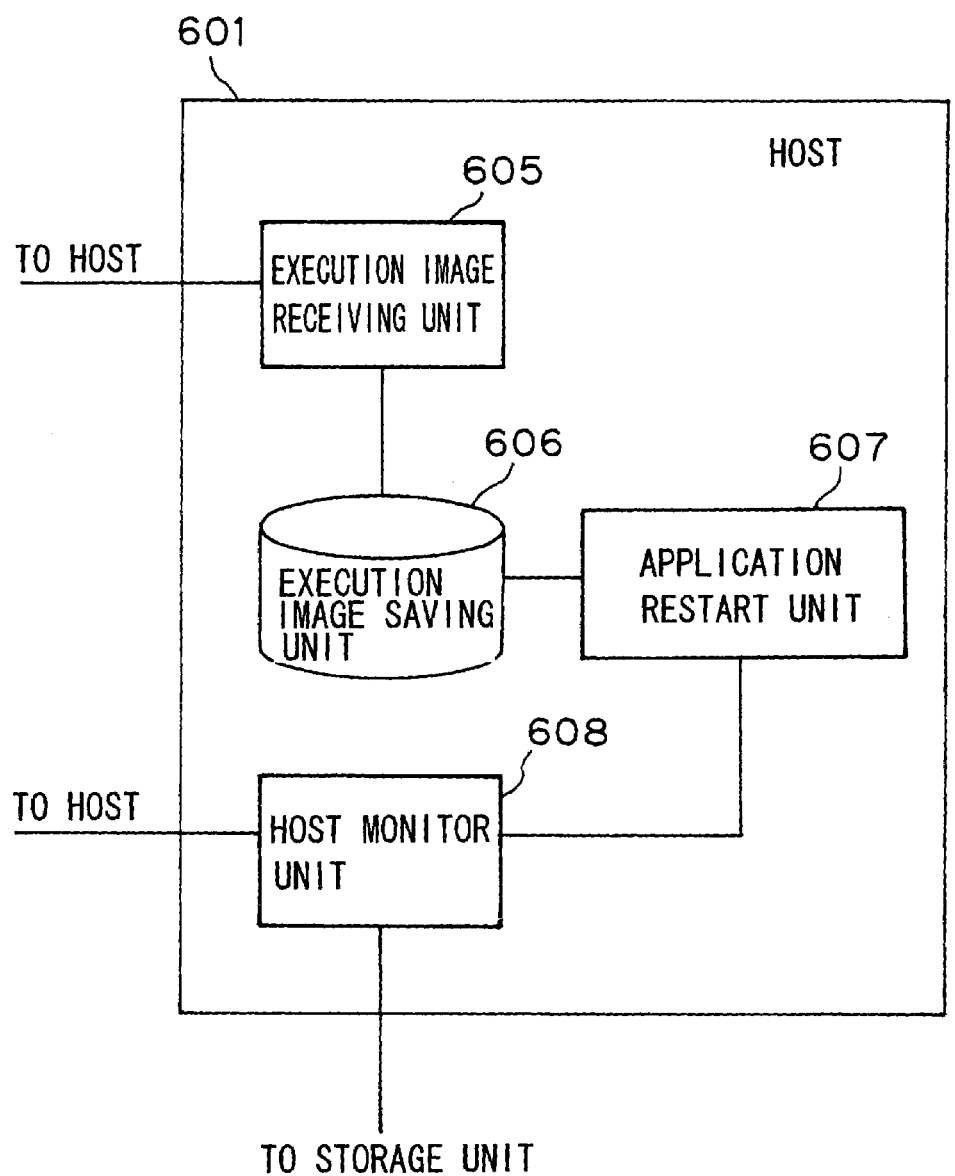
FIG. 39 is a block diagram showing an illustrative structure of a host.

FIG. 39 depicts a block diagram showing an illustrative structure of the host 601. Referring to FIG. 39, the host 601 includes an execution image saving unit 606 for saving an execution image, an execution image receiving unit 605 for receiving the execution image sent from the host 600 for saving in the execution image receiving unit 606, a host monitor unit 608 for monitoring the state of the host 600 and an application restart unit 607 for restarting the application based on the execution image in the execution image receiving unit 606. The execution image receiving unit 606 is a medium for saving data, such as a volatile semiconductor memory, a non-volatile semiconductor memory, a magnetic disc, a magneto-optical disc, or an optical disc.

The execution image is the information indicating the process execution state of an operation system, that is, the information necessary in order that the processes executed by the respective applications will be executed by other hosts. The execution image include data in a virtual address space of each process, values of registers as the process management information, values of the program counters, and process states. The execution image may also include the information for restoring the files used by the process or the communication between the processes. If one process is to be realized by plural sleds by parallel processing, the values of the registers of the respective sleds, program counter values, or words and flags of the program states, are also execution images. The execution image may also include the contents of the communication buffer in a kernel used by a process of interest. Meanwhile, the sled means a process unit in parallel processing.

The operation is hereinafter explained. First, the operation at the time of transferring the execution image is explained. To the execution image transfer unit 604 of the host of the normal system 600 is supplied an execution image transmission command from the user. This command may be supplied at any optional timing. On receipt of the command, the execution image transfer unit 604 acquires the execution image of the applications 603a and 603b. The execution image transfer unit 604 then instructs the restart enabling point notifying unit 312 of the IO management unit 311 to notify the storage unit 400 of the restart enabling point. The restart enabling point notifying unit 312 then notifies the storage unit 400 of the restart enabling point. The execution image transfer unit 604 then sends the acquired execution image to the execution image receiving unit 605 of the host 601. The execution image receiving unit 605 in the host 601 receives the execution image from the execution image receiving unit 606 of the host 600 to save the received execution image in the execution image receiving unit 606.

At a time point the transfer of the execution image is commanded, the storage unit 400 receives the restart enabling point notification and operates responsive to the notification. Thus, the storage unit of the standby system 401 formulates the snap shot at the time point the transfer of the execution image is commanded in the host of the normal system.

If storage units 301 and 302 similar to those of the seventh embodiment (see FIG. 19) are used as storage units, the storage unit of the standby system 401 keeps the state of the recording medium in a state prevailing at the time point the transfer of the execution image is commanded in the host of the normal system.

The capacity of the execution image sometimes reaches hundreds of MB such that the transfer of the execution image to the host 601 is time-consuming. If the applications 603a and 603b prosecute the processing during transfer of the execution image, the values of the memory or the register are changed in the course of the transfer. Thus, during transfer of the execution image, the processing of the applications 603a and 603b is halted.

The information of the execution image may be saved in the memory or the magnetic disc (not shown in FIG. 37) provided to the host 600 and the so saved execution image may be transmitted to the host 601. If once the saving has been completed and the processing then is prosecuted, the contents of the saved execution image may be kept. Thus, in this case, the applications 603a and 603b of the host 600 are able to continue the processing. The time for saving the execution image in e.g. the memory is shorter than the execution image transfer time. As a result, a shorter time of halting of the processing is sufficient by transferring the execution image after storing the image in e.g., a memory.

Here, the case in which the execution image transfer unit 604 is responsive to the user's command to transfer the execution image is shown. The timing for the execution image transfer unit 604 to start the execution image transfer processing is not limited to the time point when a corresponding commanded is provided by the user. For example, the execution image transfer operation may be commenced every preset time interval. The execution image transfer processing may be restarted when the execution image transfer has been completed. Alternatively, the transfer processing may be commenced e.g. at a time point the application becomes idle or when the idle time of the application exceeds a preset value.

The operation in case of breakout of a disaster is now explained. If the host 600 is unusable due to e.g. a disaster, the storage unit 401 is set from the standby system to the normal system. The host 601 takes over the processing from the host 600.

The operation of the host 601 as from the detection of a trouble until re-start of the application is explained. First, the host monitor unit 608 in the host 601 detects an abnormality in the host 601. For example, the host monitor unit 608 is having communication with the host 600 at all times or periodically. If the host monitoring unit 313 becomes unable to communicate with the host during a prefixed time or an abnormality is reported from the host 300, the host monitoring unit 313 recognizes that a disaster has broken out in the host 300. Alternatively, when an abnormality is reported from the host 600, the host monitor unit 608 may recognize that the disaster has broken out when an abnormality is reported from the host 600.

On detection of an abnormality of the host 600, the host monitor unit 608 issues a snap shot restoration command to the storage unit of the standby system 401. The host monitor unit 608 awaits a response to the snap shot restoration command and, on receipt of the response, instructs the application restart unit 607 to re-start the application. The application restart unit 607 re-starts the operation of the application, using the execution image saved in the execution image receiving unit 606. In the present instance, there is shown a case of using storage units 400 and 401 similar to those of the fifth embodiment as the storage unit. In case of using the storage units 301 and 302 (see FIG. 19) similar to those of the seventh embodiment, the host monitor unit 608 may output a delay data discarding command in place of the snap shot restoration command.

If, when the application restart unit 607 re-starts the processing of the application, there is the information in the execution image in need of change depending on the host in operation, the information is changed at the time of restoration.

In the ninth embodiment, the storage unit of the normal system receives the restart enabling point notification at a time point when the transfer of the execution image is commanded in the host of the normal system. Thus, the storage unit of the standby system formulates a snap shot at a time point when the transfer of the execution image is commanded in the host of the normal system. Alternatively, the state of the recording medium at a time point when the transfer of the execution image is commanded in the host of the normal system. Moreover, the host of the storage system holds the execution image of the host of the normal system at a time point when the transfer of the execution image has been commanded. Thus, the storage unit of the standby system is able to reproduce the state of the storage unit of the normal system at a preset time point, even if the restart function has not been implemented in the application, such that the host of the standby system is able to reproduce the execution image at the time point, and hence the processing can promptly be re-started in the standby system.

In the ninth embodiment, the execution image transfer unit 604 may transfer not the execution image in its entirety, but only the difference from the execution image transferred last time. The transfer time can be shortened by transferring only the portion of the execution image which has been changed from the execution image transferred last time.

In a virtual storage computer system, it is a frequent practice to use a conversion table between the physical address and the logical address highly likely to be used. This conversion table is termed a TLB (Translation Look-aside Buffer). In the TLB, the update information indicating whether or not address data have been rewritten from one converted address to another is supervised. This update information is generally termed a dirty flag or a dirty bit. For example, in the publication: "Computer Architecture, Quantitative Approach of Designing, Implementation and Evaluation", by David Paterson and John Hennessey, translated by Shinji Tomita et al., published by Nikkei BP, February 1994, pages 442 to 443, this update information is stated as being a dirty bit. It is sufficient if the execution image transfer unit 604 sends the information corresponding to a dirty flag indicating that a change has been made, as being the execution image.

In virtual storage, placing the page necessary for program execution in a real storage device is termed page-in, while removing a page from the real storage device for placing it in a virtual storage device is termed page-out. If the transfer of the execution image is commanded, the execution image transfer unit 604 may transmit page-in memory data to the host 601 and transmit page-out memory data to the host 601 at a timing when page-out has occurred. The page-out memory data is not changed until the next page-in. Thus, the amount of transmission of the execution image may be decreased by transmitting the execution image in this manner.

In the ninth embodiment, the execution image transfer means may be implemented by the execution image transfer unit 604. The execution image saving means may be implemented by the execution image saving unit 606, while the optional time point restart enabling point notification means may be implemented by the restart enabling point notifying unit 312.

Figure 40:
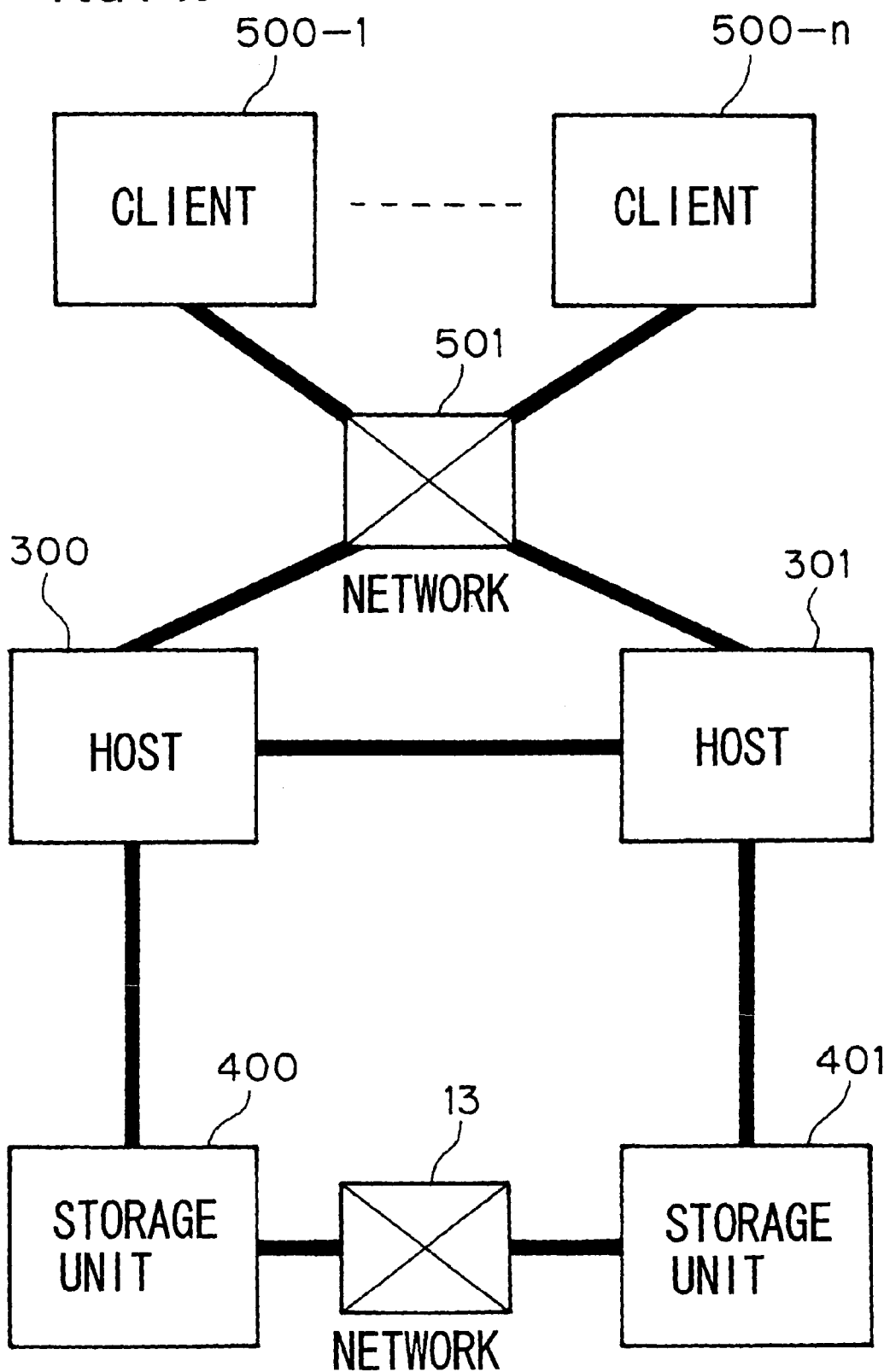
FIG. 40 is a block diagram showing an illustrative structure in case the present invention is applied to a client server system.
Figure 41:
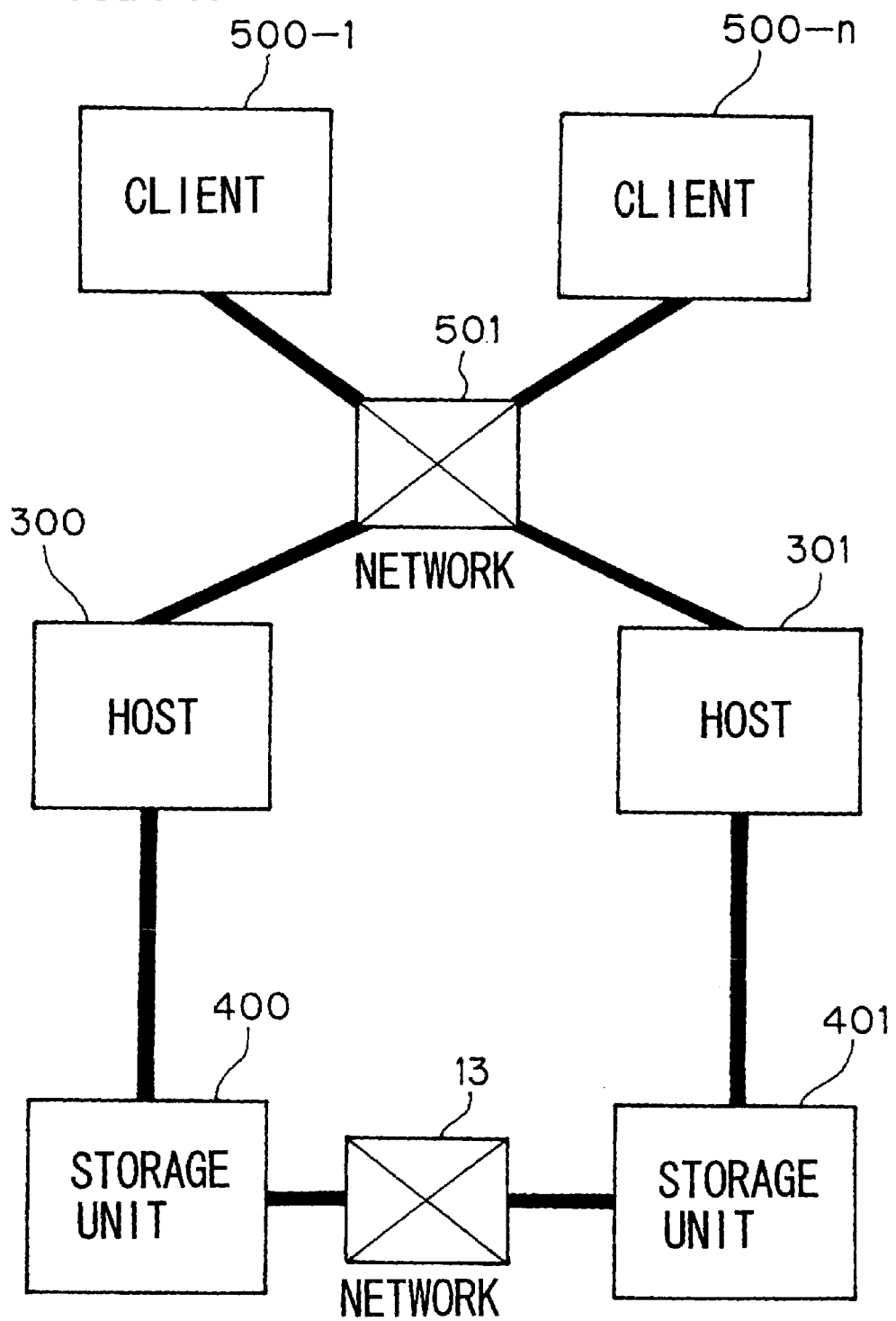
FIG. 41 is a block diagram showing an illustrative structure in case the present invention is applied to a client server system.

FIGS. 40 and 41 depict block diagrams showing an example of a configuration in which seventh to ninth embodiments are applied to a client and server system. Usually, the host 300 operates as servers for clients 500-1 to 500-n. If an abnormality has occurred in the host 300 or in the storage unit 400 due to e.g. a disaster, the host 303 is in operation. After the host has commenced its operation, each client requests the host 303 to perform the processing as a server.

Meanwhile, if the hosts 300 and 303 are interconnected directly, the host 303 monitors the state of the host 300, as explained in the seventh to ninth embodiments. If the hosts 300 and 303 are not interconnected directly, as shown in FIG. 41, the clients 500-1 to 500-n may monitor the state of the host 300 to notify the host 303 of a breakout of an abnormality in case the abnormality has occurred in the host 303.

In the seventh to ninth embodiments, data may be transmitted to the storage unit of the standby system, through a relaying device, as in the first to fourth embodiments. In such case, the meritorious effects of the first to fourth embodiments may be achieved. In case of data transfer/receipt between the storage devices or between the storage device and the relaying device, a set of redundancy processed data may be transmitted/received, as in the fifth or sixth embodiment. In such case, the meritorious effects of the fifth or sixth embodiments may be achieved.

The meritorious effects of the present invention are summarized as follows.

According to the present invention, a data copying system including a relaying device for relaying data transferred from a first storage unit to a second data storage unit, is provided, in which the relaying device is provided in a location pre-calculated so that, even if the first storage device cannot be operated due to a disaster, the operation of the relaying device can be continued. The first storage unit includes data transfer processing means for controlling the data transfer. The data transfer processing means deems that data transfer to the second storage device is completed when data transfer to the relaying device is completed. Thus, even if the storage unit of the normal system is affected by the disaster, the relaying device is not, while the higher rank device of the operation system is able to commence the next processing without awaiting data storage in the storage unit of the standby system, so that it is possible to diminish the delay attendant on data transfer.

Moreover, with the present invention, at least one redundant data for error correction is formed from the transmitted original data and the original and redundant data are transmitted in different data transfer units. Thus, the standby system is able to restore the original data from a portion of the set of the original data and the redundant data, so that, even if part of data is discarded in the transmission process, it is unnecessary to re-transmit the data, and hence data transfer can be completed promptly.

The storage unit of the operation system includes delay write requesting means for transmitting data as a target of writing and a delay write request to the storage unit of the standby system on occurrence of a data write request, and write execution requesting means for sending a delay write execution request to the storage unit of the standby system on receipt from a higher rank device of a restart enabling point notification notifying that the time is now the restart enabling point for which an application may directly restart the operation for the prevailing data state. The storage unit of the standby system includes temporary storage means for transiently storing data and storage processing means for storing received data in the temporary storage means responsive to the delay write execution request and for storing the data stored in the temporary storage means in the recording medium on receipt of the delay write execution request. Thus, the state of the recording medium of the standby system can be set to the state at the time of notification of the restart enabling point, so that the processing can immediately be re-started if an abnormality occurs in the normal system.

According to the present invention, the storage unit of the normal system includes write requesting means for transmitting data to be written and a write request to the storage unit of the standby system, and snap-shot forming requesting means for transmitting a snap shot forming request to the storage unit of the standby system on receipt from a higher rank device of the notification of the restart enabling point for notifying that the time is now the restart enabling point for which an application may directly restart the operation for prevailing data state. The standby system includes snap shot forming means which, on receipt of a write request, allocates an area for writing data corresponding to the write request to store the data in a recording medium and which, on receipt of the snap shot forming request, forms a snap shot. Thus, the state of the recording medium of the standby system can be set to the state at the time of notification of the restart enabling point, so that, if an abnormality has occurred in the normal system, the processing can be re-started immediately in the standby system.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A data copying system comprising:
a first storage unit;
a second storage unit, data stored in said first storage unit being copied by mirroring or backup to said second storage unit over a communication network; and
a relaying device for relaying data transferred from said first storage unit to said second data storage unit over the communication network, said relaying device being provided in a location that is pre-calculated and different from a location of said first and second storage units, so that, even if said first storage device cannot be operated due to a disaster, the operation of said relaying device can be continued;
wherein said first storage unit includes data transfer processing means for controlling data transfer, said data transfer processing means regarding the data transfer from said first storage unit to said second storage unit as being completed when data transfer from said first storage unit to said relaying device is completed, and
wherein said data transfer processing means in said first storage unit simultaneously sends data stored in said first storage unit to a plurality of said relaying devices.

2. A data copying system comprising:
a storage unit of an operation system; and
a storage unit of a standby system; data stored in said storage unit of the operation system being copied to said storage unit of the standby system over a communication network by mirroring,
wherein said storage unit of the operation system includes:
delay write requesting means for sending data as a target of writing and a delay write request to said storage unit of the standby system on occurrence of a data write request; and
write execution requesting means for sending a delay write execution request to said storage unit of the standby system on receipt from a higher rank device of a restart enabling point notification asserting a restart enabling point for which an application may directly restart operation for prevailing data state; and
wherein said storage unit of the standby system includes:
temporary storage means for temporarily storing data; and
storage processing means for storing received data in said temporary storage means responsive to the delay write request received and for storing the data stored in said temporary storage means in said recording medium on receipt of said delay write execution request.

3. The data copying system according to claim 2, wherein the delay write requesting means and the delay write execution requesting means in said storage unit of the operation system asynchronously send a delay write request and a delayed write execution request to said storage unit of the standby system; and
wherein said storage processing means in said storage unit of the standby system on receipt of one delay write execution request causes data stored in said temporary storage means to be stored in the recording medium when data associated with the delay write request transmitted between a delay write execution request directly previous to said one delay write execution request and said one delay write execution request have all been stored in said temporary storage means and when the data transmitted before said directly previous delay write execution request have been stored in said recording medium.

4. The data copying system according to claim 2, wherein, when an abnormality occurs in the operation system, said storage processing means in said storage unit of the standby system discards data stored in said temporary storage means.

5. The data copying system according to claim 4, wherein
a higher rank device of the operation system employing the storage unit of the operation system includes restart enabling point notification means for sending a restart enabling point notification to said storage unit of the normal system when timing is a restart enabling point; and wherein
a higher rank device of the standby system employing the storage unit of the standby system on detection of an abnormality of said operation system notifies the storage unit of the standby system of the occurrence of an abnormality to prompt restoration of the status of the storage unit of the standby system to a state corresponding to said restart enabling point to restart the processing when the state of the storage unit of the standby system is the state corresponding to the restart enabling point.

6. The data copying system according to claim 5, wherein the execution image transferring means in said higher rank device of the operation system transfers only the portion changed from the execution image transferred last time.

7. The data copying system according to claim 4, wherein
a higher rank device of the operation system employing the storage unit of the operation system includes:
execution image transfer means for transferring an execution image indicating the processing executing state of the operation system to a higher rank device of the standby system employing the storage unit of the standby system; and
optional time point restart enabling point notification means for sending a restart enabling point notification at a timing of the execution image transmitting means transmitting an execution means;
wherein said higher rank device of the standby system employing said storage unit of the standby system includes execution image saving means for saving an execution image transferred by said execution image transfer means, said execution image transfer means transferring an execution image at an optional time point to said higher rank device of the standby system; and
wherein said higher rank device of the standby system employing said storage unit of the standby system on detection of an abnormality of said operation system notifies the storage unit of the standby system of the occurrence of the abnormality to prompt restoration of the status of the storage unit of the standby system to a state corresponding to said restart enabling point, so as to restart the processing, using an execution image, when the state of said storage unit of the standby system is the state corresponding to the restart enabling point.

8. A data copying system comprising:
a storage unit of an operation system; and
a storage unit of a standby system; data in said storage unit of the operation system being copied by mirroring to said storage unit of the standby system over a communication network;
wherein said storage unit of the operation system includes:
write requesting means which, on occurrence of a data write request, sends data to be written and a write request to said storage unit of the standby system; and snap shot formation requesting means for sending a snap shot forming request to said storage unit of the standby system on receipt from a higher rank device of a restart enabling point notification asserting a restart enabling point for which an application may directly restart operation for prevailing data state; and
wherein said storage unit of the standby system includes:
snap shot forming means which, on receipt of a write request, allocates an area for writing data corresponding to said write request to store the data in said recording medium and to update the storage information indicating the state of data storage in said recording medium, and which on receipt of the snap shot forming request forms a snap shot,
wherein, when the snap shot forming means in said storage unit of the standby system forms a snap shot, said write requesting means sends a write request to said storage unit of the standby system after said snap shot forming means completes forming the snap shot.

9. The data copying system according to claim 8, wherein said write requesting means and the snap shot formation requesting means in the storage unit of the operation system asynchronously send the write request and the snap shot forming request to the storage unit of the standby system;
said snap shot forming means in said storage unit of the standby system on receipt of each write request awaits storage of data corresponding to the write request in the recording medium until the snap shot based on the snap shot forming request directly before the received write request is formed completely;
said snap shot forming means on receipt of one snap shot forming request forming a snap shot when a snap shot based on the directly previous snap shot forming request is completed and all data corresponding to the write request transmitted between said directly previous snap shot forming request and said one snap shot forming request have all been stored in the recording medium.

10. The data copy system according to claim 8, wherein, when an abnormality occurs in an operation system, said snap shot forming means in the storage unit of the standby system releases the area of the recording medium, where data has been stored after forming the directly previous snap shot, to a non-use state, to restore the stored information to the state at the time of forming the directly previous snap shot.

11. The data copying system according to claim 10, wherein
a higher rank device of the operation system employing the storage unit of the operation system includes restart enabling point notification means for sending a restart enabling point notification to said storage unit of the normal system when timing is a restart enabling point; and wherein
a higher rank device of the standby system employing the storage unit of the standby system on detection of an abnormality of said operation system notifies the storage unit of the standby system of the occurrence of an abnormality to prompt restoration of the status of the storage unit of the standby system to a state corresponding to said restart enabling point to restart the processing when the state of the storage unit of the standby system is the state corresponding to the restart enabling point.

12. The data copying system according to claim 10, wherein
- a higher rank device of the operation system employing the storage unit of the operation system includes:
- execution image transfer means for transferring an execution image indicating the processing executing state of the operation system to a higher rank device of the standby system employing the storage unit of the standby system; and
- optional time point restart enabling point notification means for sending a restart enabling point notification at a timing of the execution image transmitting means transmitting an execution means;
- wherein a higher rank device of the standby system employing said storage unit of the standby system includes execution image saving means for saving an execution image transferred by said execution image transfer means, said execution image transfer means transferring an execution image at an optional time point to said higher rank device of the standby system; and
- wherein said higher rank device of the standby system employing said storage unit of the standby system on detection of an abnormality of said operation system notifies the storage unit of the standby system of the occurrence of the abnormality to prompt restoration of the status of the storage unit of the standby system to a state corresponding to said restart enabling point, so as to restart the processing, using an execution image, when the state of said storage unit of the standby system is the state corresponding to the restart enabling point.

13. The data copying system according to claim 12, wherein the execution image transferring means in said higher rank device of the operation system transfers only the portion changed from the execution image transferred last time.

14. A computer program product comprising a computer usable medium having computer readable program code therein, said program code causing a computer provided in an operation storage unit in a data copying system, in which data in the operation storage unit is copied by mirroring to a standby storage unit via a communication network to execute the steps of:

sending data to be written and a write request instructing writing the data in a recording medium, to said storage unit of the standby system, on occurrence of a data write request; and sending to said storage unit of the standby system a snap shot forming request on receipt from a higher rank device of a restart enabling point notification asserting a restart enabling point for which an application may directly restart operation for prevailing data state.

15. A data copying system comprising:

a first storage unit;

a second storage unit, data stored in said first storage unit being copied by mirroring or backup to said second storage unit over a communication network; and a relaying device for relaying data transferred from said first storage unit to said second data storage unit over the communication network, said relaying device being provided in a location that is pre-calculated and different from a location of said first and second storage units, so that, even if said first storage device cannot be operated due to a disaster, the operation of said relaying device can be continued;

wherein said first storage unit includes data transfer processing means for controlling data transfer, said data transfer processing means regarding the data transfer from said first storage unit to said second storage unit as being completed when data transfer from said first storage unit to said relaying device is completed, wherein said relaying device includes non-volatile storage means for storing a command and data received from the first storage unit, and relaying processing means for relay controlling the data, said relaying processing means causing the command and the data received from said first storage unit to be stored in said non-volatile storage means and transmitting the command and data stored in said non-volatile storage means to said second storage unit at an optional timing, and further comprising a plurality of said relaying devices, wherein said data transfer processing means in said first storage unit simultaneously sends data stored in said first storage unit to a plurality of said relaying devices.

* * * * *